US006405114B1

(12) United States Patent
Priestley et al.

(10) Patent No.: US 6,405,114 B1
(45) Date of Patent: Jun. 11, 2002

(54) AERIAL WORK PLATFORM BOOM HAVING GROUND AND PLATFORM CONTROLS LINKED BY A CONTROLLER AREA NETWORK

(75) Inventors: Ronald E. Priestley; Paul E. Young, both of Elwood, KS (US); Brad Busch, Ocala, FL (US)

(73) Assignee: Snorkel International, Inc., Elwood, KS (US)

( * ) Notice: Subject to any disclaimer, the term of this patent is extended or adjusted under 35 U.S.C. 154(b) by 0 days.

(21) Appl. No.: 09/244,391

(22) Filed: Feb. 4, 1999

(51) Int. Cl.[7] .......................... G06F 19/00; G06F 17/00

(52) U.S. Cl. ......................... 701/50; 701/124; 212/278; 212/307; D34/34; 254/134.3 R; 182/2; 182/18; 182/19; 182/46; 182/2.9; 182/50; 182/63.1; 700/18; 700/302; 700/50; 700/303; 307/9.1; 307/43; 307/84

(58) Field of Search ................................ 212/278, 307; 701/50, 124; D34/34; 254/134.3 R; 182/2, 18, 19, 2.9, 46, 50, 63.1, 69.1, 69.5, 148, 141; 307/9.1, 43, 84; 361/195; 700/18, 302, 50, 303

(56) References Cited

U.S. PATENT DOCUMENTS

| | | | | | |
|---|---|---|---|---|---|
| 3,757,895 | A | * | 9/1973 | Knutson | 182/46 |
| 3,774,217 | A | * | 11/1973 | Bonner et al. | 343/225 |
| 3,809,182 | A | * | 5/1974 | Wilson | 182/148 |
| 4,160,492 | A | | 7/1979 | Johnston | 182/2 |
| 4,252,213 | A | | 2/1981 | Ekman | |
| 4,366,366 | A | | 12/1982 | Ekblad | 219/247 |
| 4,456,093 | A | * | 6/1984 | Finley et al. | 182/2 |
| 4,722,044 | A | | 1/1988 | Heiser et al. | 364/167 |
| 4,724,924 | A | * | 2/1988 | Breyer et al. | 182/2 |

(List continued on next page.)

FOREIGN PATENT DOCUMENTS

| | | | | |
|---|---|---|---|---|
| CA | 2030202 | | | 5/1992 |
| DE | 44 04 797 | A1 | | 8/1995 |
| EP | 047 726 | A2 | | 3/1982 |
| EP | 0 785 168 | A2 | | 7/1997 |
| FR | 2 584 835 | A1 | | 1/1987 |
| GB | 2194934 | A | * | 3/1988 |
| JP | 11-130385 | | * | 11/1995 |
| JP | 11-180695 | | * | 11/1999 |

OTHER PUBLICATIONS

Society of Automotive Engineers, Inc., "Surface Vehicle Recommended Practice: Joint SAW/TMC Electronic Data Interchange Between Microcomputer Systems in Heavy–Duty Vehicle Applications," J1587, Mar. 1996, pp. 1–23.

Society of Automotive Enginneers, Inc., "Serial Data Communications Between Microcomputer Systems in Heavy–Duty Vehicle Vehicle Applications," J1708, Oct. 1993 4 pages.

(List continued on next page.)

*Primary Examiner*—William A. Cuchlinski, Jr.
*Assistant Examiner*—Ronnie Mancho
(74) *Attorney, Agent, or Firm*—Senniger, Powers, Leavitt & Roedel

(57) ABSTRACT

An aerial work platform supported by a riser boom, a telescoping main boom, and a jib boom. Boom movement may be controlled by a platform control module or a ground control module connected to a controller by a controller area network (CAN). Movement of the platform and the jib boom are limited to a predefined envelope. If an operator attempts to move the platform outside the envelope, the controller automatically retracts the telescoping boom section or automatically levels the jib boom section in order to maintain the platform within the acceptable envelope. Boom section select switches permit the operator to select and move sequentially or simultaneously in different directions. Timers which are part of the system include various interlocks to accomplish safety and power saver features.

21 Claims, 14 Drawing Sheets

U.S. PATENT DOCUMENTS

| | | | | | |
|---|---|---|---|---|---|
| 4,791,549 | A | | 12/1988 | Heiser et al. | 364/167.01 |
| 4,917,213 | A | * | 4/1990 | Kessler et al. | 182/2 |
| 5,021,917 | A | * | 6/1991 | Pike et al. | 361/195 |
| 5,058,752 | A | | 10/1991 | Wacht et al. | 212/150 |
| 5,088,020 | A | | 2/1992 | Nishida et al. | 364/160 |
| 5,107,954 | A | | 4/1992 | Fujimoto | 182/2 |
| 5,268,591 | A | * | 12/1993 | Fujimoto | 307/9.1 |
| 5,404,661 | A | * | 4/1995 | Sahm et al. | 37/348 |
| 5,934,409 | A | * | 8/1999 | Citron et al. | 182/18 |
| 5,992,562 | A | * | 11/1999 | Boeckman et al. | 182/63.1 |
| 6,065,565 | A | * | 5/2000 | Puszkiewicz et al. | 182/2.9 |

OTHER PUBLICATIONS

Genie Industries, "Genie Z–60/34 Specifications," 1997 1 page.

Society of Automotive Engineers, Inc., "Surface Vehicle Recommended Practice: Physical Layer—250K bits/s, Shielded Twisted Pair," 1939/11, Dec. 1994, pp. 1–24 plus Appendix B thereto consisting of 39 pages.

* cited by examiner

GROUND CONTROL PANEL 400

AERIAL WORK PLATFORM BOOM HAVING GROUND AND PLATFORM CONTROLS LINKED BY A CONTROLLER AREA NETWORK

FIELD OF THE INVENTION

The invention generally relates to aerial work platforms and, in particular, to a computer based control system for an aerial work platform having various safety and control features.

BACKGROUND OF THE INVENTION

With regard to the control of aerial work platforms, it is known to use a control panel which operates the aerial work platform whenever a manually activated switch, such as a foot switch, is held in a depressed position. In the event that the switch is released, the control panel becomes inactive. Alternatively, the aerial work platform may contain selectively placed switches which must be held in place by the operator. These switches interrupt power when an operator leaves the operating station and takes a position remote from the switches such that the switches are no longer held in place by the operator.

There is a need for a computer based control system for an aerial work platform which allows operation of the platform by an operator at its base or on the platform and which includes safety features and interlocks preventing inadvertent or unsafe operation of the aerial work platform.

SUMMARY OF THE INVENTION

It is an object of this invention to provide a microprocessor controller for an aerial work platform which has ground and platform controls linked by a controller area network for transmitting input commands issued by an operator at the platform control or at the ground control to a controller so that operation of the boom can efficiently and safely occur from either control.

It is also an object of this invention to provide a controller in conjunction with sensors for an aerial work platform which restrict or minimize operation of the platform in certain positions beyond a predefined three-dimensional envelope to enhance safe operation of the platform within a safe envelope.

It is also an object of this invention to provide such a controller which provides automatic retraction of the platform to maintain the platform within the safe envelope and which automatically retracts the boom in response to certain operator commands which attempt to operate the boom outside the safe envelope.

It is an object of this invention to provide a computer based electronic control for an aerial work platform which ramps boom movement in any direction as applicable to provide for smooth and safe operation of the boom and its movement.

It is also an object of this invention to provide such a controller which executes multiple boom movements either sequentially and/or simultaneously in an efficient, safe and smooth manner.

It is another object of this invention to provide such an aerial work platform which has sensors and software for preventing inadvertent or unsafe operation of the boom and for saving power.

In one form, the invention is an aerial work apparatus comprising a base, a platform, a boom connecting the platform and the base, a hydraulic system for moving the boom sections and a boom control. The boom control controls the hydraulic system in response to operator input to move boom sections in accordance with the operator input. The boom control comprises a first control module on the base responsive to an operator for providing boom motion commands for causing the boom to move in a desired direction; a second control module on the platform responsive to an operator for providing boom motion commands for causing the boom to move in a desired direction; and a controller area network interconnecting the first module control module and the second control module.

In another form, the invention comprises an envelope controller suitable for use with an aerial work platform having a boom comprising a plurality of boom sections, a hydraulic system for moving the boom sections, a work platform supported by the boom, a base supporting the boom, a boom control for providing a boom control signal to the hydraulic system, the boom control signal controlling the hydraulic system to control motion of one of the plurality of boom sections. The envelope controller comprises a position detector subroutine or circuit for detecting a position of the boom sections or work platform relative to a position of the base; and a position limitation subroutine or circuit for inhibiting the boom control signal being provided to the hydraulic system when the position detector subroutine or circuit indicates that the detected position of the boom sections or work platform relative to the position of the base will exceed an envelope limit whereby the envelope controller limits the position of the boom sections or work platform relative to the position of the base to within a predefined region.

In another form the invention comprises an aerial work apparatus comprising a base; a platform; a boom having a plurality of boom sections connecting the platform and the base; a hydraulic system for moving the boom sections; and a boom control for controlling the hydraulic system in response to operator input to move the boom sections in accordance with the operator input. The boom controller comprises a boom section select switch response to operator input for selecting one of the plurality of boom sections to be moved; a boom motion input switch response to operator input for providing a boom direction signal indicative of a desired direction of boom motion for the selected boom section to be moved and providing a desired boom speed; and a boom ramping controller, responsive to the boom section select switch and boom motion input switch, for controlling the hydraulic system to move the selected boom section in accordance with the boom direction signal, the boom ramping controller adapted to cause the hydraulic system to move the selected boom section at a varying velocity which does not exceed a preset maximum velocity so that the boom accelerates at a preset rate from zero velocity to the desired velocity.

In another form the invention comprises an aerial work apparatus comprising a base; a platform; a boom having a plurality of boom sections connecting the platform and the base; a hydraulic system for moving the boom sections; and a boom control for controlling the hydraulic system in response to operator input to move the boom sections in accordance with the operator input. The boom control comprises a boom section select switch responsive to operator input for selecting only one of the plurality of boom sections to be moved; a boom motion input switch responsive to operator input for providing a boom direction signal indicative of a desired direction of boom motion; and a boom controller responsive to the boom section select switch and the boom motion input switch for controlling the hydraulic system to effect boom motion, the boom controller adapted to cause the hydraulic system to sequentially move the boom from one operator requested movement to the next operator requested movement or to simultaneously move the boom in a second direction in response to an operator requested movement while the boom is moving in response to a previous operator requested movement.

In another form the invention comprises an aerial work platform comprising a plurality of boom sections; a boom control for providing a motion output signal for controlling a motion of one of the plurality of boom sections in response to input from an operator to the boom control; and a timer subroutine or circuit. The timer subroutine or circuit comprises a safety subroutine or circuit for monitoring operator input requesting boom movement and for preventing the boom control from responding to operator input requesting boom movement in the event that there has been no operator input requesting boom movement for a first time period; and a power saver subroutine or circuit for monitoring operator input to the boom control, the power saver subroutine or circuit deactivating the boom control when the power saver subroutine or circuit detects no operator input to the boom control for a second time period.

In another form the invention comprises an aerial work apparatus comprising a base; a platform; a boom connecting the platform and the base; a hydraulic system for moving the boom sections; and a boom control for controlling the hydraulic system in response to operator input to move boom sections in accordance with the operator input. The boom control comprises a microprocessor having inputs for receiving operator inputs and having outputs providing output signals which are a function of the operator input provided to the microprocessor input, the hydraulic system being responsive to the output signals; a first control module on the base responsive to an operator for providing first boom motion command signals for causing the boom to move in a desired direction, the first boom motion command signals being supplied to the inputs of the microprocessor; and a second control module on the platform responsive to an operator for providing second boom motion command signals for causing the boom to move in a desired direction, the second boom motion command signals being supplied to the inputs of the microprocessor.

BRIEF DESCRIPTION OF THE DRAWINGS AND APPENDICES

Appendix A is an example of a system database.

Appendix B is an example of the database features according to the invention.

Appendix C is a summary of one preferred embodiment of the inputs and outputs to the platform and ground controls.

DETAILED DESCRIPTION OF PREFERRED EMBODIMENTS

Figure 1:
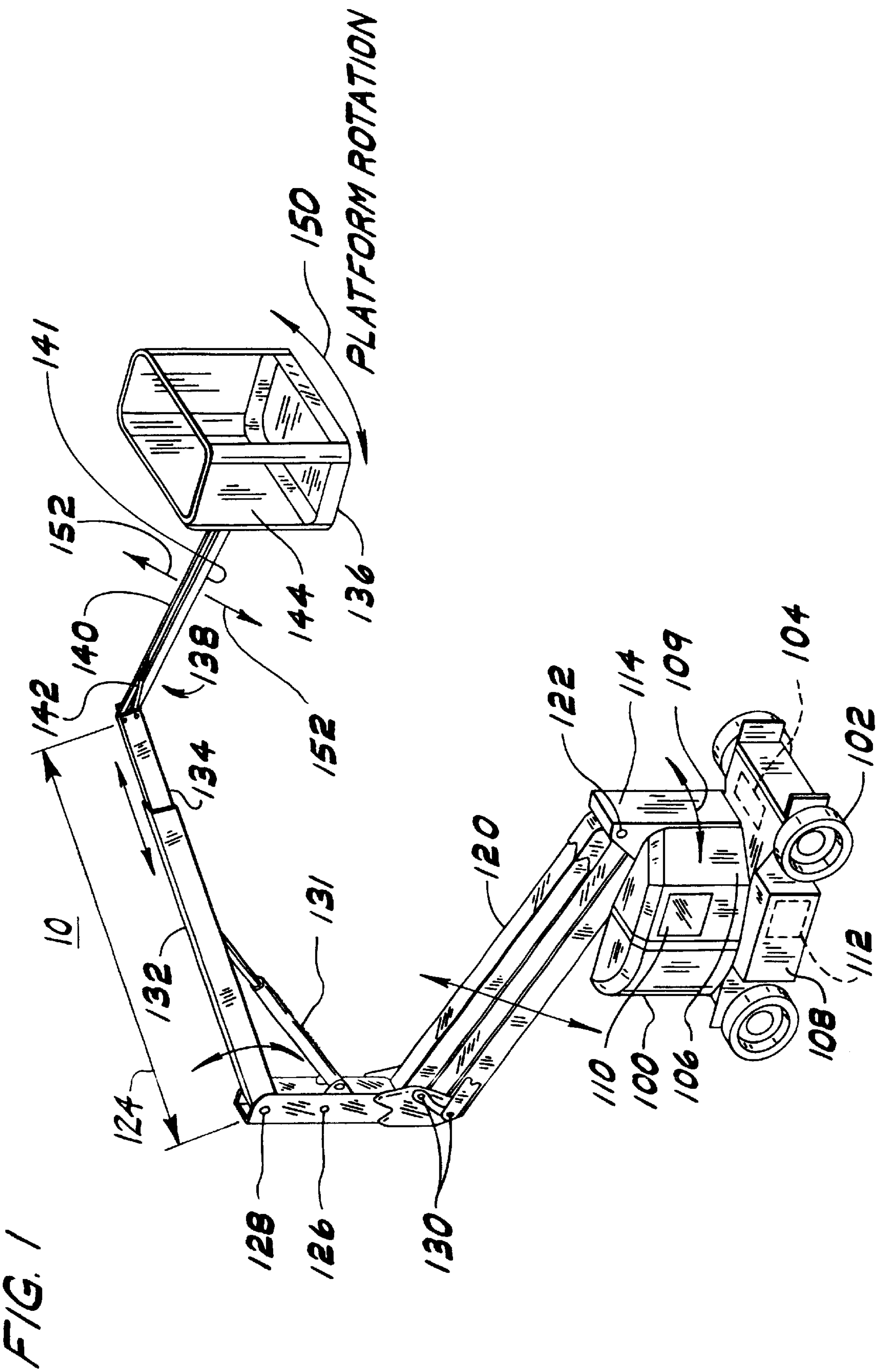
FIG. 1 is a perspective illustration of an aerial work platform having an elevated articulated boom.

FIG. 1 is a diagram of an aerial work platform 10 suitable for use with the present invention. The aerial work platform 10 comprises a base unit 100. The base unit 100 is mounted on a plurality of wheels 120, at least two of which are steerable. A drive 104 mounted internal to the base unit 100 is adapted to drive one or more of the wheels 120. The base unit 100 may be further divided into a rotating boom support 106 and a base chassis 108. The support 106 includes a base operator control panel 110 which is adapted to rotate with support 106 about the base chassis 108 as indicated by arrow 109 in response to a rotation drive 112 mounted inside the base chassis 108. The support 106 also includes a hydraulic system 114 for powering the rotation drive 112 and for providing power to move the boom sections. As is known in the art, the hydraulic system may include electrically driven, variable speed motors which drive hydraulic pumps at variable speeds to move the boom sections at variable speeds. Alternatively, the hydraulic system may be driven by a fuel-burning engine and may include a constant pressure system having proportional valves which receive a pulse width modulated signal to control boom section movement although it is preferred that the wheels arc driven by variable speed electric motors, it is contemplated that the wheels may be powered by the hydraulic system 114.

A riser boom 120 in a parallelogram configuration is mounted to the base unit 100 at a pivot point 122. A main telescoping boom 124 is connected to the riser boom 120 via a connecting member 126 and pivot points 128 and 130. A hydraulic cylinder 131 expands and contracts to control the position of the main telescoping boom 124. Other hydraulics (not shown) control the position of the other boom sections. The telescoping boom 124 further comprises a nonextending member 132 and an extending member 134. A work platform 136 is connected to the extending member 134 via a jib boom 138. The jib boom further comprises an upper jib boom arm 140 and a lower jib boom arm 141 in a parallelogram configuration and interconnected by a cylinder 142 for rotating the jib boom 138. A platform rotator 144 rotates the platform about the jib boom 138 while maintaining it in a substantially horizontal position. The platform 136 of the machine will rotate 90° in either direction in a level plane as indicated by arrows 150 and will move up and down with the jib boom 138 as indicated by arrows 152. Those skilled in the art will recognize that the above-described boom configuration comprises an articulated boom for the aerial work platform 10.

Figure 2A:
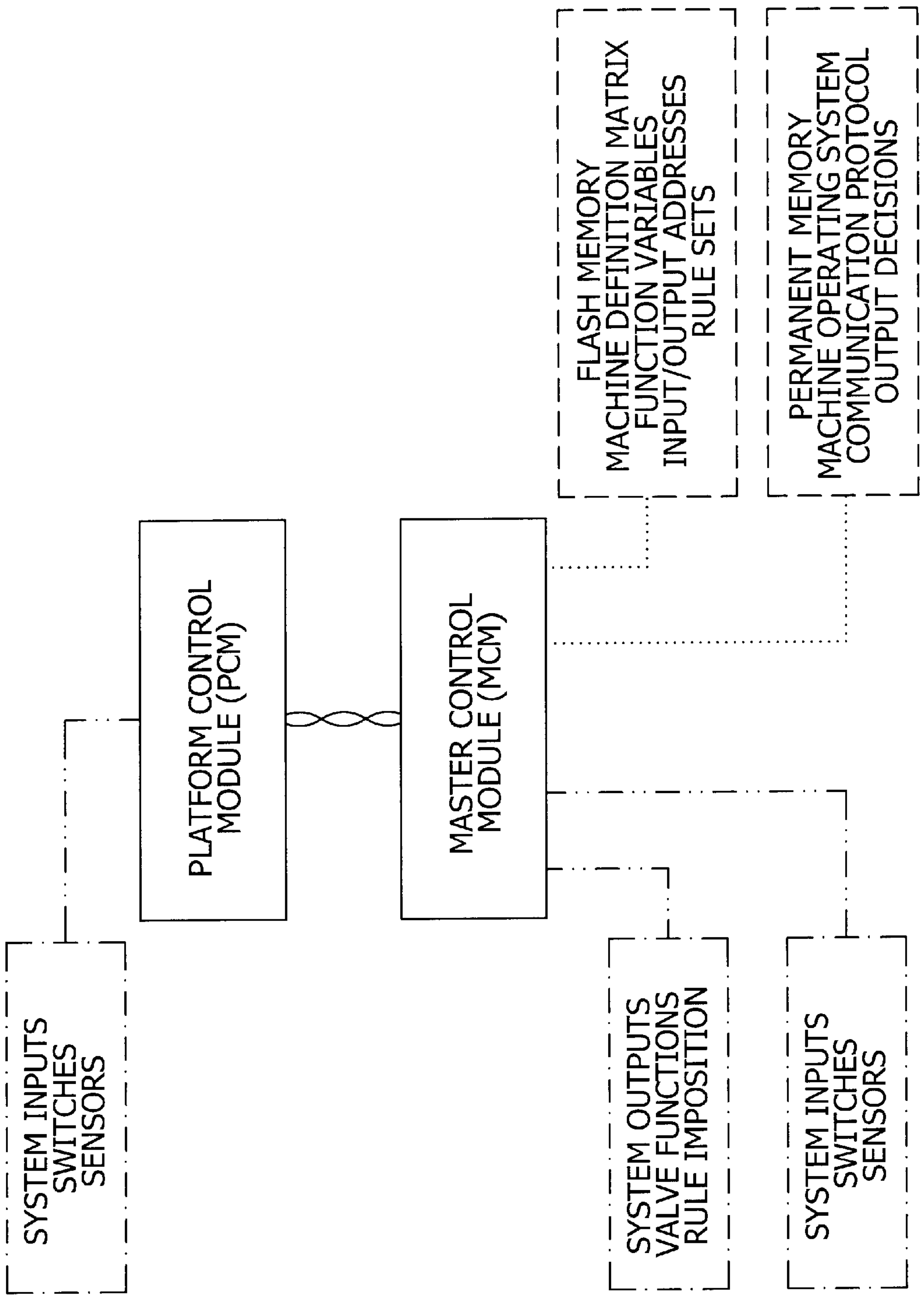
FIG. 2A is a block diagram of a preferred embodiment of the control area network according to the invention.
Figure 2B:
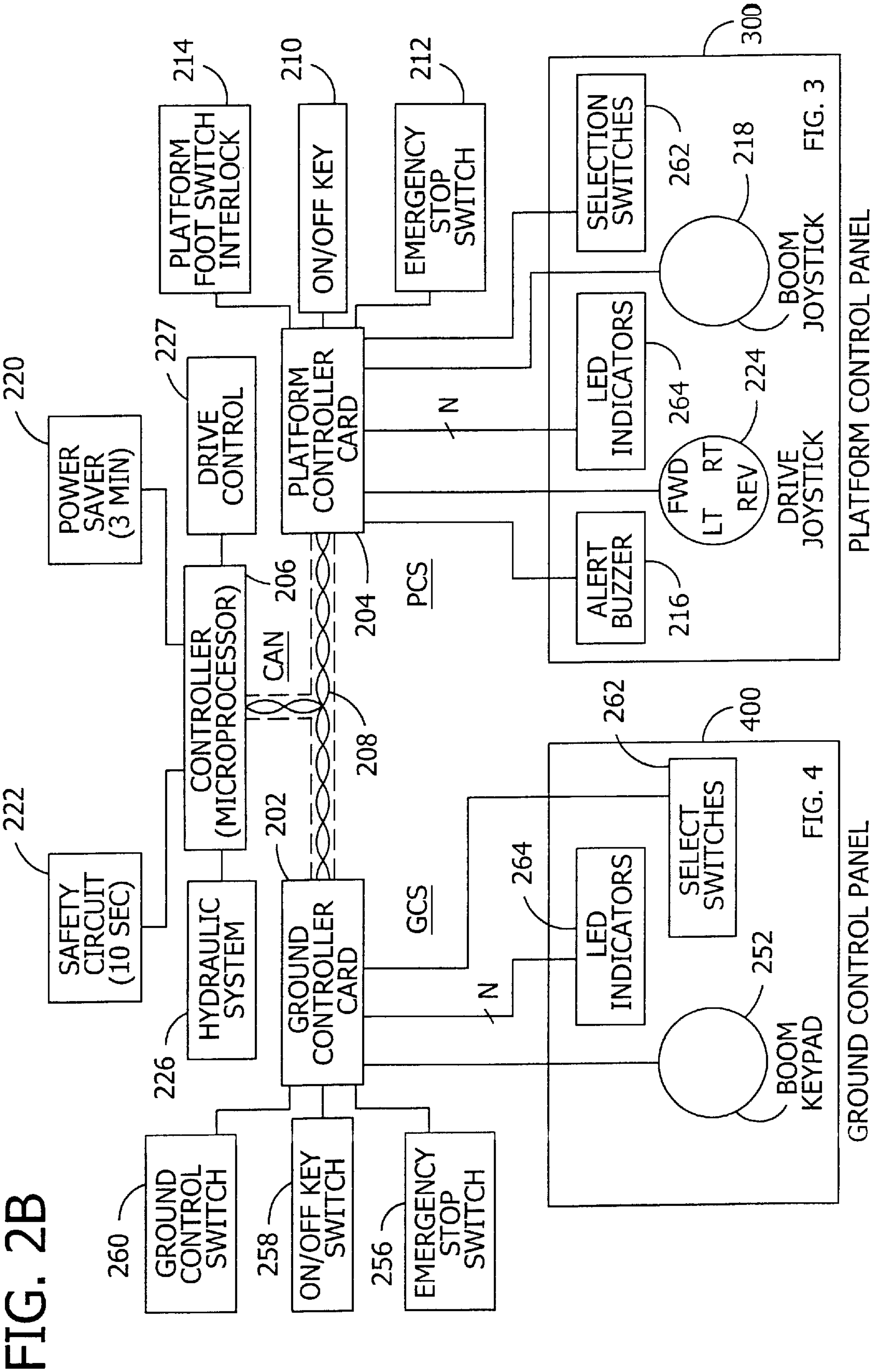
FIG. 2B is a block diagram of a preferred embodiment of a CAN-based boom control system according to the present invention.

The boom control system as illustrated in FIGS. 2A and 2B has a configuration which meets requirements for control system flexibility, programmability, multiplexing and quick design cycle time. In general, the work platform control system consists of two primary components, a ground control station (GCS) illustrated in the left portion of FIG. 2B and a platform control station (PCS) illustrated in the right portion of FIG. 2B. The two components are linked to be utilized as a system which responds to instructions from an operator. The components are limited by a controller area network (CAN), which may be any network such as a local area network having a microprocessor at each node or may be a single computer controlled network having a ground controller card 202 and a platform controller card 204 for providing information to a computer based controller 206 via a bus 208 such as twisted pair cables. Preferably, the ground control station GSC serves as the master controller and the platform control station PSC serves as a remote input device to the master controller. Therefore, the controller 206 may be located on the base with the ground controller card 202. Appendix C illustrates the inputs and outputs to and from the stations. However, those skilled in the art will recognize that this configuration is not a necessary limitation of the invention and that the controller 206 may be remotely located from both the ground controller card 202 and the platform controller card 204, or, in some cases, the controller 206 may be located in combination with the platform controller card 204, in each case with a variety of inputs and outputs.

It is contemplated that controller 206 may have an input/output port (not shown) which would interface with another computer such as a laptop computer which would allow the system of the invention to be configurable in that the system outputs and their logical relationships with other system inputs and outputs may be varied by the laptop. The set of instructions which describe the inputs, outputs, and their relationships, constitutes the system database (Appendix A) having features (Appendix B) which controls the operation of the aerial work platform 10. As indicated below in detail, controller 206 may be programmed with parameters which define boom operation by specifying one or more of the following:

- parameters which define an envelope within which the boom is permitted to operate;
- parameters which cause the boom to automatically retract in certain positions in response to certain operator requested actions;
- parameters which define ramping up speeds or ramping down speeds of boom movement;
- parameters which define sequential functions of the boom;
- parameters which define simultaneous functions of the boom; or
- parameters which define time periods based on the status of various switches during which time periods the boom is permitted to operate.

Controller Area Network (CAN)

FIGS. 2A and 2B are block diagrams of a preferred embodiment of a CAN-based boom control system according to the present invention. In general, the CAN would have at least two nodes: (1) a ground control station GCS (or module) which is the primary control and includes a ground controller card 202 and a ground control platform 400; and (2) a platform control station PCS (or module) which is a secondary control and includes a platform controller card 204 and a platform control platform 300. The controller 206 for controlling the operation of a hydraulic system 226 for driving the boom and for controlling a drive control 227 for propelling the base may be part of either node or a separate node. The platform control station PCS, the ground control station GCS and the controller 206 are interconnected to each other via a shielded, twisted wire pair 208 serving as the CAN-bus. Optionally, the drive control 227 may constitute a fourth node connected to the CAN. Alternatively, discrete wiring may be used to interconnect the drive control 227 and/or any interlock switches to the controller 206 to minimize tampering or unsafe operation. The PCS interfaces with all of the platform inputs with the exception of a drive control speed potentiometer (not shown) located on the drive joystick 224 and is used to calibrate the joystick. The drive control system directional and speed inputs (forward, reverse and high speed) and a high speed request signal are connected through a multiplex system and are arbitrated by a system database (Appendix A). In order to provide redundancy, to avoid tampering and to provide a check of the interlock switches in any position, each switch may be a single pole, double throw (SPDT) switch which when operating properly would provide one open circuit and one closed circuit.

Platform Control Station (PCS)

Referring to FIG. 2B, to operate any boom function from the platform control station PCS, the operator places a key on/off switch 210 located on the ground panel in an "ON" position. In addition, a second requirement in order to operate any boom control function is that a platform emergency stop switch 212 be set or pulled out by the operator. In addition, it is also required that a platform foot switch interlock 214 be set such as by being depressed by the operator. After these three (3) interlocks are made, the operator may select and activate any boom function. Any or all of these interlocks may be hardwired to the control 206 or may communicate to the control 206 via the CAN. If hardwired, their status is still monitored by the CAN to implement various safety features.

Figure 3:
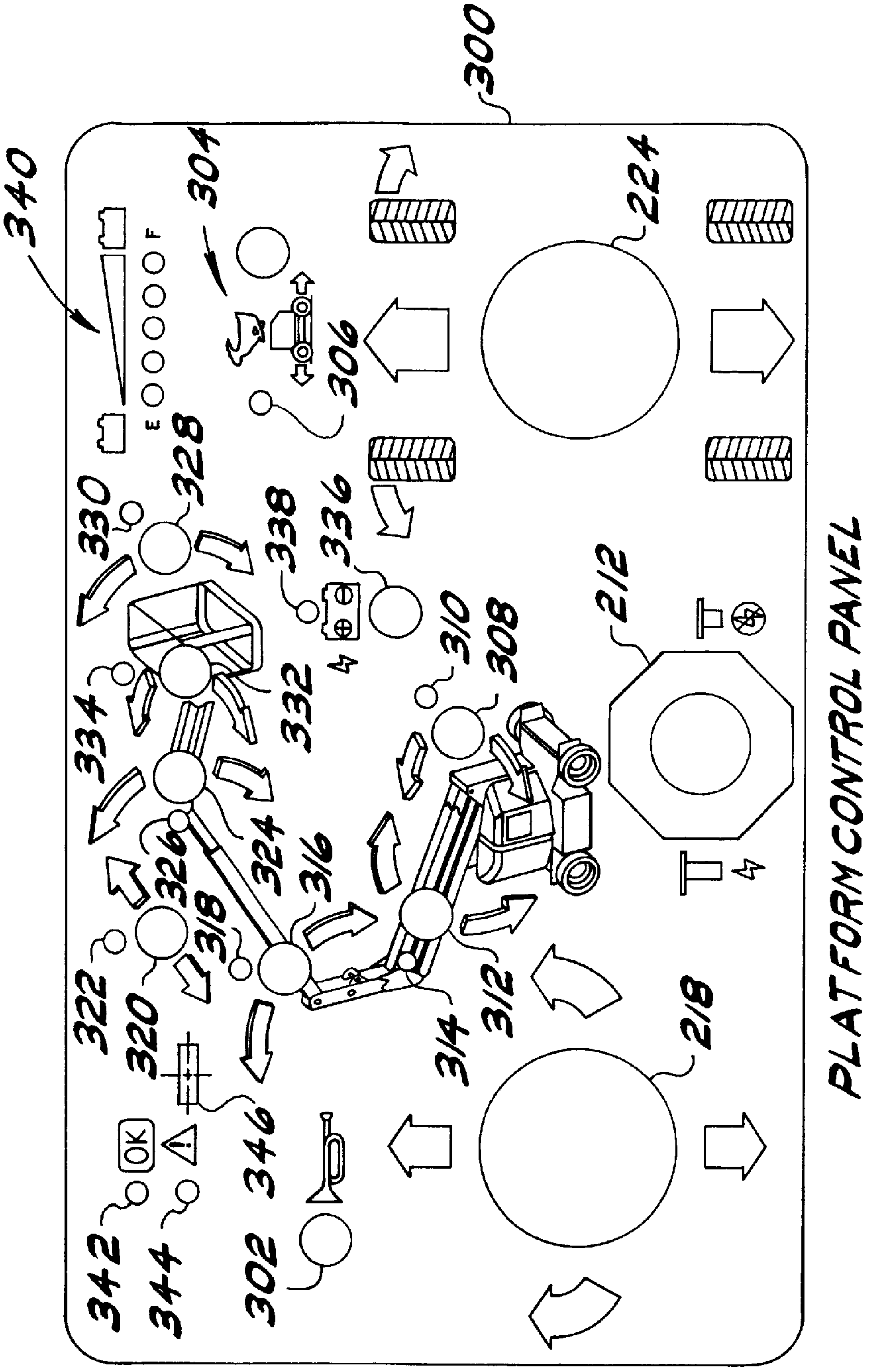
FIG. 3 is a top plan view of a platform control panel module suitable for use with a CAN-based boom control system according to the present invention.

To select a boom function, the operator must press a button which corresponds to the desired boom section to be operated on a platform control panel 300 (or module) as shown in FIG. 3. In particular, each boom section has a boom function button associated therewith which, when pressed, selects the particular boom section for operation and indicates such a selection by energizing an alert buzzer 216 which will beep once. This indicates to the operator that the particular function has been selected. In addition, each section has an associated LED which will be illuminated to further indicate the particular boom section which has been selected for operation by the operator. The boom section select switches 262 (i.e., function buttons) and the LED indicators 264 associated with each boom section will be described below with regard to FIGS. 3 and 4.

Once a boom section has been selected by the operator, the operator may then activate a boom function by actuating a directional motion input switch such as by moving a boom joystick 218 on the platform control panel 300 in the desired direction. In response, controller 206 will provide appropriate signals to a hydraulic system 226 which controls a pump motor and/or valves at a speed to respond proportionately to the increasing or decreasing deflection of the boom joystick 218. To stop any further motion of the activated function, the operator simply releases the boom joystick 218 to its centered position.

The system includes interlocks and timers which may limit further movement of the boom. In cases where a boom section has been selected and moved and the movement is complete, so that the motion has stopped, the selected function will remain active for a brief period of time until one of the following events occurs: (1) no further motion of the selected boom section is requested by the operator for more than a preset period of time such as ten seconds; (2) the platform foot switch interlock 214 is released by the operator; or (3) the emergency stop switch 212 is placed in the stop position. If any three of these events occurs, the previously selected boom section and activated function become inactive and the alert buzzer 216 will indicate that the function has been inactivated with two short beeps. In the event that the foot switch interlock 214 is released by the operator, the alert buzzer 216 will indicate the release with two short beeps.

One skilled in the art will recognize that these safety features for interlocking and limiting operation may be implemented in a number of ways. For example, as illustrated in FIG. 2B, a separate safety subroutine or circuit 222 (as required by ANSI or EN280 safety standards for aerial equipment utilizing computer controls) may be associated with the controller 206 to monitor the foot switch 214 and emergency stop switch 212 as well as to keep track of the time since the operator has last moved the selected boom section. Alternatively, the safety subroutine or circuit 222 may be implemented by modular software within the controller 206 which provides the monitoring function. In general, the safety subroutine or circuit monitors boom controller input signals such as provided from the foot switch 214, stop switch 212, and boom joystick 218 via platform controller card 204 and CAN 208 to the controller 206.

In addition, it is contemplated that the system may also include a power saver feature. If there is no activity at the platform control station PCS for a preset period of time such as three minutes, the system will deselect all functions and will go into a power saving (sleep) mode. The alert buzzer 216 will beep two times to indicate the change in system status. Inactivity is defined as the absence of any boom or drive motion for the preset three minute period. As with the safety interlock noted above, this feature may be implemented by a separate power saver subroutine or circuit 222 as shown in FIG. 2 or may be implemented by software which is executed by the controller 206. In the power saving mode, all panel LEDs are commanded off by controller 206 and any circuit ignition is disabled. In this power saving mode, the apparatus can appear to be "OFF." However, the control system and network are still functional and consume a small amount of power. When operating from the platform control station PCS, the operator can recover from the power saving (inactivity) mode by activating or recycling the foot switch 214 or the emergency stop switch 212. This feature also functions as a safety measure in that an operator cannot permanently engage the foot switch 214 with some foreign object. For example, if an operator on platform 136 wedges a foreign object such as a beverage container in the foot switch 214 to hold the switch in its closed or down position, this feature would prevent operation of the system from the platform after no activity for the preset period. As a result, an operator could not defeat the purpose of the foot switch by permanently engaging it with a foreign object.

Additional power saving features are contemplated and may also be implemented. For example, in cases where the operator or person responsible for apparatus stowage forgets to turn off the on/off key switch 210 controlled by the operator, the batteries could run down after an extended period of idle time. To help prevent or minimize this situation, the controller 206 may activate a ground motion alarm after a preset period of extended inactivity such as one-half hour. At that point, the motion alarm will remain active for a period of time such as one minute. After another preset period such as a half hour of inactivity, the alert cycle will start over again sounding the motion alarm. In effect, the machine is indicating a signal to remind the operator to turn the machine off.

In summary, the invention preferably includes a timer subroutine and/or circuit in combination with or programmed with the controller 206 including a 10 second safety subroutine and/or circuit 222, and a three (3) minute power saver subroutine and/or circuit 220. The safety circuit 222 monitors motion output signals initiated by the operator by activating the boom section select switches or boom joystick. The safety circuit 222 prevents the boom controller 206 from responding to the boom joystick if there has been no boom movement or boom section selection via a boom section select switch for a first time period, such as 10 seconds. This prevents inadvertent activation and/or movement of the boom if an operator accidentally touches the boom joystick more than 10 seconds after the operator's last command. This safety circuit assumes that the operator is working on the platform rather than moving it and essentially kills the boom joystick so that it will not move the boom if the operator accidentally bumps it while working. The power safety circuit 220 monitors the boom controller input signals and deactivates the controller 206 when the power saver circuit 220 detects no boom controller input signals for a second time period, such as three (3) minutes. This powers down the system and requires the foot switch 214 to be cycled (opened and closed) in order to power up the system. The power saver function also provides a safety feature because it prevents an operator from jamming a can or other foreign object in the foot switch to keep it permanently closed.

To power one or more of the wheels 102 to operate the drive and steer functions of the apparatus, there is also a series of interlocks that must be in place. In particular, it is required that the platform emergency stop switch 212 be set or pulled out and the platform foot switch interlock 214 must be set or depressed. When these two interlocks are made, the operator may select and activate the drive or steer functions of the apparatus. All drive motion is controlled by a drive control joystick 224 on the platform control panel 300. The control joystick 224 proportionately controls the drive speed in two separate ranges, low range and high range. The drive speed range is selected by pressing a drive range switch 304 on the platform control panel 300. The high range speed can only be activated when the boom is cradled and a boom cradle interlock switch is closed to indicate that the boom is in the cradled position and an angle sensor indicates that the slope angle on which the platform rests is less than five degrees. The boom cradle interlock switch and/or the angle sensor constitute a position detector circuit or, if implemented in software, constitute a position detector subroutine. To stop motion of the active drive or steer function, the operator may release the drive joystick 224 to its centered position, release the platform foot switch interlock 214 or release the emergency stop switch 212. As noted above, these switches would be SPDT switches. For example, when the boom is cradled, one side of the boom switch would provide a closed circuit and the other side would provide an open circuit. When the boom is not cradled, the one side would provide an open circuit and the other side would provide a closed circuit. If both sides are simultaneously open or closed, this would indicate to the microprocessor of controller 206 that a malfunction has occurred (see displays 346 and 460, below). If the platform 100 is equipped with crab steering or four wheel steering, position sensors may be located on each wheel to indicate wheel position. Preferably, the wheels would be parallel and straight before transitioning for one type of steering to another. In addition, the control 206 may be programmed to automatically orient all wheels to be parallel and straight ahead when changing from one type of steering to another.

The platform control station PCS has two primary input banks: a switch input matrix and a discrete digital input terminal strip. The controller 206 which is preferably located at the platform scans a 4×5 switch matrix for operator commands, and monitors discrete digital inputs from the interlock inputs such as the foot switches, jib limit switches and emergency stop switch. The interlocks are input into the control system so that they may be included in the database description of the machine. Certain interlocks are also routed to the apparatus interlock subroutine or circuits which are external to the control system.

The following is a description of the elements as illustrated in FIG. 3 which form the switch matrix inputs. A horn switch 302 operates the electrical horn located at the base unit 100 to allow the operator to warn others around the aerial work platform 10. A range switch 304 selects the speed range (high range or low range) for the drive system. As noted above, the operation of this function is governed by the position of the interlocks and the cradle switch. A range LED indicator 306 indicates the status of the range switch 304. A base swing function switch 308 generates a request to rotate the boom support 106. The base will rotate 180° in either direction. In general, for all boom functions, their activation, direction, and speed would be dictated and controlled by the boom joystick inputs and each function is governed by the position of the interlock inputs. A base swing function LED indicator 310 illuminates when the base swing function switch 308 has been selected such as by being depressed by the operator.

A riser boom function switch 312 may be activated by the operator to select the riser boom 120 for movement. The riser boom 120 will raise or lower the level of the platform 136. A riser boom function LED indicator 314 illuminates when the riser boom function switch 312 is activated. A main boom function switch 316 generates a request to move the main telescoping boom 124. The main boom 124 operates about pivot point 128 and will raise and bring inward the position of the platform 136, or lower and force outward the position of the platform 136. A main boom function LED indicator 318 illuminates when this function is selected by the operator. A telescoping boom function switch 320 generates a request to extend or retract the telescoping boom 124. The telescoping boom 124, depending on the angle of the riser boom 120, will extend and force upward or retract and force inward the platform 136. A telescoping boom function LED indicator 322 illuminates when the telescoping boom function is selected by the operator. A jib boom function switch 324 generates a request to move the jib boom 138. The jib boom 138 operates to pivot about a pivot point in response to the parallelogram configuration 142 of the jib boom and when below the horizontal position, the function will raise and force outward or lower and force inward the position of the platform 136. When the jib boom 138 is above the horizontal position, its function will raise and force inward or lower and force outward the position of the platform 136. A jib boom function LED indicator 326 illuminates when this function is selected.

A platform level function switch 328 generates a request to automatically level the platform 136. A platform level function LED indicator 330 illuminates when this function is selected. A platform rotate function switch 332 generates a request to rotate the platform. The platform 136 of the machine will rotate 90° in either direction in a level plane as indicated by arrows 150 in FIG. 1 and will move up and down with the jib boom as indicated by arrows 152. A platform rotate function LED indicator 334 will illuminate when this function is selected. An emergency power switch 336 generates a request to actuate an emergency hydraulic pump. The emergency hydraulic pump is driven by an electric motor connected to the emergency 12 volt dc battery. When this function is selected, an emergency power LED indicator 338 illuminates.

The terminal strip inputs for the platform control station PCS are as follows: a joystick drive signal A corresponding to a drive command to the controller 206; a joystick drive signal B corresponding to a drive direction to the controller; a drive joystick steer right signal corresponding to a steer right command to the controller; a drive joystick steer left signal corresponding to a steer left command to the controller; the foot switch interlock; the emergency stop interlock; a jib low angle interlock limit switch which is tripped when the jib boom 138 is at a low angle; a jib low angle redundant interlock limit switch which is tripped when the jib boom 138 is not at a low angle; a boom joystick x-axis input which is a proportional analog input to the controller representing the boom joystick x-axis position; and a boom joystick y-axis input which is a proportional analog input to the controller representing the boom joystick y-axis position.

The platform control station PCS has two primary output banks: the LED output matrix and the discrete digital output terminal strip. The platform controller refreshes a 4×4 LED matrix for indicating functions and feedback and also controls discrete digital outputs for alarms. The states of the LEDs at the platform station are determined by the system database (Appendix A) and are sent to the platform control station from the ground control station GCS via the system CAN network.

The platform LED matrix outputs for the apparatus are LEDs 306–338 as noted above. In addition, the LED matrix outputs include a battery bank (48 vdc) LED array 340 indicating the state of the 48 volt battery bank, a status OK LED 342 indicating no errors present in the system, and a status warning LED 344 indicating errors present in the system. The platform control panel 300 also includes a numeric display 346 which reports the system errors and status. For example, errors may include inconsistent switch indications. The cradle switch cannot indicate that the boom is in the cradle at the same time that the angle switch indicates that the boom is at an angle since, by definition, a cradled boom is at zero degrees angle. Also, the extended switch and the retracted switch cannot both be activated simultaneously. Some error would cause the control 206 to disable the unit whereas other errors may allow for limited or unlimited operation.

The terminal strip outputs for the platform control station PCS are a single function alert signal which is a buzzer which indicates switch presses and various other function control states. There is one cable which connects the platform control station PCS to the ground control station GCS. Between the two stations there are eleven signal and power supply wires. There is a terminal strip on the control card of the platform control station terminal strip which interfaces the control station to an external processor such as a laptop computer. A tilt alarm is provided as part of the platform control station.

Ground Control Station (GCS)

The ground control station GCS has two primary input banks from the switch input matrix and from the discrete digital inputs of the interface connectors. The controller 206 which is located at the ground control station scans a 4×5 switch matrix of operator inputs and monitors discrete digital inputs for interlocks and warnings such as the tilt sensor and boom limit switches.

Figure 4:
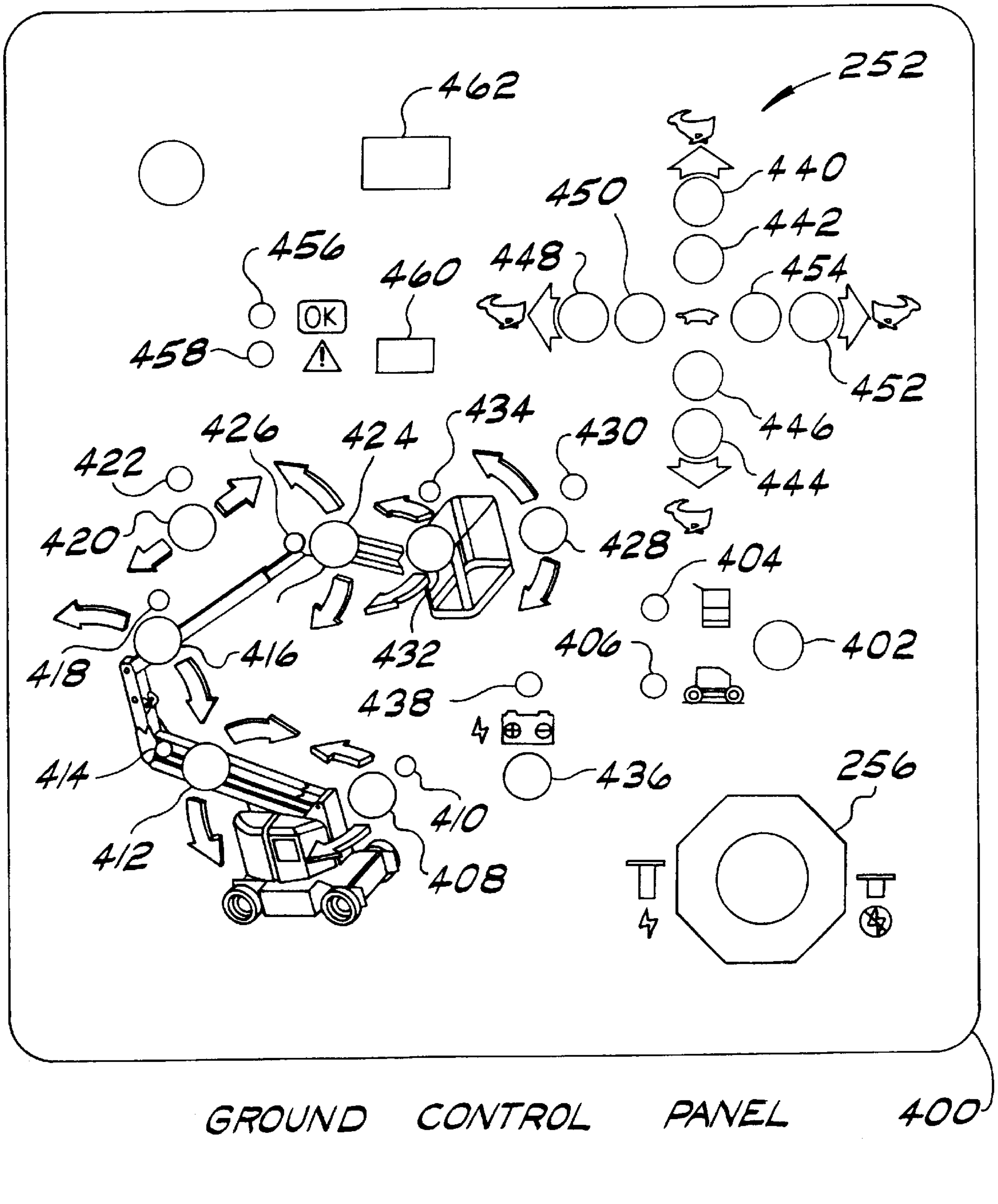
FIG. 4 is a top plan view of a ground control panel module suitable for use with a CAN-based boom control system according to the present invention.

The ground switch panel matrix inputs are as follows. FIG. 4 illustrates the ground control panel 400 (or module). It includes a ground control interlock switch 402 which corresponds to the platform foot switch 214 at the platform control station. A platform control LED indicator 404 is illuminated when platform control has been selected whereas a ground control LED illuminator 406 is illuminated when ground control is in use. A base swing function switch 408 generates a request to rotate the boom support 106. A base swing function LED indicator 410 illuminates when the base swing function switch has been activated.

A riser boom function switch 412 generates a request to move the riser boom 120. A riser boom function LED indicator 414 illuminates when this function is selected. A main boom function switch 416 generates a request to pivot the main telescoping boom 124, which request is indicated by illuminating a main boom function LED indicator 418. A telescoping boom function switch 420 generates a request to extend or retract the telescoping boom, which function is indicated by illuminating a telescoping boom function LED indicator 422. A jib boom function switch 424 generates a request to move the jib boom 138, which function is indicated by illuminating a jib boom function LED indicator 426.

A platform level function switch 428 generates a request to level the platform 136 which request is indicated by illuminating a platform level function LED indicator 430. A platform rotate function switch 432 generates a request to rotate the platform, which request is indicated by illuminating a platform rotate function LED indicator 434. An emergency power switch 436 generates a request for the emergency hydraulic pump, which request is indicated by illuminating an emergency power LED indicator 438.

The ground control panel 400 also includes a boom motion input switch for controlling boom directional movement, such as a boom keypad 252. Alternatively, the boom keypad 252 may be replaced by a joystick. In the keypad 440, an up high speed switch activates movement of the selected boom section upward at fast pump motor speed. An up low speed switch 442 activates movement of the selected boom section upward at a slow pump motor speed. A down high speed switch 444 activates movement of the selected boom section downward at fast pump motor speed. A down low speed switch 446 activates movement of the selected boom section downward at a slow pump motor speed. A clockwise high speed switch 448 activates movement of the selected boom section clockwise at a fast pump motor speed. A clockwise low speed switch 450 activates movement of the selected boom section clockwise at slow pump motor speed. A counter-clockwise high speed switch 452 activates movement of the selected boom section counter-clockwise at fast pump motor speed. A counter-clockwise low speed switch 454 activates movement of the selected boom section counter-clockwise at slow pump motor speed. In other words, the GCP 400 provides two speed control of the movement of the boom via keypad 252 whereas the PCS 300 provides variable speed control of the movement of the boom via joystick 218.

The ground control station GCS includes the following discrete inputs to the controller 206, a low brake release pressure input indicates that the hydraulic pressure is too low to release the wheel brakes for drive operations; a tilt switch input indicates that the apparatus is tilted (i.e., the tilt switch is active); a main boom down input indicates that the main boom 124 is in the full down position; a main boom not down input indicates when the main boom 124 is not in the full down position, a main boom high angle input indicates when the main boom angle is high (e.g., over 50°); a main boom not high angle input indicates when the main boom angle is not high; a main boom extended input indicates when the main boom 124 is extended over a maximum amount (e.g., 33"), a main boom not extended input indicates when the main boom 124 is not extended; a main boom retracted input indicates when the main boom 124 is fully retracted; and a main boom not retracted input indicates when the main boom 124 is not fully retracted.

As with the platform control panel 300, the ground control panel 400 includes a status ok LED 456, a status warning LED 458 and a numeric display 460.

The ground control station GCS has two primary output banks to the LED output matrix and the high side driver output bank (master controller driver card). The driver card is connected to the devices on the apparatus through several connectors located on the GCS enclosure. The ground controller refreshes a 4×4 LED matrix for indicating functions and feedback and also controls digital outputs for valves, alarms, solenoids, and relays. The states of the LEDs at the ground station are determined by the system database and are sent to the ground station control LED/switch interface card via the system CAN network.

In addition, the ground control panel 400 includes an hour meter 462 indicating the hours of operation of the aerial work platform 10. Also, the ground control panel 400 includes an emergency stop switch 256 and an on/off key switch 258 (see FIG. 2) corresponding to those aspects of the platform control panel 300.

The ground control panel 400 also includes a ground control interlock switch 260 which corresponds in function to the platform foot switch interlock 214. The ground control interlock switch 260 is located on the surface of the ground control panel 400 and must be continuously depressed by the operator in order to maintain active control of the aerial work platform 10 from the ground control panel 400.

As a result, the controller 206 is responsive to the boom section select switches (312, 316, 320, 324, 328, 332, 412, 416, 420, 424, 428 and 432 ) and the boom motion input switches for controlling the hydraulic system to effect boom motion. It is contemplated that the controller may be adapted to cause the hydraulic system to discontinue boom motion for a previously selected boom section if its boom motion input switch is in the selected (second) position when the boom motion select switch selects a current boom section different from the previously selected boom section. Further, the boom controller may be adapted to cause the hydraulic system to initiate boom motion for the currently selected boom section after discontinuing movement of the previously selected boom section whereby only one boom section may be moved by an operator at a time and boom motion for the previously selected boom section is discontinued before the currently selected boom section moves.

Figure 5A:
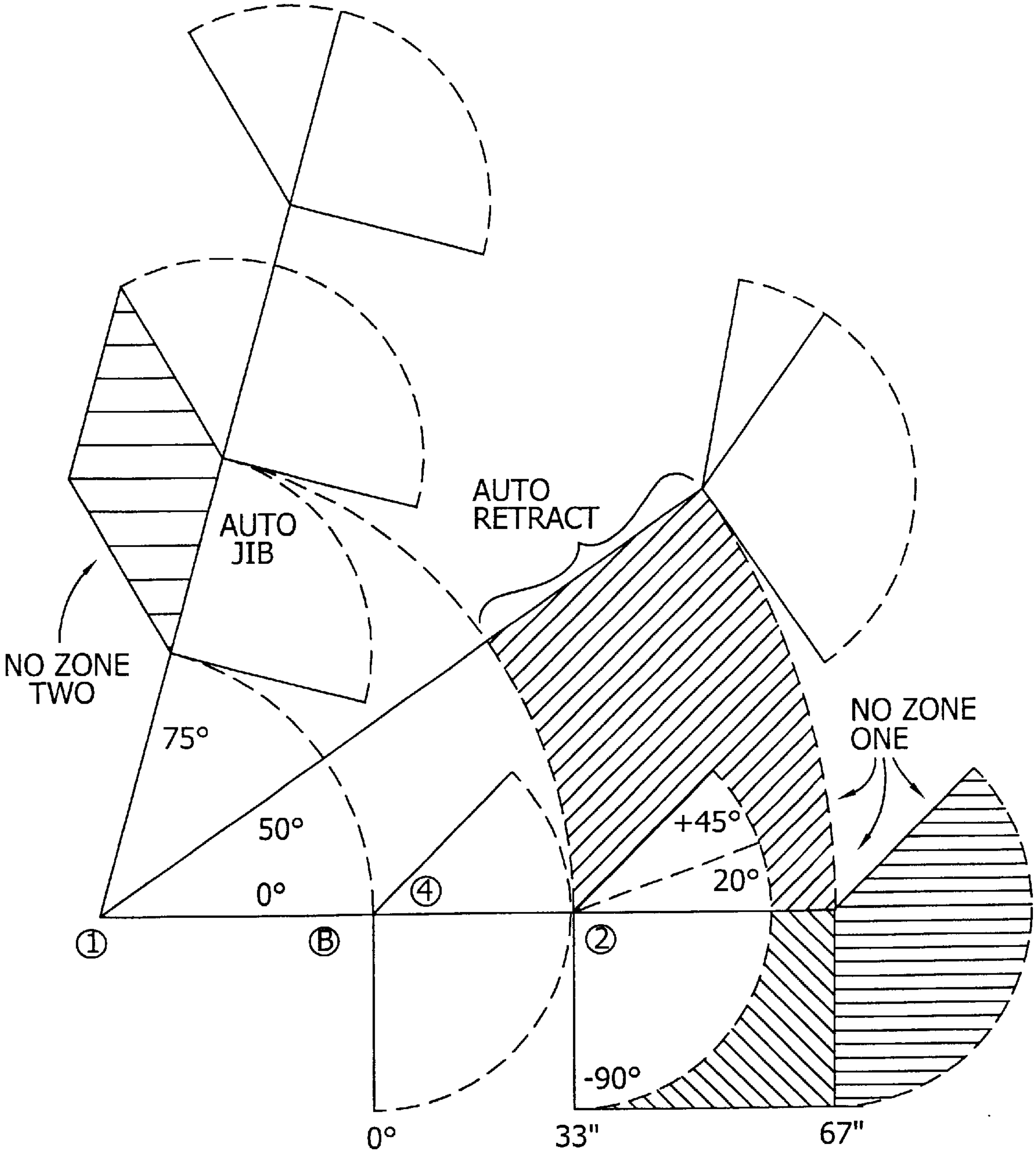
FIG. 5A is a geometric diagram of zones of operation which define a safe working envelope within which movement is restricted by an envelope control system of a CAN-based boom control system according to the present invention.

Referring to FIG. 5, there are four limit switches which monitor the position of the boom. The limit switches provide inputs to the controller 206 and are incorporated into the rule database describing the apparatus. For diagnostic purposes, each limit switch has a redundant contact wired to the controller 206. Limit switch 1 is a main boom angle limit switch which measures the main boom angle with horizontal and is active whenever an angle of the main boom 124 is low or below a preset maximum such as 50°. Limit switch 2 is a main boom extension limit switch which measures the main boom extension and is active whenever the main telescoping boom is extended less than a preset amount such as 33". Limit switch 3 is a main boom retracted limit switch which detects the main boom position and is active whenever the main telescoping boom is near fully retracted, such as within 9". Limit switch 4 is a jib boom angle limit switch which measures the jib boom angle with horizontal and is active whenever the jib boom angle is below a preset amount such as 30° above horizontal. Optionally, a fifth limit switch not illustrated in FIG. 5 may be employed in the form of a main boom cradle limit switch which monitors the main boom position and is active when the main boom and riser boom are in the most down position.

Two conditions can exist which may limit the movement of the boom. The first condition is referred to as position A and includes positions when the angle of the jib boom 138 relative to horizontal is not low and the main boom 124 is extended less than 33". In position A, requests to raise the jib boom 138 are ignored. In position A, the jib down function is allowed; however, the jib boom will automatically be activated if a down boom retract command is issued while position A exists. A second condition is referred to as position B and includes positions when the angle of the main boom 124 relative to horizontal is low and the main boom 124 is extended more than 33". In position B, requests to extend the main boom 124 are ignored whereas the retract function is always allowed; however, the retract function will be automatically activated if the main boom down command is issued while position B exists. As illustrated in FIG. 5, this defines shaded area NO ZONE ONE which identifies an area in which the platform is not permitted to operate. In addition, this defines a shaded area NO ZONE TWO in which the jib is not permitted to operate. It should also be noted that when the boom moves from an angle of above 50° to an angle of less than 50°, the controller 206 initiates an auto-retract mode to retract the main boom so that the platform is maintained within the acceptable operating zones.

The following table summarizes the zone of "no" operation and the position of the boom as detected by switches for positions A and B:

| ZONES: | ANGLE | EXTENSION | JIB |
|---|---|---|---|
| NO ZONE ONE | 0° to 35° | 33" to 67" | N/A |
| NO ZONE TWO | 35° to 75° | 0" to 33" | 0° to 45° |

| SWITCHES: | POSITION A | POSITION B |
|---|---|---|
| 1. ANGLE | 0° to 5° | 50° to 75° |
| 2. EXTENSION | 0" to 33" | 33" to 67" |
| 3. FULL RETRACT | 0" to 6" | 6" to 67" |
| 4. JIB | −90° to −20° | −20° to +45° |

An envelope controller suitable for use with an aerial work platform having a boom comprising a plurality of boom sections, a hydraulic system for moving the boom sections, a work platform supported by the boom, a base supporting the boom, a boom controller for providing a boom control signal to the hydraulic system, the boom control signal controlling the hydraulic system to control motion of one of the plurality of boom sections, the envelope controller comprising:

As a result, the invention includes a position detector subroutine or circuit for detecting a position of the boom sections or work platform relative to a position of the base and a position limitation subroutine or circuit (implemented in hardware or in software in the controller 206) for inhibiting a boom control signal being provided to the hydraulic system from the controller 206 when the position detector circuit indicates that the detected position of the boom sections or work platform relative to the position of the base will exceed an envelope limit whereby the envelope controller limits the position of the boom sections or work platform relative to the position of the base to within a predefined region. In addition, the invention includes an auto retract subroutine or circuit for retracting the extendible section when the operator moves the boom sections or work platform outside the predefined region to maintain the work platform within the predefined region.

The apparatus operates according to a defined set of rules. The rule database in conjunction with certain controller variables defines the operation of the aerial work platform 10.

The controller area network CAN includes a multiplexing system which performs the specific function of passing information between the nodes of the boom control system. The network is designed to be utilized within the parameters and guidelines of the Society of Automotive Engineers, Specification No. J1939. The multiplexing system exists within the SAE J1939 network as an independent segment. A segment is distinguished by all devices seeing the signal at the same time. The multiplex system is referred to as a boom electrical control segment sub-network, and may be connected together with other segments by devices which include repeaters, bridges, and routers. Collectively, all the segments together form the SAE J1939 vehicle-wide network.

There are five devices which are part of the boom control electrical segment controlled by a message format. Each device has a discrete input and output address space. The devices are the platform input/output node, the boom joystick input/output node, the ground output node, the ground control switch input node, and the master controller node MCN.

The master control module MCM is located inside of the ground control station enclosure. The MCM is the main controller 206 for the entire system and its primary function is to evaluate the system rule database and arbitrate data to and from other devices on the network. Operation of the electrical system is dictated by a predefined database (Appendix A). The database describes the relationships between the devices in the electrical system. The MCM evaluates the database and arbitrates data to and from each specific device in the system. The MCM implements the class 1 multiplexing database engine to evaluate the system database residing in a non-volatile flash memory of the device.

One of the nodes of the CAN is a platform input/output node. This is a generic node which interfaces to a switch panel matrix and asserts LED outputs as commanded by the MCM. This node also allows discrete digital inputs and outputs. Another node is a boom joystick node which interfaces to dual-access analog joysticks such as mechanical joysticks with potentiometers or inductively coupled joysticks with independent access outputs. The joystick node translates the joystick positions into a series of switches and directions and reports the data to the master control module. The ground control LED/switch panel node is also a generic (non-intelligent) node which interfaces to a switch panel matrix and asserts LED outputs as commanded by the master control module. This node is located inside of the ground control station enclosure. The power output driver node contains a bank of high side output drivers which connect to and control the apparatus components. This node is located inside the ground control station enclosure. The hardware for the platform control station serves the power output driver node and, additionally, serves the boom joystick node. The hardware for the master control module serves the power driver output node as well as the master control module network I/O data space. The network, however, sees these nodes as occupying independent address space. The nodes may be separated into independent hardware components without any impact on the overall system.

One aspect of the invention includes a soft start or ramping function in which the controller responds to the boom section select switches and boom motion input switches to control the hydraulic system to gradually move the selected boom section in accordance with the boom direction signal. As shown in FIG. 6, the controller causes the hydraulic system to move the selected boom section at a velocity which accelerates at a preset linear rate from zero velocity to a preset maximum velocity. For example, line 600 illustrates a situation when the operator is requesting movement of a boom section at maximum velocity. This request could be indicated by maximum deflection of the boom joystick 218 or by selecting one of the high speed switches of the ground control panel 400. In this situation, the controller 206 provides a digital signal which begins a zero velocity and steadily ramps up to maximum velocity over a two second period. (This digital signal is converted to an analog signal by an analog-to-digital converter, not shown, and the converted analog signal is suppled to the hydraulic system 226.) In another example, line 602 illustrates a situation when the operator is requesting movement of a boom section at half or 50% of maximum velocity. This request could be indicated by partial deflection of the boom joystick 218 or by selecting one of the low speed switches of the ground control panel 400. In this situation, the controller 206 provides a digital signal which begins a zero velocity and steadily ramps up to 50% of maximum velocity over a one second period. It is contemplated that the ramping rates may be nonlinear and that the ramping period (shown in FIG. 6 as two seconds) could be 0.5 seconds or less or 2.0 seconds or more. In addition, the ramping period may vary depending on the function. For example, the ramping period for lifting a boom section could be 0.5 seconds whereas the ramping period for lowering a boom section could be longer and set at 0.75 seconds to more slowly begin the lowering movement. On the other hand, the ramping period for rotating a boom section could be even longer and set at 1.5 seconds to effect rotational movement which is initialed even more slowly than the lowering movement. As a result, the controller 206 constitutes a boom ramping controller, responsive to the boom section select switches and boom motion input switches, for controlling the hydraulic system to move the selected boom section in accordance with the boom direction signals generated by the boom motion input switches. The boom ramping controller is adapted to cause the hydraulic system to move the selected boom section at a velocity which accelerates at a preset rate from zero velocity to a preset velocity, as shown in FIG. 6.

It is also contemplated that the controller 206 may be programmed to cause the hydraulic system to substantially instantly discontinue movement of the selected boom section in response to operator input indicating that the motion of the selected boom section should be terminated or indicating that another boom section should be moved. For example, if the operator suddenly released boom joystick 218 and allowed it to return to its central position, the digital signal provided by the controller 206 would be terminated causing the hydraulic system to immediately terminate movement of the selected boom section. This provides a safety feature in that the operator has the option to immediately discontinue boom section movement in the event of a dangerous or unsafe condition. This aspect of the invention and the immediate termination of movement of a boom section is illustrated in FIG. 6 by line 600 dropping from maximum speed to zero speed at 2.5 seconds and by line 602 dropping from 50% maximum speed to zero speed at 2.0 seconds.

Figure 6A:
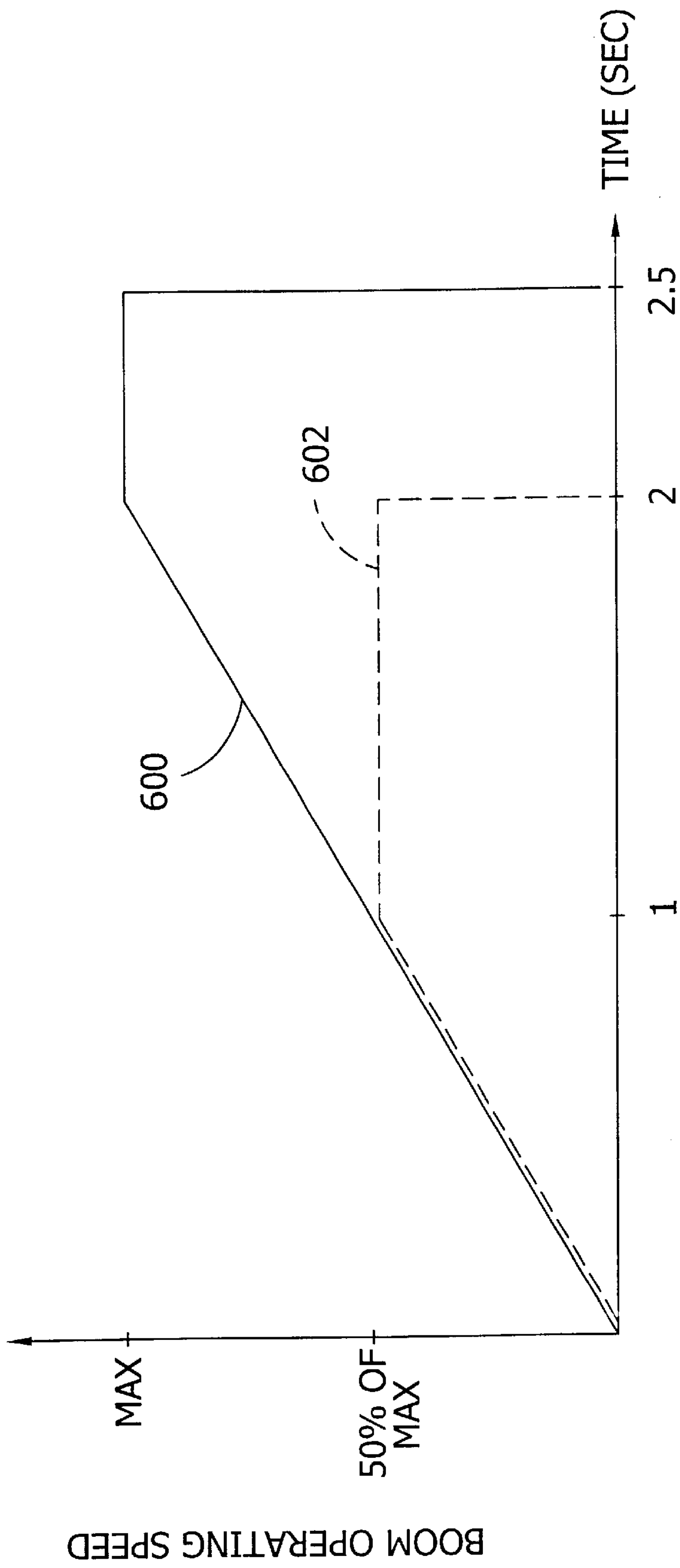
FIG. 6A is a graph illustrating the operation of a soft start subroutine or circuit for use with a CAN-based boom control system according to the present invention.
Figure 6B:
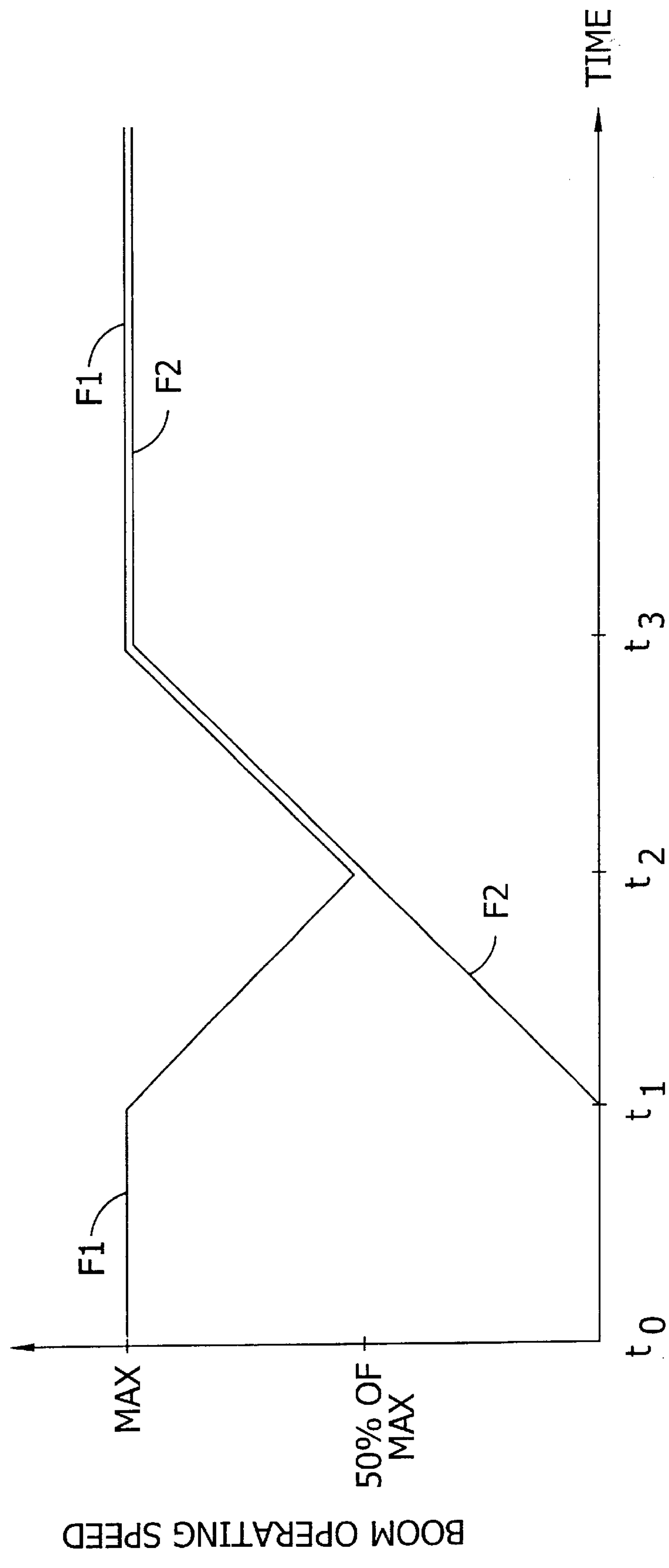
FIG. 6B is a graph illustrating the operation of a soft start subroutine or circuit for use with a CAN-based boom control system according to the present invention wherein an operating function F1 is ramped down to 50% while a new function is simultaneously ramped up to 50% and both functions are ramped up to 100% thereafter.

As shown in FIG. 6B, it is also contemplated that the control 206 permit a movement of the boom in a second direction while the boom is being moved in a first direction. For example, assume that member 134 of the telescoping boom 132 is being extended (which we will call function F1) and the operator would like to raise the jib boom 138 (which we will call function F2). As shown in FIG. 6*b*, at time $t_0$ function F1 is operating to extend the telescoping boom at maximum speed. At time $t_1$ the operator requests that function F2 be executed in addition to function F1. In response, the controller 206 ramps down function F1 to 50% and simultaneously ramps up function F2 so that at time $t_2$ both functions F1 and F2 are at 50% of maximum operating speed (which is called a transition speed). Thereafter, the controller ramps up functions F1 and F2 simultaneously to maximum at time $t_3$. It is contemplated that the ramp down rate and ramp down point for function F1 could be different than the ramp up rate and point for function F2. For example, function F1 could be ramped down to 75% while function F2 is ramped up to 30% and then the two functions could be ramped up simultaneously or sequentially thereafter, either at the same rate of ramp up or at different rates or at rates which are proportional to each other. It is also contemplated that any and all of the parameters (e.g., ramp rates, maximum speed, transition speed, speed when other functions are operating, speed when the unit is horsepower challenged, etc.) relating to operation of each function may be programmable by an operator in the field. For example, either the platform or base station would have a key pad which would allow the operator to indicate the maximum speed for a particular function, the ramp up rate or the ramp down rate as illustrated in FIGS. 6A and 6B, the maximum speed or the transition speed. Also, a separate set of parameters can be programmed or implemented in the event that several functions are being executed simultaneously and the apparatus is horsepower challenged. For example, reduced maximum and transition speeds could be executed when three or more functions are being simultaneously executed so that the apparatus is not horsepower challenged.

Figure 7A:
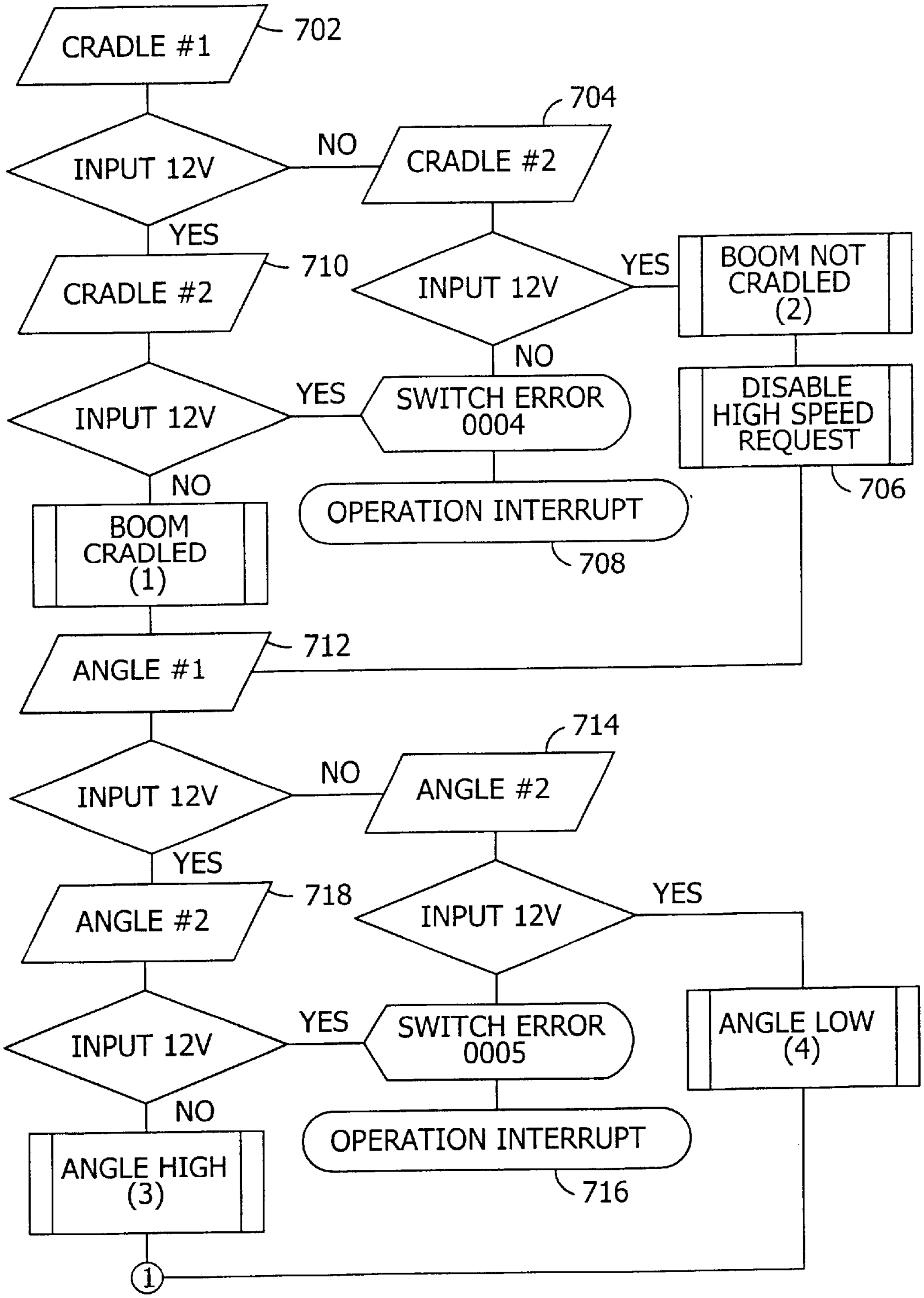
FIGS. 7A–7H are flow charts illustrating the interlocks and envelope control according to the invention.

Referring to FIGS. 7A–7H, the operation of the microprocessor of the controller 206 according to the invention is illustrated particularly with regard to envelope control, error detection and automatic retraction. In FIG. 7A, the status of the cradle switch is first evaluated. The cradle switch has two sides which, as noted above, should have opposite status so that when side 1 of the cradle switch is high, side 2 of the cradle switch is low and vice versa. At step 702, side 1 of the cradle switch is evaluated. If side 1 is low, the microprocessor proceeds to step 704 to consider side 2 of the cradle switch. If side 2 is high, the indication is that the boom is not cradled and in state (2) so that the high speed drive is disabled at step 706. If side 2 of the cradle switch is low (and since side 1 is also low) an error is indicated since both sides should not be low and operation is interrupted by step 708.

If side 1 of the cradle switch is high, the microprocessor proceeds from step 702 to step 710 to evaluate the status of side 2 of the cradle switch. If side 2 is also high, an error is again indicated since both sides should not be high and operation is interrupted by step 708. If side 2 is low, this indicates that the boom is cradled and in state (1) and the microprocessor can proceed with the next sub-routine to consider the angle switch.

At step 712, side 1 of the angle switch is considered. If side 1 is low, side 2 of the angle switch is considered by step 714. If side 2 is high, this indicates that the angle of the boom is low (e.g., less than 50°) so that the boom is in state (4) and operation of the apparatus can proceed. If side 2 is low (and since side 1 is also low) an error is indicated and operation of the apparatus is interrupted by step 716. If side 1 of the angle switch is high, the microprocessor proceeds from step 712 to step 718 to consider the status of side 2 of the angle switch. If side 2 is also high, an error is again indicated and the apparatus operation is interrupted by step 716. If side 2 is low, this indicates that the angle of the boom is equal to or greater than 50° and the boom is in state (3). The microprocessor can now proceed to the next subroutine.

Figure 7B:
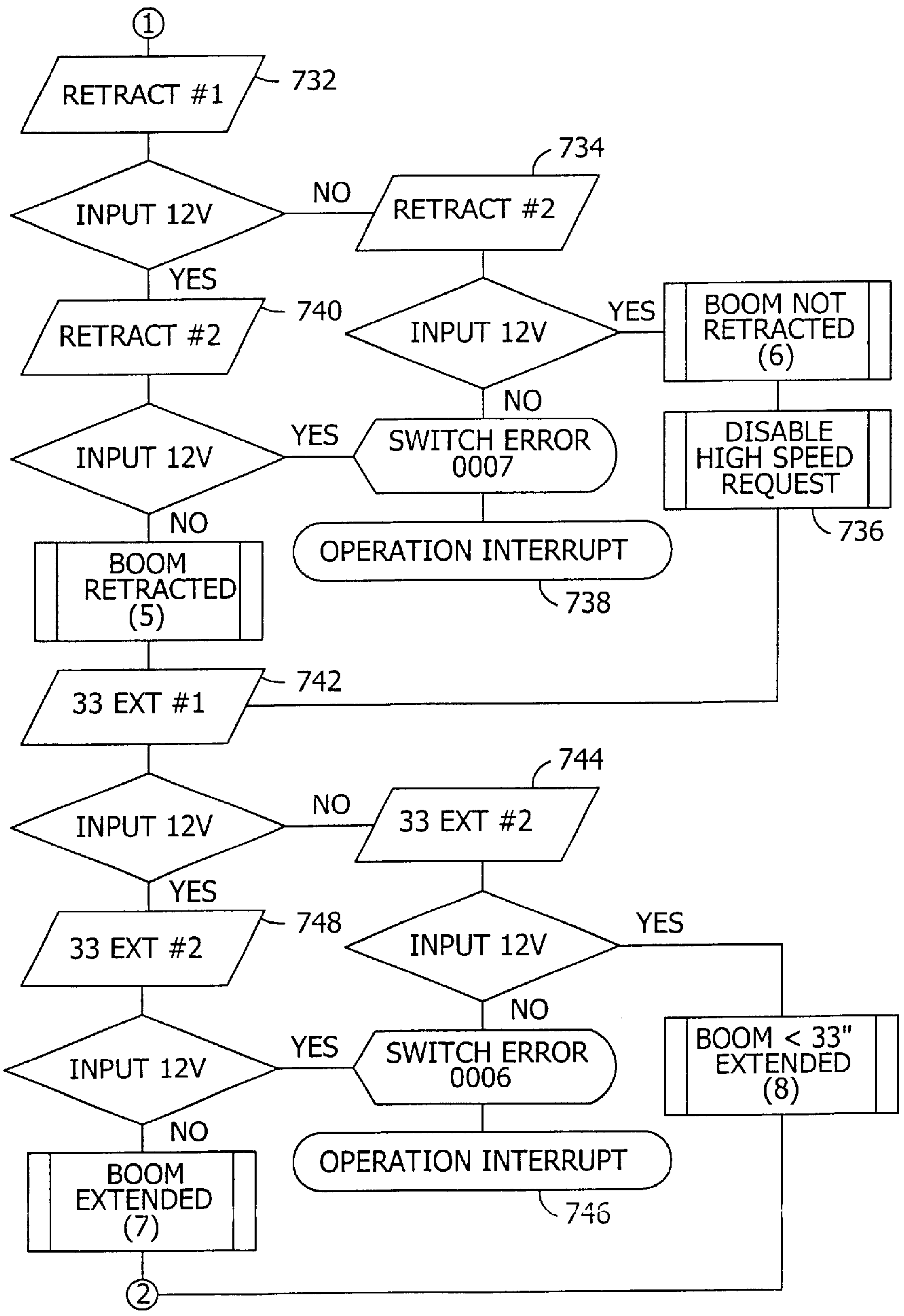

In FIG. 7B, the microprocessor determines whether member 134 has been extended from the telescoping boom 124. At step 732, the status of side 1 of the retract switch is evaluated. If it is low, the status of side 2 of the retract switch is evaluated by step 734. If side 2 is high, this indicates that the boom has not been fully retracted and in state (6) so that the high speed drive is disabled by step 736. If side 2 is low (and since side 1 is also low), an error is indicated so that operation of the apparatus is interrupted by step 738. If side 1 of the retract switch is high, side 2 of the retract switch is evaluated. If side 2 is also high, an error is again indicated and operation of the apparatus is interrupted by step 738. If side 2 is low, this indicates that the boom has been fully retracted which means that the boom is in state (5).

Next, the boom extension switch is considered. In general, this switch indicates when the boom has been extended more than a preset amount such as 33 inches. At step 742, side 1 of the extension switch is evaluated. If side 1 is low, the microprocessor proceeds to step 744 to evaluate side 2 of the extension switch. If side 2 is high, this indicates that the boom has been extended less than 33 inches and that the boom is in state (8). If side 2 of the extension switch is low (and side 1 is low), an error is indicated and operation of the apparatus is interrupted by step 746. If side 1 of the extension switch is high, the microprocessor proceeds to evaluate side 2 of the extension switch at step 748. If side 2 is also high, an error is again indicated and operation of the apparatus is interrupted by step 746. If side 2 is low, this indicates that the boom has been extended by 33 inches or more and the boom is considered to be in state (7).

Figure 7C:
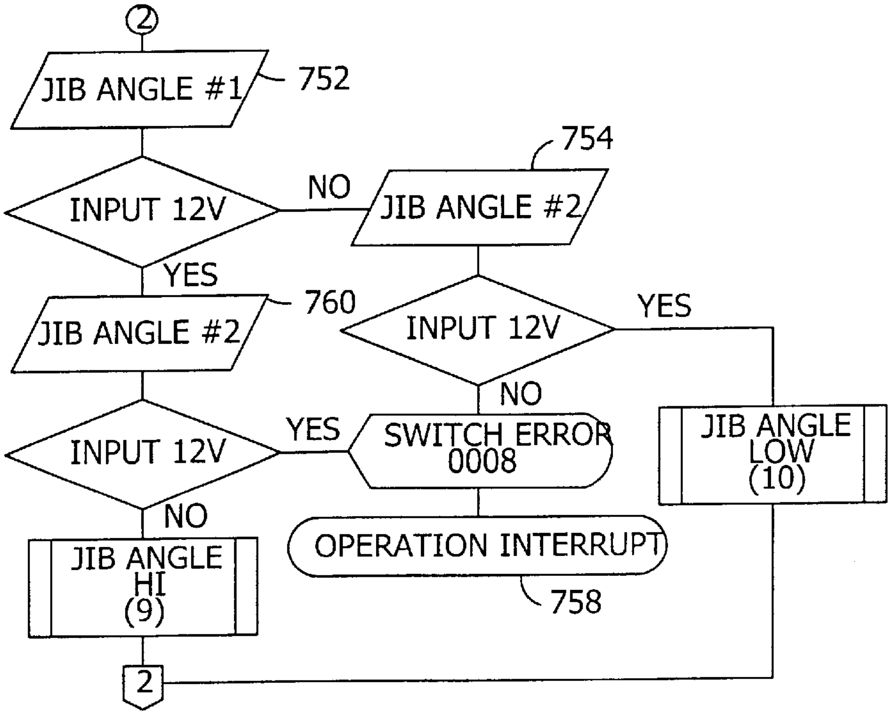

In FIG. 7C, the jib angle switch is evaluated to determine the angle of the jib boom 138. At step 752, side 1 of the jib angle switch is evaluated. If it is low, the microprocessor proceeds to step 754 to evaluate side 2 of the jib angle switch. If side 2 is high, this indicates that the jib angle is low (e.g., less than or equal to 15° above horizontal) so that the boom is in state (10). If side 2 is low (and side 1 is low), an error is indicated that so operation of the apparatus is interrupted by step 758. If side 1 is high, the microprocessor proceeds to step 760 to evaluate side 2 of the jib angle switch. If side 2 is also high, a switch error is indicated and operation of the apparatus is interrupted by step 758. If side 2 is low, this indicates that the jib angle is greater than 15° above the horizontal and that the boom is in state (9).

The following table summarizes the various boom states and the corresponding state numbers.

Table of Boom State

| State | Switch | Status of Boom |
|---|---|---|
| (1) | cradle | cradled |
| (2) | cradle | not cradled |
| (3) | boom angle | angle ≧50° |
| (4) | boom angle | angle <50° |
| (5) | retract | retracted |
| (6) | retract | extended |
| (7) | extension | extended >33" |
| (8) | extension | extended <33" |
| (9) | jib angle | angle >15° above horizontal |
| (10) | jib angle | angle ≦15° above horizontal |

Figure 7D:
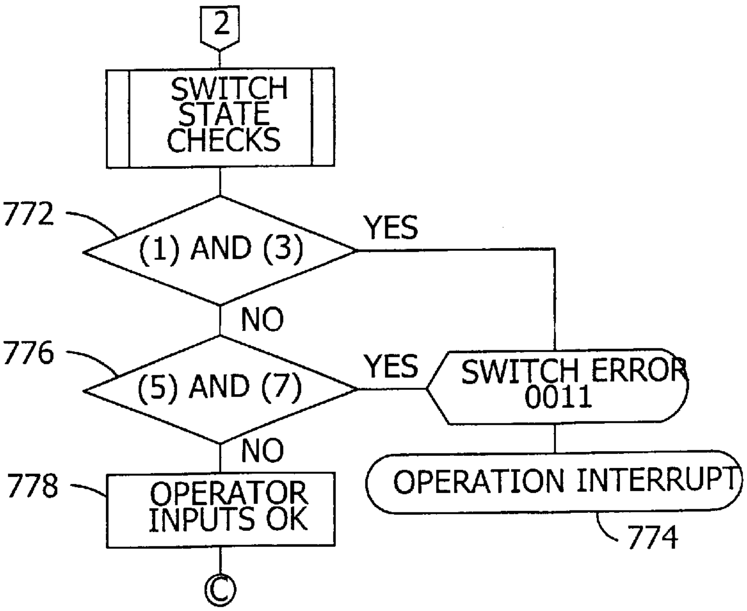

In FIG. 7D, the microprocessor compares the state of the cradle and angle switches and the state of the extend and retract switches. If either of these comparisons indicates that the switches compared are inconsistent with each other, operation of the apparatus is interrupted. In particular, the cradle and angle switches are compared at step 772. If the cradle switch indicates state 1 and the angle switch indicates state 3, this is an inconsistency because the cradle switch is indicating that the boom is cradled and the angle switch is indicating that the boom is at a high angle (not cradled) so that a switch error is detected and operation is interrupted by step 774. Otherwise, the microprocessor proceeds to step 776 to compare the status of the retract and extend switches. If the retract switch indicates state 5 and the extend switch indicates state 7, this is an inconsistency because the retract switch is indicating that the boom is retracted and the extend switch is indicating that the boom is extended more than 33 inches (not retracted). Therefore, the microprocessor proceeds to step 774 to interrupt operation of the apparatus. Otherwise, the operator inputs are considered acceptable at step 778. Thereafter, the microprocessor will execute one of the sub-routines illustrated in FIGS. 7E–7H, depending on the position of the platform.

Figure 5B:
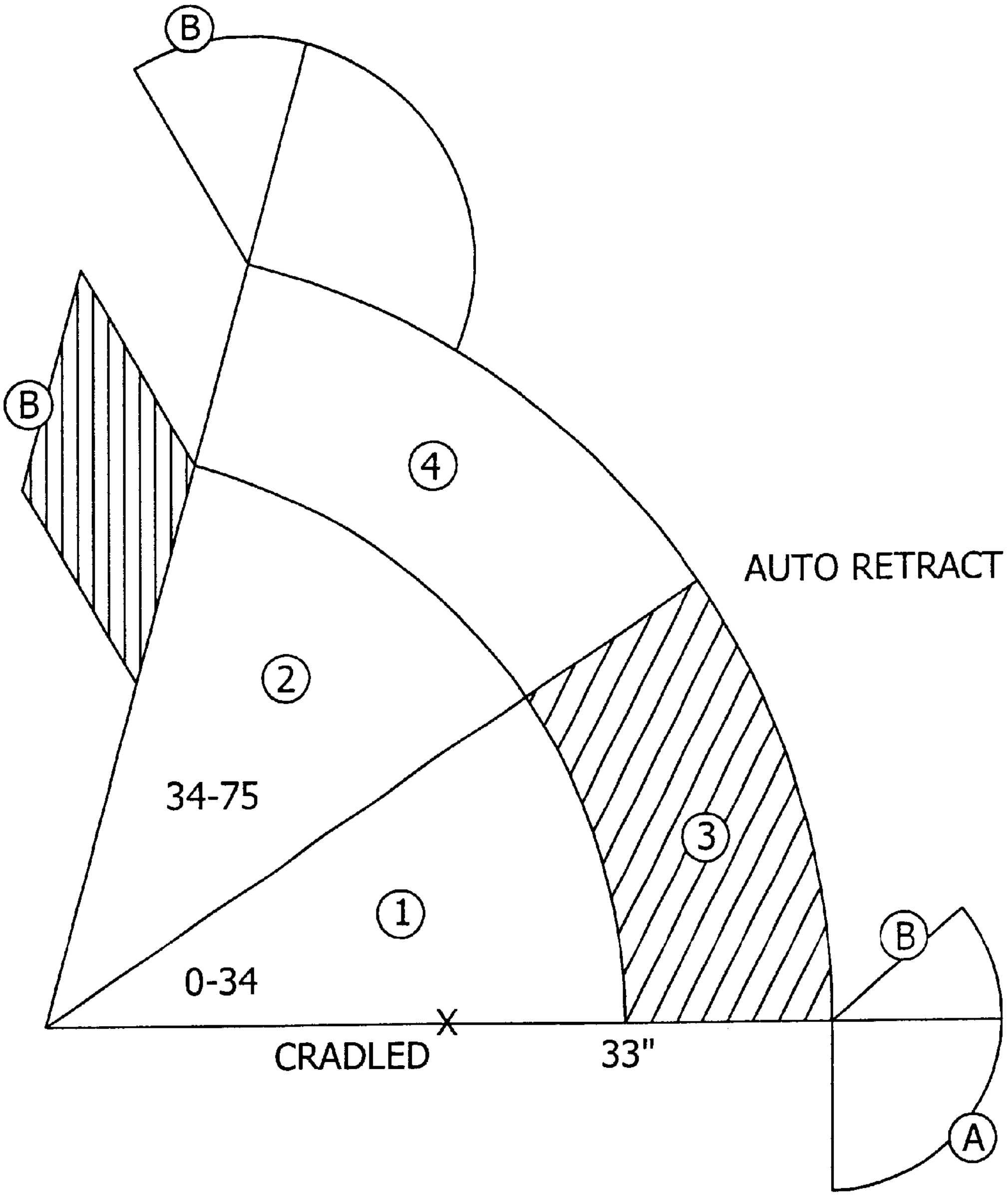
FIG. 5B is a geometric diagram of the zones of autoretraction of a CAN-based boom control system according to the present invention.
Figure 7E:
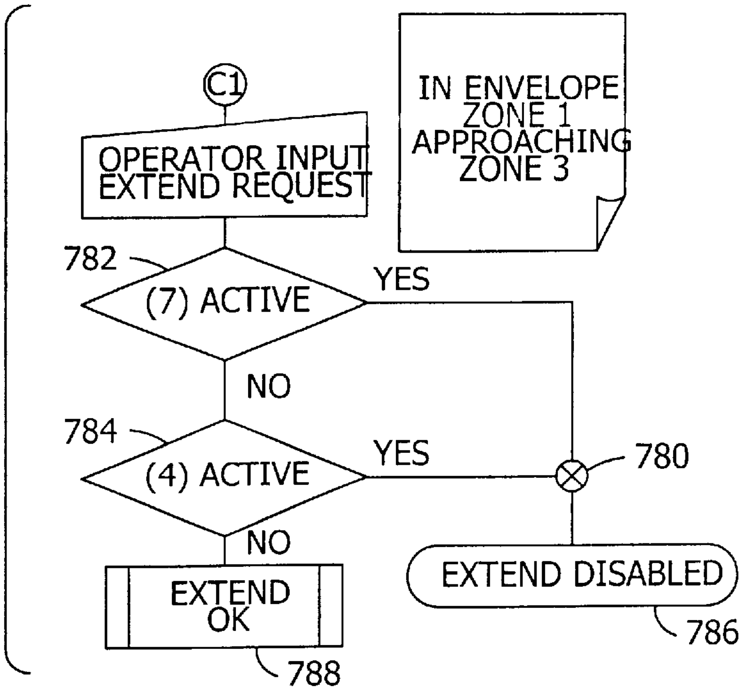

If the platform is in envelope zone 1 and the operator is indicated instructions to extend the boom which would cause the platform to approach zone 3 (which is a non-operating zone), as indicated in FIG. 5B, the microprocessor will execute the sub-routine of FIG. 7E. At step 782, the status of the extension switch is considered. At step 784, the status of the angle switch is considered. Reference character 780 indicates an AND gate. If the extension switch indicates state 7 (boom extended greater than 33 inches) and the angle switch indicates state 4 (an angle less than 50°), two high inputs are provided to AND gate 780 so that the microprocessor proceeds to step 786 to disable any further extension of the extendable member 136. For any other state combinations, when in zone 1 and approaching zone 3, extension is permitted by step 788.

Figure 7F:
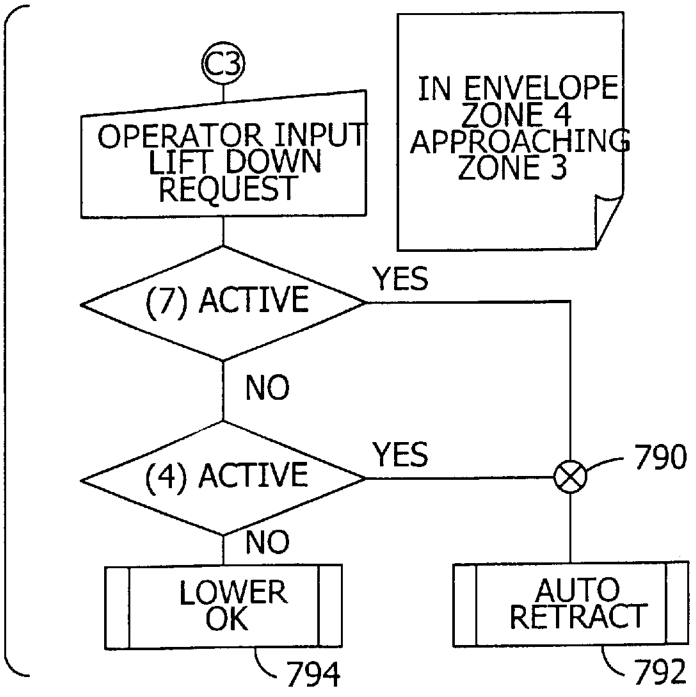

If the platform is in envelope zone 4 and the operator is attempting to approach zone 3 by lowering the boom, the sub-routine illustrated in FIG. 7F is executed. If the extension and angle switches indicate states 7 and 4 to AND gate 790, the microprocessor executes the auto-retract feature at step 792 to retract the extendable boom until it is in a safe operating zone. Otherwise, the operator is permitted to lower the boom at step 794.

Figure 7G:
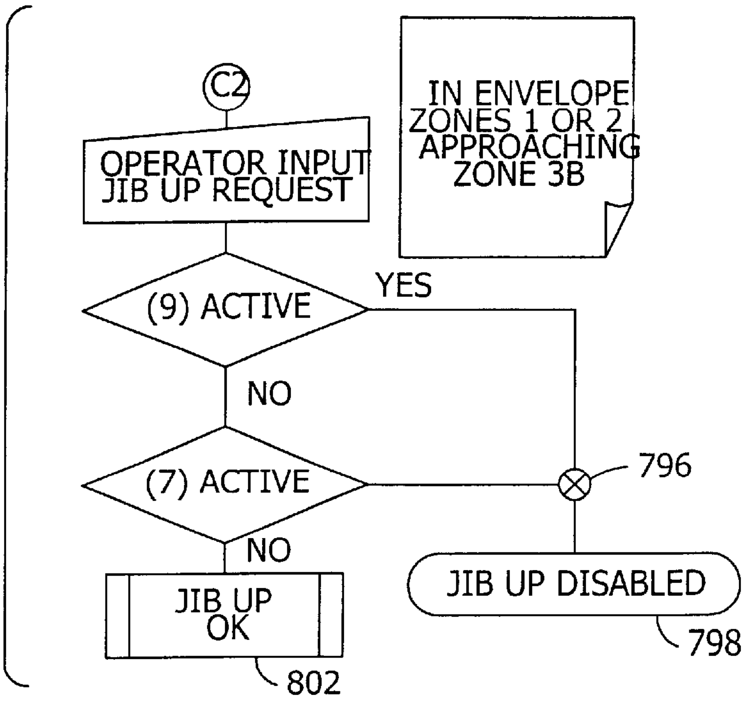

The sub-routine of FIG. 7G relates to a situation where the platform is in envelope zones 1 or 2 and the operator is attempting to approach zone 3B (which is a non-operating zone) by raising the jib. If the jib angle switch indicates state 9 and the extension switch indicates state 7 so that high inputs are provided to AND gate 796, upward movement of the jib boom is disabled by step 798. Otherwise, the microprocessor allows upward movement of the jib boom by step 802.

Figure 7H:
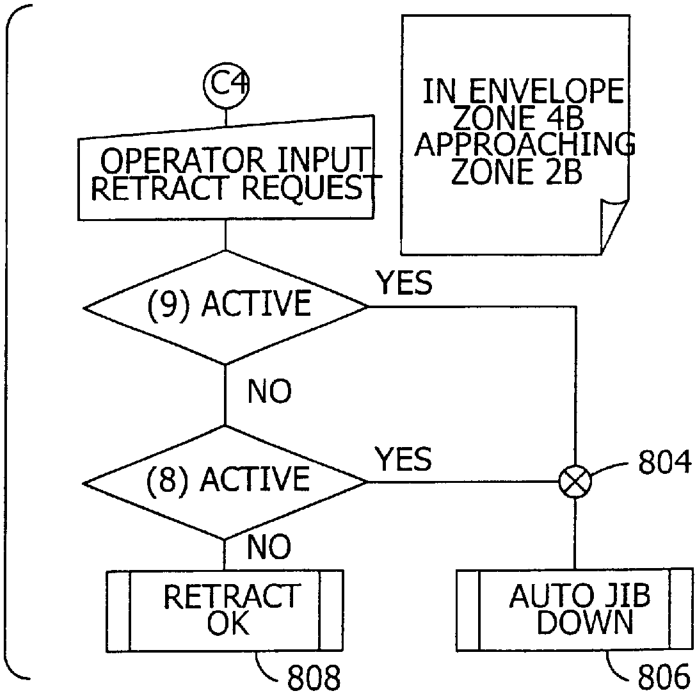

FIG. 7H is the sub-routine applicable when the platform is in zone 4B and the operator is attempting to approach zone 2B (which is a non-operating zone) by retracting the boom. If the jib angle switch indicates state 9 and the extension switch indicates state 8, high signals are provided to AND gate 804 so that the microprocessor executes step 806 to automatically move the jib downward. Otherwise, the microprocessor executes step 808 to allow the operator to retract the boom.

As various changes could be made in the above constructions and methods without departing from the scope of the invention, it is intended that all matter contained in the above description and shown in the accompanying drawings shall be interpreted as illustrative only, and not in a limiting sense.

Appendix A

```
// Snorkel DB Version 1.2
// 02-27-98
// This database will operate all 33/38 machines as described in the
// manual and supports all features of controller rev 1.2
#ifndef DEFAULT_DATABASE
#define DEFAULT_DATABASE
#define NO_DDV        0X0000 // 0X0000 DDV0
#define NO_DDV1       0X0000 // 0X0000 DDV1 (secondary DDV)
#define FILLER        0X0000 // available for database dode expansion
// SNORKEL MCM INPUTS
// ==================
// DID: 0
// DIDADDR: 0
// BASE ADDRESS (INPUTS): 0X0000
#define GND_INP_FULLRET   0X000B // (C1-5) telescoping boom fully retracted
#define GND_RED_FULLRET   0X000F // (C1-6) redundant full retract = not GND_INP_FULLRET
#define GND_INP_LSLT33    0X0003 // (C1-7) limit switch true when extended less than 33"
#define GND_RED_LSLT33    0X000E // (C1-8) redundant extension limit switch = not GND_INP_LSLT33
#define GND_INP_LSANG     0X0002 // (C1-9) limit switch true when main boom angle LOW
#define GND_RED_LSANG     0x000D // (C1-10) redunant boom angle = not GND_INP_LSANG
#define GND_RED_BMCRA     0X001B // (C1-11) redundant boom switch cradled = not GND_INP_BMCRA
#define GND_INP_BMCRA     0X000C // (C1-12) main boom and riser boom full down (cradled)
#define GND_INP_LEVEL     0X001A // (C2-1) Level (tilt) Sensor true when tilted
#define NOT_GND_INP_LEVEL 0X401A // (C2-1) Level (tilt) Sensor (negative pin logic)
#define GND_INP_BRKPSI    0x0019 // (C2-2) True when brake release pressure low
#define GND_INP_ALM1      0x0018 // (C2-3) alarm1 type input drive)
#define GND_INP_ALM2      0x0001 // (C2-4) alarm2 type input (desc)
#define GND_INP_DOM       0x0011 // (C6-S) True (pin grounded) when domestic machine
#define GND_INP_C6_T          0x0006 // (C6-T) Available for use
#define GND_INP_C6_U          0x0012 // (C6-U) Available for use
#define GND_INP_C6_V          0x0007 // (C6-V) Available for use
#define GND_INP_TYPE33        0x0013 // (C6-W) True (pin grounded) when machine type 33 (DDV0-4)
#define CONN_C6_W_DDV     0x0013 // (C6-W) Evaluated into DDV0 bit 4 - do not delete.
#define GND_INP_C6_X          0x0008 // (C6-X) Available for use
#define CONN_C6_X_DDV     0x0008 // (C6-X) Evaluated into DDV1 bit 5 - do not delete.
#define GND_INP_DRERR     0X0016 // Driver Bank Error
#define GND_PSW_GMODE     0X0017 // Ground Control Interlock (Select) Switch
// SNORKEL GROUND SWITCH NODE
// ==========================
// DID: 9
// DIDADDR: 0
// BASE ADDRESS INPUTS: 0X1200
// The ground switch node matrix is mapped into the system
// with the following addresses. (the matrix is a scanned
// row - column array
#define GND_PSW_EXTND   0X1201 // GCS Telescoping Boom Switch
#define GND_PSW__LIFT   0X1202 // GCS Main Lift Boom Switch
#define GND_PSW_RISER   0X1203 // GCS Riser Boom Switch
#define GND_PSW_SWING   0X1204 // GCS Body Swing Switch
#define GND_PSW___JIB   0X1206 // GCS Jib Boom Switch
#define GND_PSW_EMPWR   0X1209 // GCS Emergency Pwr Switch
#define GND_PSW_ROTAT   0X1207 // GCS Platform Rotate Switch
#define GND_PSW_LEVEL   0X1208 // GCS Platform Level Switch
#define GND_PSW_DWNHI   0X120A // GCS Function Down High Speed Switch
#define GND_PSW_DWNLO   0X120B // GCS Function Down Low Speed Switch
#define GND_PSW__CCLO   0X120C // GCS Function CCW Low Speed Switch
#define GND_PSW__CCHI   0X120D // GCS Function CCW HIgh Speed Switch
#define GND_PSW__CWLO   0X1210 // GCS Function CW Low Speed Switch
#define GND_PSW__CWHI   0X1211 // GCS Function CW High Speed Switch
#define GND_PSW__UPLO   0X1212 // GCS Function Up Low Speed Switch
#define GND_PSW__UPHI   0X1213 // GCS Function Up Switch
// BASE ADDRESS OUTPUTS: 0X3200
```

```
// The ground switch node LED matrix is mapped into the system
// with the following addresses. (the matrix is a scanned
// row - column array
#define GND_LED__JIB     0X3204 // LED Indicator: Jib Boom
#define GND_LED_RISER    0X3205 // LED Indicator: Riser Boom
#define GND_LED_SWING    0X3206 // LED Indicator: Body Swing
#define GND_LED__LIFT    0X3207 // LED Indicator: Main Lift Boom
#define GND_LED_LEVEL    0X3208 // LED Indicator: Platform Level
#define GND_LED_GMODE    0X3209 // LED Indicator: Ground Control MOde
#define GND_LED_EMPWR    0X320A // LED Indicator: Emergeny Power Mode
#define GND_LED_PMODE    0X320B // LED Indicator: Platform Control Mode
#define GND_LED_ROTAT    0X320C // LED Indicator: Platform Rotate
#define GND_LED_FAULT    0X320D // LED Indicator: System Fault
#define GND_LED_NORML    0X320E // LED Indicator: System Normal
#define GND_LED_EXTND    0X320F // LED Indicator: Telescoping Boom
// SNORKEL DRIVER NODE
//=====================
// DID:   8
// DIDADDR: 0
#define GND_SIG_C2_7  0X3017 // (C2-7) Output: Available for use
#define GND_SIG_C2_8  0X3016 // (C2-8) Output: Available for use
#define GND_SIG_PCPWR  0X3015 // (C2-9) Outptu: Ignition-2 (Pump Controller Power)
#define GND_OUT_DRVCMD2 0x3014 // (C2-10) Output: Drive command signal
#define GND_OUT_DRVCMD1 0x3011 // (C2-11) Output: Drive command signal
#define GND_OUT_HIDRV  0X3010 // (C2-12) Output: High Range Command
#define GND_VLV_JIBDN  0X301E // (C3-1) Valve: Jib Down
#define GND_VLV_RTRCT  0X301F // (C3-2) Valve: Telescope Retract
#define GND_VLV_RISDN  0x3008 // (C3-3) Valve: Riser Down
#define GND_VLV_RISUP  0x3000 // (C3-4) Valve: Riser Up
#define GND_VLV__SWCC  0X300D // (C3-5) Valve: Body Swing CCW
#define GND_VLV__SWCW  0X300C // (C3-6) Valve: Body Swing CW
#define GND_VLV_LVLDN  0X3018 // (C3-7) Valve: Platform Level Down
#define GND_VLV_LVLUP  0X3019 // (C3-8) Valve: Platform Level Up
#define GND_VLV_LFTDN  0X301A // (C3-9) Valve: Main Lift Down
#define GND_VLV_JIBUP  0X301B // (C3-10) Valve: Jib Up
#define GND_VLV_LFTUP  0X301C // (C3-11) Valve: Lift Up
#define GND_VLV_EXTND  0X301D // (C3-12) Valve: Telescope Extend
#define GND_ALM__TILT  0X300B // (C4-1) Output: Tilt Alarm (Audible)
#define GND_ALM__HORN  0x300A // (C4-2) Output: Horn Relay
#define GND_VLV_STRRT  0x3009 // (C4-3) Valve: Steer Right
#define GND_VLV_STLFT  0x3001 // (C4-4) Valve: Steer Left
#define GND_VLV_EMPWR  0X300E // (C4-5) Valve: Emergency Pump Diverter Valve
#define GND_RLY_DRSIG  0x300F // (C4-6) Output: Foot Switch
#define GND_OUT_C4_7  0X3002 // (C4-7) Output: Available for use
#define GND_OUT_C4_8  0X3003 // (C4-8) Output: Available for use
#define GND_ALM_MOTIO  0X3004 // (C4-9) Output: Motion Alarm
#define GND_OUT_C4_10  0x3005 // (C4-10) Output: Available for use
#define GND_VLV_ROTCC  0X3006 // (C4-11) Valve: Platform Rotate CCW
#define GND_VLV_ROTCW  0X3007 // (C4-12) Valve: Platform Rotate CW
#define GND_RLY_PMPSG  0x3013 // (C6-A) Output: Hydraulic Pump Contactor
#define GND_RLY_AXPMP  0x3012 // (C6-C) Output: Emergency Power/Steer Pump Contactor
// SNORKEL PLATFORM SWITCH NODE
//=============================
// DID:   10
// DIDADDR: 0
// BASE ADDRESS INPUTS:   0X1400
// The platform switch node matrix is mapped into the system
// with the following addresses. (the matrix is a scanned
// row - column array
#define PLT_PSW_RISER    0X1400 // PCS Riser Boom Switch
#define PLT_PSW_SWING    0X1401 // PCS Body Swing Switch
#define PLT_PSW_EMPWR    0X1402 // PCS Emergency Pwr Switch
```

```
#define PLT_PSW__HORN    0X1404 // PCS Horn Switch
#define PLT_PSW___JIB    0X1405 // PCS Jib Boom Switch
#define PLT_PSW_PLROT    0X1406 // PCS Platform Rotate Switch
#define PLT_PSW__LIFT    0X1408 // PCS Main Lift Boom Switch
#define PLT_PSW_EXTND    0X1409 // PCS Telescoping Boom Switch
#define PLT_PSW_LEVEL    0X140A // PCS Platform Level Switch
#define PLT_PSW_HIDRV    0X140B // PCS High Drive Range Switch
#define PLT_INP_DRVREQB  0X1413 // (Term #5) Drive Reverse
#define NOT_PLT_INP_DRVREQB 0X5413 // (Term #5) Drive Reverse (negative pin logic)
#define PLT_INP_DRVREQA  0X1412 // (Term #6) Drive Forward
#define PLT_INP_STRRT    0X1411 // (Term #7) Steer Right
#define PLT_INP_STLFT    0X1410 // (Term #8) Steer Left
#define PLT_INP_FOTSW    0X140F // (Term #9) Foot Switch
#define PLT_INP_ESTOP    0x140E // (Term #10) Emergency Stop Switch (Platform Signal)
#define NOT_PLT_INP_ESTOP 0x540E // (Term #10) Emergency Stop Switch (Platform Signal)
#define PLT_INP_TERM_11  0x140D // (Term #11) Available for use
#define PLT_INP_TERM_12  0x140C // (Term #12) Available for use
#define PLT_INP_JIBANG   0x1414 // (Term #13) Limit switch true when jib angle low
#define PLT_RED_JIBANG   0x1415 // (Term #14) Redundant jib angle low = not PLT_INP_JIBANG
// BASE ADDRESS OUTPUTS: 0X3400
// The platform switch node LED matrix is mapped into the system
// with the following addresses. (the matrix is a scanned
// row - column array
#define PLT_LED_BAT20  0X3400 // LED Indicator: Battery 0% - 20% (RED)
#define PLT_LED_BAT40  0X3401 // LED Indicator: Battery 20% - 40% (YEL)
#define PLT_LED_BAT60  0X3402 // LED Indicator: Battery 40% - 60% (YEL)
#define PLT_LED_BAT80  0X3403 // LED Indicator: Battery 60% - 80% (GRN)
#define PLT_LED___JIB  0X3404 // LED Indicator: Jib Boom
#define PLT_LED_RISER  0X3405 // LED Indicator: Riser Boom
#define PLT_LED_SWING  0X3406 // LED Indicator: Body Swing
#define PLT_LED__LIFT  0X3407 // LED Indicator: Main Lift Boom
#define PLT_LED_LEVEL  0X3408 // LED Indicator: Platform Level
#define PLT_LED_BAT100 0X3409 // LED Indicator: Battery 80% - 100% (GRN)
#define PLT_LED_EMPWR  0X340A // LED Indicator: Emergency Power
#define PLT_LED_HIDRV  0x340B // LED Indicator: High Drive Range
#define PLT_LED_ROTAT  0X340C // LED Indicator: Platform Rotate
#define PLT_LED_SYSFT  0X340D // LED Indicator: System Fault
#define PLT_LED_SYSNO  0X340E // LED Indicator: System Normal
#define PLT_LED_EXTND  0X340F // LED Indicator: Telescope Boom
#define PLT_OUT_ALERT  0x3416 // (Term #15) Output: Status Alert Buzzer
#define PLT_OUT_TERM_16 0x3417 // (Term #16) Output: Available for use
// SNORKEL JOYSTICK NODE
//==========================
// DID:    7
// DIDADDR: 0
// the joystick decoder card transmits the state of the joysticks inputs
//to the master control module. the inputs are defined as follows.
#define JS_SwY_Pos     0x0E00 // Input: Joystick on Positive Y Axis
#define JS_SwX_Pos     0x0E01 // Input: Joystick on Positive X Axis
#define JS_SwY_Neg     0x0E02 // Input: Joystick on Negative Y Axis
#define JS_SwX_Neg     0x0E03 // Input: Joystick on Negative X Axis
#define JS_SwY_PosHi   0x0E04 // Input: Joystick on Very Positive Y Axis
#define JS_SwX_PosHi   0x0E05 // Input: Joystick on Very Positive X Axis
#define JS_SwY_NegHi   0x0E06 // Input: Joystick on Very Negative Y Axis
#define JS_Swx_NegHi   0x0E07 // Input: Joystick on Very Negative X Axis
#define JS_Off_State   0x0E08 // Input: Joystick Centered
#define JS_On_State    0x0E09 // Input: Joystick On (off of center)
#define JS_On_XAxis    0x0E0A // Input: Joystick on X Axis
#define JS_On_YAxis    0x0E0B // Input: Joystick on Y Axis
#define JS_None3       0x0E0C // Input: not defined
#define JS_None4       0x0E0D // Input: not defined
#define JS_None5       0x0E0E // Input: not defined
```

```
#define JS_None6    0x0E0F // Input: not defined
#define JS_Spd_Sw0    0x0E10 // Input: bit 0 of the speed value (0-100%)
#define JS_Spd_Sw1    0x0E11 // Input: bit 1 of the speed value (0-100%)
#define JS_Spd_Sw2    0x0E12 // Input: bit 2 of the speed value (0-100%)
#define JS_Spd_Sw3    0x0E13 // Input: bit 3 of the speed value (0-100%)
#define JS_Spd_Sw4    0x0E14 // Input: bit 4 of the speed value (0-100%)
#define JS_Spd_Sw5    0x0E15 // Input: bit 5 of the speed value (0-100%)
#define JS_Spd_Sw6    0x0E16 // Input: bit 6 of the speed value (0-100%)
#define JS_Spd_Sw7    0x0E17 // Input: bit 7 of the speed value (0-100%) note: never set!
#define JS_NULL__DATA  0x2E00 // Output: used to get joystick in valid devices list
// SYSTEM STORAGE MODULE
//==========================
// System storage modules occupy three device id's
// addresses. These variables are defined as required
// to hold interstitial database variables or results.
// DID:    15
// DIDADDR: 13 - 15
#define SYS_VAR_GNDCW  0X1FA0 // Gnd CW Fast or CW Slow
#define SYS_VAR_GNDCC  0X1FA1 // Gnd CCW Fast or CCW Slow
#define SYS_VAR_GNDUP  0X1FA2 // Gnd Up Fast or Up Slow
#define SYS_VAR_GNDDN  0X1FA3 // Gnd Dn Fast or Dn Slow
#define SYS_VAR_PLTCW  0X1FA4 // Plt CW Fast or CW Slow
#define SYS_VAR_PLTCC  0X1FA5 // Plt CCW Fast or CCW Slow
#define SYS_VAR_PLTUP  0X1FA6 // Plt Up Fast or Up Slow
#define SYS_VAR_PLTDN  0X1FA7 // Plt Dn Fast or Dn Slow
#define SYS_VAR_GUDLO  0X1FA8 // Gnd Up Slow or Down Slow
#define SYS_VAR_GLRLO  0X1FA9 // Gnd CC Slow or CCW Slow
#define SYS_VAR_GUDHI  0X1FAA // Gnd Up Fast or Down Fast
#define SYS_VAR_GLRHI  0X1FAB // Gnd CC Fast or CCW  Fast
#define SYS_VAR_PLTUD  0X1FAC // Plt Up or Down
#define SYS_VAR_PLTLR  0X1FAD // Plt Left or Right
#define SYS_VAR_GNDHI  0X1FAE // Gnd Fast Switch Pressed
#define SYS_VAR_GNDLO  0X1FAF // Gnd Slow Switch Pressed
#define SYS_VAR_STEER  0X1FB1 // Steer Request
#define SYS_VAR_CNTRL  0X1FB2 // Any Boom Request
#define SYS_VAR_UP_DN  0X1FB3 // Any Up/Dn Boom Request
#define SYS_VAR_CC_CW  0X1FB4 // Any CC/CW Boom Request
#define SYS_VAR_EXRET  0X1FB5 // Extend Or Retract
#define SYS_VAR_SWING  0X1FB6 // Swing CC or Swing CW
#define SYS_VAR_ROTAT  0X1FB7 // Rotate CC or Rotate CCW
#define SYS_VAR_LEVEL  0X1FB8 // Level Up or Level Down
#define SYS_VAR_JIBLT  0X1FB9 // Jib Down or Lift Down
#define SYS_VAR_SWROT  0X1FBA // Swing or Rotate
#define SYS_VAR_LEJLT  0X1FBB // Jib Lift or Level Functions
#define SYS_VAR_JILUP  0X1FBC // Jib Up or Lift Up
#define SYS_VAR_GNDUD  0x1FBD // Any ground up or down
#define SYS_VAR_GNDLR  0x1FBE // Any ground left/right (cc/cw)
#define SYS_AUTO_RETR  0x1FBF // True when automatic retract function active
#define SYS_AUTO_RETR2 0x1FB0 // True when automatic retract function and ramped to zero
#define SYS_EXT_INTLK  0x3FA0 // True when okay to extend
#define SYS_VAR_RETR1  0x3FA1 // Interstitial retract true
#define SYS_VAR_RETR2  0x3FA2 // Interstitial retract true
#define SYS_VAR_NOTRIM    0x3FA3 // True when no speed trim active
#define NOT_SYS_VAR_NOTRIM 0x7FA3 // True when trim speed active (pin negative logic)
#define SYS_VAR_VALVE    0x3FA4 // any valve active
#define NOT_SYS_VAR_VALVE 0x7FA4 // not any valve active (negative pin logic)
#define SYS_VAR_LJLRI  0X3FA5 // lib jib level or retract valve on
#define SYS_VAR_SRREX  0X3FA6 // swing rotate retract or extend valve on
#define SYS_VAR_LJIBL  0X3FA7 // lift jib or level valve on
#define SYS_VAR_RISER  0X3FA8 // riser valve on
#define SYS_VAR_ROLL     0x3FA9 // vehicle in motion variable
#define NOT_SYS_VAR_ROLL  0x7FA9 // not vehicle in motion variable (neg logic)
```

```
#define SYS_VAR_HIDRV  0x3FAA // high drive active
#define SYS_VAR_NOTRIMA 0x3FAC // No trim speed case A
#define SYS_VAR_NOTRIMB 0x3FAD // No trim speed case B
#define SYS_RETR_BLNK  0x3FAE // toggles on when auto retract true
#define SYS_AUTO_JIBDWN    0x3FB4 // Auto Jib-Down Variable
#define NOT_SYS_AUTO_JIBDWN 0x7FB4 // NOt Auto Jib-Down Variable (negative pin logic)
#define SYS_VAR_JIBRT  0x3FB5 // Jib > 33 and Extend < 33 Used for Auto Jib-Down
#define GND_REQ_RTRCT  0x3FB6 // Retract Requested
#define GND_REQ_JIBDN  0x3FB7 // Jib Down Requested
#define GND_REQ_JIBUP  0x3FB8 // Jib Up Requested
#define SYS_VAR_BMCRA  0x3FB9 // True when boom cradled and full retract
#define SYS_VAR_JIBEXT 0x3FAF // Jib up and telescope boom extended
// these variables are utilized for CE options as incorporated into
// the database. note that to disable CE restrictions, connector
// 2-3 must be true to override CE restrictions
#define SYS_VAR_UNDER8M 0X3FBA // Under 8 meters (for CE)
#define SYS_VAR_DRVENBL 0x3FBB // Drive enable (for CE)
#define SYS_VAR_DRVREQ1 0x3FBC // interstitial variable for drive 1 command
#define SYS_VAR_DRVREQ2 0x3FBD // interstitial variable for drive 2 command
#define SYS_VAR_PMPREQ  0x3FBE // interstitial variable for pump signal
#define SYS_VAR_GCENBL  0x3FBF // ground control okay (CE) variable
#define SYS_VAR_LVLENBL 0x3FB0 // platform level enable (CE)
#define SYS_VAR_LVLREQD 0x3FB1 // interstitial platform level
#define SYS_VAR_LVLREQU 0x3FB2 // interstitial platform level
#define SYS_VAR_MA1    0X1FC0 // motion alarm db storage variable
#define SYS_VAR_MA2    0X1FC1 // motion alarm db storage variable
#define SYS_VAR_DOWN   0X1FC2 // with any down motion intention
#define SYS_VAR_ALLMOT  0X1FC3 // inputs dictate all motion alarm desired
#define SYS_VAR_38ONLY  0x1FC4 // allows certain functions for 38 only
#define SYS_TRASH_CAN  0X3FFE // Trash Output
#define SYS_DB_STOP    0X3FFF // Stop marker
// special case - these are DDCW's to be used
// in the system for the TRUE and FALSE case. see
// the specification on DDCW's for further info on
// how the evaluations work for these two cases.
#define SYS_INP__TRUE  0XBFFF // Always True
#define SYS_INP_FALSE  0XFFFF // Always False
#define AND_TRUE       0XBFFF // Always True
#define OR_FALSE       0XFFFF // Always False
#define AND_FALSE      0XFFFF // Always False
// SNORKEL VIRTUAL I/O MODULE
//===========================
// DID:  15
// DIDADDR: 0
// These variables are set by the custom program modules - the
// addresses may be utilized (but not set) by the database
#define SYS_VOM_GMODE    0X3E00 // System Ground Mode
#define SYS_VOM_PMODE    0X3E01 // System Platform Mode
#define SYS_VOM_EMODE    0x3E02 // Emergency Power Mode Active
#define NOT_SYS_VOM_EMODE 0x7E02 // Not Emergency Power Mode Active (negative logic)
#define SYS_VOM_HSREQ    0x3E03 // High drive range mode
// there are two outputs for panel function inputs - pending requests and panel requests.
// when a switch is pressed on the panel, the request is recognized by the controller and
// becomes pending. A pending request becomes a valid panel request when the boom speed
// is zero (ramped to or started from). The valid panel request also remains as the
// pending request until another function button is pressed, then the new function becomes
// the current pending function once the prior function has been returned ramped to zero.
#define SYS_PRQ_SWING  0X1E03 // Panel Request Active: Body Swing Function
#define SYS_PRQ_RISER  0X1E04 // Panel Request Active: Riser Function
#define SYS_PRQ__LIFT  0X1E05 // Panel Request Active: Lift Function
#define SYS_PRQ_EXTND  0X1E06 // Panel Request Active: Telescope Function
#define SYS_PRQ___JIB  0X1E07 // Panel Request Active: Jib Function
```

```
#define SYS_PRQ_PLROT  0X1E08 // Panel Request Active: Rotate Function
#define SYS_PRQ_LEVEL  0X1E09 // Panel Request Active: Level Function
//#define SYS_PRQ_EMPWR 0X1E0A // Panel Request Active: Emergency Power Function
#define SYS_PND_SWING  0X1E0B // Pending Function Request: Body Swing
#define SYS_PND_RISER  0X1E0C // Pending Function Request: Riser
#define SYS_PND__LIFT  0X1E0D // Pending Function Request: Lift
#define SYS_PND_EXTND  0X1E0E // Pending Function Request: Telescope
#define SYS_PND___JIB  0X1E0F // Pending Function Request: Jib
#define SYS_PND_PLROT  0X1E10 // Pending Function Request: Rotate
#define SYS_PND_LEVEL  0X1E11 // Pending Function Request: Level
#define SYS_VOM_CHIRP  0x1E12 // True when system function/status alert
#define SYS_VOM_TURNOFF 0x1E13 // True when sleeping for 1 hour
#define SYS_VOM_PWRDN          0x1E14 // True when system in power down/sleep mode
// SYSTEM POTENTIOMETER MODULE
//=========================
// DID:  15
// DIDADDR: 1
#define VOM_POT_CMD0  0x1E20 // potentiometer command 0
#define VOM_POT_CMD1  0x1E21 // potentiometer command 1
#define VOM_POT_CMD2  0x1E22 // potentiometer command 2
#define VOM_POT_CMD3  0x1E23 // potentiometer command 3
#define VOM_POT_CMD4  0x1E24 // potentiometer command 4
#define VOM_POT_CMD5  0x1E25 // potentiometer command 5
#define VOM_POT_CMD6  0x1E26 // potentiometer command 6
#define VOM_POT_CMD7  0x1E27 // potentiometer command 7
#define VOM_POT_CMD8  0x1E28 // potentiometer command 8
#define VOM_POT_CMD9  0x1E29 // potentiometer command 9
#define VOM_POT_CMD10  0x1E2A // potentiometer command A
#define VOM_POT_TRIM50   0x1E2B // potentiomer profile 1 (50%)
#define NOT_VOM_POT_TRIM50 0x5E2B // not potentiomer profile 1 (negative logic)
#define VOM_POT_TRIM25   0x1E2C // potentiomer profile 2 (25%)
#define VOM_POT_ONZERO 0x3E20 // potentiometer output true when zero
#define VOM_POT_OFFZERO 0x3E21 // potentiometer output true when not zero
#define VOM_POT_POSVAL1 0x3E22 // potentiometer output true when at Val1
#define VOM_POT_POSVAL2 0x3E23 // potentiometer output true when at Val2
#define VOM_POT_POSVAL3 0x3E24 // potentiometer output true when at Val3
#define NUM_DODES       118
#define SIZE_DB         944 // total number of words in data base array (dodes*8)
code long DODE_DATABASE [SIZE_DB] =
{
// a device must exist in the database to be included in the network -
// add a null in the joystick address space to have it included and "in view"
// of the master controller.
JS_NULL__DATA,NO_DDV,SYS_INP_FALSE,SYS_INP_FALSE,SYS_INP_FALSE,SYS_INP_FALSE,NO_DDV1,FILLER
,
// GROUND MODE/PLATFORM MODE LIGHTS
//==========================
// ground mode led set when
// system ground mode set
GND_LED_GMODE,NO_DDV,SYS_VOM_GMODE,SYS_INP__TRUE,SYS_INP_FALSE,SYS_INP_FALSE,NO_DDV1,FI
LLER,
// platform mode led set when
// system platform mode set
GND_LED_PMODE,NO_DDV,SYS_VOM_PMODE,SYS_INP__TRUE,SYS_INP_FALSE,SYS_INP_FALSE,NO_DDV1,FIL
LER,
// SYSTEM VARIABLES FOR MOTION COMBINATION
//==============================
// These variables are set on various combinations of switches
// and valves and can be used by the database.
// Ground Control Enable
// set to enable ground control (CE)
// ground control operation okay when
```

```
// platform estop off and ground mode or not in CE mode (in domestic mode).
SYS_VAR_GCENBL,NO_DDV,NOT_PLT_INP_ESTOP,SYS_VOM_GMODE,GND_INP_DOM.SYS_VOM_GMODE,NO_
DDV1,FILLER,
// Ground Down Variable
// set on down direction speed switch press
// ground down variable when
// ground down low speed switch and ground mode or
// ground down hi  speed switch and ground mode
SYS_VAR_GNDDN,NO_DDV,GND_PSW_DWNLO,SYS_VAR_GCENBL,GND_PSW_DWNHI,SYS_VAR_GCENBL,NO_
DDV1,FILLER,
// Ground Up Variable
// set on up direction speed switch press
// ground up variable when
// ground up low speed switch and ground mode or
// ground up hi  speed switch and ground mode
SYS_VAR_GNDUP,NO_DDV,GND_PSW__UPLO,SYS_VAR_GCENBL,GND_PSW__UPHI,SYS_VAR_GCENBL,NO_DD
V1,FILLER,
// Ground Up or Ground Down Variable
// set with any ground up or down function
// ground up or down variable set when
// ground up variable set or ground down variable set
SYS_VAR_GNDUD,NO_DDV,SYS_VAR_GNDUP,SYS_INP__TRUE,SYS_VAR_GNDDN,SYS_INP__TRUE,NO_DDV1,F
ILLER,
// Platform Station Down Variable
// set on joystick down direction switch press
// platform down variable when
// platform down switch and platform mode
SYS_VAR_PLTDN,NO_DDV,JS_SwY_Neg,SYS_VOM_PMODE,SYS_INP_FALSE,SYS_INP_FALSE,NO_DDV1,FILLER,
// Platform Station Up Variable
// set on joystick up direction switch press
// platform up variable when
// platform up switch and platform mode
SYS_VAR_PLTUP,NO_DDV,JS_SwY_Pos,SYS_VOM_PMODE,SYS_INP_FALSE,SYS_INP_FALSE,NO_DDV1,FILLER,
// Platform Up or Platform Down Variable
// set with any platform up or down function
// platform up or down variable set when
// platform up variable set or platform down variable set
SYS_VAR_PLTUD,NO_DDV,SYS_VAR_PLTUP,SYS_INP__TRUE,SYS_VAR_PLTDN,SYS_INP__TRUE,NO_DDV1,FIL
LER,
// Up Down Variable
// set with any up or down function
// system  up or down variable set when
// ground up/down variable set or platform up/down variable set
SYS_VAR_UP_DN,0x0004,SYS_VAR_GNDUD,SYS_INP__TRUE,SYS_VAR_PLTUD,SYS_INP__TRUE,NO_DDV1,FILL
ER,
// Ground Counter-Clockwise Variable
// set on counter-clockwise direction speed switch press
// ground counter clockwise variable when
// ground c-clockwise lo speed switch and ground mode or
// ground c-clockwise hi speed switch and ground mode
SYS_VAR_GNDCC,NO_DDV,GND_PSW__CCLO,SYS_VAR_GCENBL,GND_PSW__CCHI,SYS_VAR_GCENBL,NO_DD
V1,FILLER,
// Ground Clockwise Variable
// set on clockwise direction speed switch press
// ground clockwise variable when
// ground clockwise lo speed switch and ground mode or
// ground clockwise hi speed switch and ground mode
SYS_VAR_GNDCW,NO_DDV,GND_PSW__CWLO,SYS_VAR_GCENBL,GND_PSW__CWHI,SYS_VAR_GCENBL,NO_
DDV1,FILLER,
// Ground Left/Right (CC-CW) Variable
// set with any ground clockwise or counterclockwise function
// ground left right variable set when
```

```
// ground clockwise variable set or ground counter clockwise variable set
SYS_VAR_GNDLR,NO_DDV,SYS_VAR_GNDCW,SYS_INP__TRUE,SYS_VAR_GNDCC,SYS_INP__TRUE,NO_DDV1,F
ILLER,
// Platform Counter-Clockwise Variable
// set on counter-clockwise joystick switch press
// platform counter clockwise variable when
// platform c-clockwise switch and platform mode
SYS_VAR_PLTCC,NO_DDV,JS_SwX_Pos,SYS_VOM_PMODE,SYS_INP_FALSE,SYS_INP_FALSE,NO_DDV1,FILLER,
// Platform Clockwise Variable
// set on clockwise joystick switch press
// platform clockwise variable when
// platform clockwise switch and platform mode
SYS_VAR_PLTCW,NO_DDV,JS_SwX_Neg,SYS_VOM_PMODE,SYS_INP_FALSE,SYS_INP_FALSE,NO_DDV1,FILLER,
// Platform Left/Right (CC-CW) Variable
// set with any platform clockwise or counterclockwise function
// platform left right variable set when
// platform clockwise variable set or platform counter clockwise variable set
SYS_VAR_PLTLR,NO_DDV,SYS_VAR_PLTCW,SYS_INP__TRUE,SYS_VAR_PLTCC,SYS_INP__TRUE,NO_DDV1,FIL
LER,
// Clockwise Counter-Clockwise variable
// set with any clockwise or counter-clockwise or left/right function
// system clockwise/counter-clockwise variable set when ground left/right variable set
// or platform left/right variable set
SYS_VAR_CC_CW,NO_DDV,SYS_VAR_GNDLR,SYS_INP__TRUE,SYS_VAR_PLTLR,SYS_INP__TRUE,NO_DDV1,FI
LLER,
// Boom Control Variable
// set with any boom  control function
// system control vaiable set when system up/down variable set or
// system clockwise/counter-clockwise variable set.
SYS_VAR_CNTRL,NO_DDV,SYS_VAR_UP_DN,SYS_INP__TRUE,SYS_VAR_CC_CW,SYS_INP__TRUE,NO_DDV1,FI
LLER,
// SYSTEM VARIABLES FOR BOOM MOTION SPEED FROM GROUND BUTTONS
//=================================================================
// Ground Left/Right High Speed Variable
// set when any ground left/right or CW/CCW high speed direction button pressed
// ground left/right high variable set when
// (ground clockwise high switch and ground mode) or
// (ground counter-clockwise high switch and ground mode)
SYS_VAR_GLRHI,NO_DDV,GND_PSW__CWHI,SYS_VOM_GMODE,GND_PSW__CCHI,SYS_VOM_GMODE,NO_DDV
1,FILLER,
// Ground Left/Right Low Speed Variable
// set when any ground left/right or CW/CCW low speed direction button pressed
// ground left/right low variable set when
// (ground clockwise low switch and ground mode) or
// (ground counter-clockwise low switch and ground mode)
SYS_VAR_GLRLO,NO_DDV,GND_PSW__CWLO,SYS_VOM_GMODE,GND_PSW__CCLO,SYS_VOM_GMODE,NO_D
DV1,FILLER,
// Ground Up/Dn Hi Speed Variable
// set when any ground up/down high speed selected
// ground up/down hi speed variable when
// ground down high switch and ground mode or
// ground up high switch and ground mode
SYS_VAR_GUDHI,NO_DDV,GND_PSW_DWNHI,SYS_VOM_GMODE,GND_PSW__UPHI,SYS_VOM_GMODE,NO_DD
V1,FILLER,
// Ground Up/Dn Low Speed Variable
// set when any ground up/down low speed selected
// ground up/down low speed variable when
// ground down low switch and ground mode or
// ground up low switch and ground mode
SYS_VAR_GUDLO,NO_DDV,GND_PSW_DWNLO,SYS_VOM_GMODE,GND_PSW__UPLO,SYS_VOM_GMODE,NO_D
DV1,FILLER,
// Ground High Speed Variable
```

```
// set when any high speed request made from the ground
// ground high speed variable when
// ground up/down high speed or ground left/right high speed
SYS_VAR_GNDHI,NO_DDV,SYS_VAR_GUDHI,SYS_INP__TRUE,SYS_VAR_GLRHI,SYS_INP__TRUE,NO_DDV1,FIL
LER,
// Ground Low Speed Variable
// set when any low speed request made from the ground
// ground low speed variable when
// ground up/down low speed or ground left/right low speed
SYS_VAR_GNDLO,NO_DDV,SYS_VAR_GUDLO,SYS_INP__TRUE,SYS_VAR_GLRLO,SYS_INP__TRUE,NO_DDV1,FI
LLER,
// MAIN BOOM SECTION DEVICE OUTPUT DEPENDENCY EXPESSIONS
//=========================================================
// Extension No-Zone Detection
// auto retract enabled when
// main boom angle limit switch low and not retracted limit switch
SYS_AUTO_RETR,0x1000,GND_INP_LSANG,GND_RED_LSLT33,SYS_INP_FALSE,SYS_INP_FALSE,NO_DDV1,FILL
ER,
// toggles with system auto retract (used with extend led)
SYS_RETR_BLNK,0x0040,SYS_AUTO_RETR,SYS_INP__TRUE,SYS_INP_FALSE,SYS_INP_FALSE,NO_DDV1,FILLER
,
// Main Boom Retract
// note that sys_auto_retr2 is output from a system vom when auto retracting
// and boom speed has been ramped down to zero
// retract the boom when
// panel request for extend and (ground down switch or platform up switch)
// or when
// auto retract enabled and main boom lifting down
// but only when not a 33 machine
SYS_VAR_RETR1,0x1000,SYS_PRQ_EXTND,SYS_VAR_GNDDN,SYS_PRQ_EXTND,SYS_VAR_PLTUP,NO_DDV1,FIL
LER,
SYS_VAR_RETR2,0x1000,SYS_PRQ__LIFT,SYS_VAR_GNDDN,SYS_PRQ__LIFT,SYS_VAR_PLTDN,NO_DDV1,FILLE
R,
GND_REQ_RTRCT,0x0004,SYS_VAR_RETR1,SYS_INP__TRUE,SYS_VAR_RETR2,SYS_AUTO_RETR2,NO_DDV1,FIL
LER,
GND_VLV_RTRCT,0x1000,GND_REQ_RTRCT,NOT_SYS_AUTO_JIBDWN,SYS_INP_FALSE,
SYS_INP_FALSE,0x8000,FILLER,
// Main Boom Extend
// extend the boom when
// panel request for extend and (ground up switch or platform up switch)
// but not when
// auto retract enabled
// but only when main boom angle switch error not active and extension switch error not active
// but only when not a 33 machine
GND_VLV_EXTND,0x1204,SYS_PRQ_EXTND,SYS_VAR_GNDUP,SYS_PRQ_EXTND,SYS_VAR_PLTDN,0x8600,FILL
ER,
// Main Boom Extension LED
// light main boom extend function LED on the ground and platform box when
// panel request for extend or (auto retract enabled and up/down switch pressed)
// but only when not a 33 machine
GND_LED_EXTND,0x1000,SYS_PND_EXTND,SYS_INP__TRUE,SYS_RETR_BLNK,SYS_VAR_UP_DN,NO_DDV1,FIL
LER,
PLT_LED_EXTND,0x1000,SYS_PND_EXTND,SYS_INP__TRUE,SYS_RETR_BLNK,SYS_VAR_UP_DN,NO_DDV1,FILL
ER,
// Main Boom Lift Down
// main boom lift down when
// pnl request for lift and (ground down switch or platform down switch)
// but not if
// auto retract enabled
GND_VLV_LFTDN,0x8004,SYS_PRQ__LIFT,SYS_VAR_GNDDN,SYS_PRQ__LIFT,SYS_VAR_PLTDN,0x8600,FILLER,
// Main Boom Lift Up
// main boom lift up when
```

```
// pnl request for lift and (ground up switch or platform up switch)
// but only when main boom angle switch error not active and extension switch error not active
GND_VLV_LFTUP,0x0004,SYS_PRQ__LIFT,SYS_VAR_GNDUP,SYS_PRQ__LIFT,SYS_VAR_PLTUP,0x9600,FILLER,
// Main Boom Lift LED
// light main boom lift function LED when
// panel request for lift
GND_LED__LIFT,NO_DDV,SYS_PND__LIFT,SYS_INP__TRUE,GND_INP_C6_U,SYS_INP__TRUE,NO_DDV1,FILLER,
PLT_LED__LIFT,NO_DDV,SYS_PND__LIFT,SYS_INP__TRUE,SYS_INP_FALSE,SYS_INP_FALSE,NO_DDV1,FILLER,
// JIB BOOM SECTION
// ===============
// Jib Boom Down
// Determine when Auto Jib Down (angle > 35, extend < 33, Jib < 33)
// jib boom down when
// pnl request for jib and (ground down switch or platform down switch) or when
// or when jib boom high and extended less than 33 inches
SYS_AUTO_JIBDWN,0x1000,PLT_RED_JIBANG,GND_INP_LSLT33,SYS_INP_FALSE,SYS_INP_FALSE,NO_DDV1,FIL
LER,
GND_REQ_JIBDN,0x0004,SYS_PRQ___JIB,SYS_VAR_GNDDN,SYS_PRQ___JIB,SYS_VAR_PLTDN,NO_DDV1,FILLER
,
GND_VLV_JIBDN,0x0004,GND_REQ_JIBDN,SYS_INP__TRUE,SYS_AUTO_JIBDWN,GND_REQ_RTRCT,NO_DDV1,FI
LLER,
// Jib Boom Up
// jib boom up when
// pnl request for jib and (ground up switch or platform up switch)
// but only when main boom angle switch error not active and extension switch error not active
GND_REQ_JIBUP,0x0004,SYS_PRQ___JIB,SYS_VAR_GNDUP,SYS_PRQ___JIB,SYS_VAR_PLTUP,NO_DDV1,FILLER,
GND_VLV_JIBUP,NO_DDV,GND_REQ_JIBUP,NOT_SYS_AUTO_JIBDWN,SYS_INP_FALSE,SYS_INP_FALSE,0x1600,
FILLER,
// Jib Led
// jib LED when
// pnl request for jib
GND_LED___JIB,NO_DDV,SYS_PND___JIB,SYS_INP__TRUE,GND_INP_C6_V,SYS_INP__TRUE,NO_DDV1,FILLER,
PLT_LED___JIB,NO_DDV,SYS_PND___JIB,SYS_INP__TRUE,SYS_INP_FALSE,SYS_INP_FALSE,NO_DDV1,FILLER,
// Platform Level Enable (CE)
// set when okay to platform level
// level enable when boom fully cradled or when not a ce machine
SYS_VAR_LVLENBL,NO_DDV,SYS_VAR_BMCRA,SYS_INP__TRUE,GND_INP_DOM,SYS_INP__TRUE,NO_DDV1,FI
LLER,
// Platform Level Down
// platform level down when
// pnl request for level down and (ground down switch or platform down switch)
SYS_VAR_LVLREQD,0x0004,SYS_PRQ_LEVEL,SYS_VAR_GNDDN,SYS_PRQ_LEVEL,SYS_VAR_PLTDN,NO_DDV1,
FILLER,
GND_VLV_LVLDN,0x0004,SYS_VAR_LVLREQD,SYS_VAR_LVLENBL,SYS_INP_FALSE,SYS_INP_FALSE,0x8000,FI
LLER,
// Platform Level Up
// platform level down when
// pnl request for level down and (ground down switch or platform down switch)
SYS_VAR_LVLREQU,0x0004,SYS_PRQ_LEVEL,SYS_VAR_GNDUP,SYS_PRQ_LEVEL,SYS_VAR_PLTUP,NO_DDV1,F
ILLER,
GND_VLV_LVLUP,0x0004,SYS_VAR_LVLREQU,SYS_VAR_LVLENBL,SYS_INP_FALSE,SYS_INP_FALSE,0x8000,FI
LLER,
// Platform Level LED
// platform level LED when
// pnl request for platform level
// but only when not a 33 machine
GND_LED_LEVEL,NO_DDV,SYS_PND_LEVEL,SYS_INP__TRUE,GND_INP_C6_X,SYS_INP__TRUE,NO_DDV1,FILLE
R,
PLT_LED_LEVEL,NO_DDV,SYS_PND_LEVEL,SYS_INP__TRUE,SYS_INP_FALSE,SYS_INP_FALSE,NO_DDV1,FILLE
R,
// Riser Boom Down
// riser boom down when
```

```
// pnl request for riser and (ground down switch or platform down switch)
GND_VLV_RISDN,0x0004,SYS_PRQ_RISER,SYS_VAR_GNDDN,SYS_PRQ_RISER.SYS_VAR_PLTDN,0x8000,FILLER,
// Riser Boom Up
// riser boom Up when
// pnl request for riser and (ground down switch or platform down switch)
// but only when main boom angle switch error not active and extension switch error not active
GND_VLV_RISUP,0x0004,SYS_PRQ_RISER,SYS_VAR_GNDUP,SYS_PRQ_RISER.SYS_VAR_PLTUP,0x8000,FILLER,
// Riser Boom LED
// platform level LED when
// pnl request for platform level
GND_LED_RISER,NO_DDV,SYS_PND_RISER,SYS_INP__TRUE,GND_INP_C6_T.SYS_INP__TRUE,NO_DDV1,FILLER
,
PLT_LED_RISER,NO_DDV,SYS_PND_RISER,SYS_INP__TRUE,SYS_INP_FALSE,SYS_INP_FALSE,NO_DDV1,FILLER
,
// Platform Rotate Counter ClockWise
// platform rotate CCW when
// pnl request for rotate and (ground ccw switch or platform ccw switch)
// but only when not a 33 machine
// but only when not a 33 machine
GND_VLV_ROTCC,0x1004,SYS_PRQ_PLROT,SYS_VAR_GNDCC,SYS_PRQ_PLROT,SYS_VAR_PLTCC,0x8000,FILLE
R,
// Platform Rotate ClockWise
// platform rotate CW when
// pnl request for rotate and (ground cw switch or platform cw switch)
// but only when not a 33 machine
GND_VLV_ROTCW,0x1004,SYS_PRQ_PLROT,SYS_VAR_GNDCW,SYS_PRQ_PLROT,SYS_VAR_PLTCW,0x8000,FILL
ER,
// Platform Rotate LED
// platform rotate LED when
// pnl request for platform rotate
// but only when not a 33 machine
GND_LED_ROTAT,0x1000,SYS_PND_PLROT,SYS_INP__TRUE,SYS_INP_FALSE.SYS_INP_FALSE.NO_DDV1,FILLER
,
PLT_LED_ROTAT,0x1000,SYS_PND_PLROT,SYS_INP__TRUE,SYS_INP_FALSE,SYS_INP_FALSE.NO_DDV1,FILLER,
// Body Swing Counter ClockWise
// body swing ccw when
// pnl request for body swing and (ground ccw switch or platform ccw switch)
GND_VLV__SWCC,0x0004,SYS_PRQ_SWING,SYS_VAR_GNDCC,SYS_PRQ_SWING,SYS_VAR_PLTCC,0x8000,FILLE
R,
// Body Swing ClockWise
// body swing cw when
// pnl request for body swing and (ground cw switch or platform cw switch)
GND_VLV__SWCW,0x0004,SYS_PRQ_SWING,SYS_VAR_GNDCW,SYS_PRQ_SWING,SYS_VAR_PLTCW,0x8000,FIL
LER,
// Body Swing LED
// body swing LED when
// pnl request for body swing
GND_LED_SWING,NO_DDV,SYS_PND_SWING,SYS_INP__TRUE,SYS_INP_FALSE,SYS_INP_FALSE,NO_DDV1,FILL
ER,
PLT_LED_SWING,NO_DDV,SYS_PND_SWING,SYS_INP__TRUE,SYS_INP_FALSE,SYS_INP_FALSE,NO_DDV1,FILL
ER,
// Ignition-2 Relay (Pump Controller Power)
// ignition-2 relay (pump controller pwr relay) always on
GND_SIG_PCPWR,NO_DDV,SYS_INP__TRUE,SYS_INP__TRUE,SYS_INP_FALSE,SYS_INP_FALSE,NO_DDV1,FILLE
R,
// CONTROL SIGNALS TO DRIVE AND BOOM CONTROLLERS
// DRIVE UNIT ECU POWER (CABLE FORM CONTROLLER)
// ==========================================
// Under 8 Meters Variable for CE options
// when platform under 8 meters (CE)
// system variable under 8 meters when
// telescoping boom fully retracted and boom angle high or boom angle low
```

```
SYS_VAR_UNDER8M,NO_DDV,GND_INP_FULLRET,GND_RED_LSANG,GND_INP_LSANG,SYS_INP__TRUE,NO_DDV1,FILLER,
// Drive Enable for CE Mode
// set to enable drive functions (CE)
// drive enable when under 8 meters and no valves runnning or if not a ce machine
SYS_VAR_DRVENBL,NO_DDV,SYS_VAR_UNDER8M,NOT_SYS_VAR_VALVE,GND_INP_DOM,SYS_INP__TRUE,NO_DDV1,FILLER,
// drive signal when
// foot switch pressed and plaform mode selected
GND_RLY_DRSIG,NO_DDV,PLT_INP_FOTSW,SYS_VOM_PMODE,SYS_INP_FALSE,SYS_INP_FALSE,NO_DDV1,FILLER,
// Drive Control Direction Signal
// drive unit direction signal when
// joystick drive request "A" and not drive request "B" switch
// but only when
// foot switch and not emergency power mode
// and if drive enabled (CE)
SYS_VAR_DRVREQ1,0X2801,PLT_INP_DRVREQA,NOT_PLT_INP_DRVREQB,SYS_INP_FALSE,SYS_INP_FALSE,NO_DDV1,FILLER,
GND_OUT_DRVCMD1,0X2801,SYS_VAR_DRVREQ1,SYS_VAR_DRVENBL,SYS_INP_FALSE,SYS_INP_FALSE,NO_DDV1,FILLER,
// Drive Control "Go" Signal
// drive unit "go" signal when
// joystick drive request "A" switch or drive request "B" switch
// but only when
// foot switch and not emergency power mode
// and if drive enabled (CE)
SYS_VAR_DRVREQ2,0X2801,PLT_INP_DRVREQA,SYS_INP__TRUE,PLT_INP_DRVREQB,SYS_INP__TRUE,NO_DDV1,FILLER,
GND_OUT_DRVCMD2,0X2801,SYS_VAR_DRVREQ2,SYS_VAR_DRVENBL,SYS_INP_FALSE,SYS_INP_FALSE,NO_DDV1,FILLER,
// Vehicle Motion
// vehicle motion variable when
// drive command 1 or drive command 2
SYS_VAR_ROLL,NO_DDV,GND_OUT_DRVCMD1,SYS_INP__TRUE,GND_OUT_DRVCMD2,SYS_INP__TRUE,NO_DDV1,FILLER,
// Boom Full Cradle Interlock
// boom full cradled interlock when
// boom cradled switch and fully retracted switch
SYS_VAR_BMCRA,0x0000,GND_INP_BMCRA,GND_INP_FULLRET,SYS_INP_FALSE,SYS_INP_FALSE,NO_DDV1,FILLER,
// High Drive Range Signal
// high drive range, once active stays active until the foot switch is released
// system storage hi drive signal when
// system high range request and platform mode or gnd signal hi drive
// but only when cradle switch error not active and full retract switch error not active.
SYS_VAR_HIDRV,0x0000,SYS_VOM_HSREQ,SYS_VOM_PMODE,GND_OUT_HIDRV,SYS_INP_FALSE,NO_DDV1,FILLER,
SYS_VAR_HIDRV,0x0000,SYS_VAR_HIDRV,GND_INP_LEVEL,SYS_INP_FALSE,SYS_INP_FALSE,NO_DDV1,FILLER,
GND_OUT_HIDRV,0X0001,SYS_VAR_HIDRV,SYS_VAR_BMCRA,SYS_INP_FALSE,SYS_INP_FALSE,0x0900,FILLER,
// Led High Drive
// high range led when
// high drive range requested
PLT_LED_HIDRV,NO_DDV,GND_OUT_HIDRV,SYS_INP__TRUE,SYS_INP_FALSE,SYS_INP_FALSE,NO_DDV1,FILLER,
// VALVE ACTIVATION VARIABLES
// ==========================================
// the following set of equations in this section are utilized only
// to result in one equation which sets a variable which is true when
// any valve is active: SYS_VAR_VALVE
// Any Valve
```

```
// set with any valve function
SYS_VAR_VALVE,NO_DDV,SYS_VAR_LJLRI,SYS_INP__TRUE,SYS_VAR_SRREX,SYS_INP__TRUE,NO_DDV1,FILL
ER,
SYS_VAR_VALVE,NO_DDV,SYS_VAR_VALVE,NOT_SYS_VAR_ROLL,SYS_VAR_VALVE,GND_INP_DOM,NO_DD
V1,FILLER,
// Hydraulic Pump Signal
// hydraulic pump signal when
// not emergency power and any valid system boom control valve and not rolling (CE)
// or  not emergency power and any valid system boom control valve and not a ce machine
// or brake release pressure build request and driving request
SYS_VAR_PMPREQ,NO_DDV,NOT_SYS_VOM_EMODE,SYS_VAR_VALVE,SYS_INP_FALSE,SYS_INP_FALSE,NO_D
DV1,FILLER,
SYS_VAR_PMPREQ,NO_DDV,SYS_VAR_PMPREQ,NOT_SYS_VAR_ROLL,SYS_VAR_PMPREQ,GND_INP_DOM,NO_
DDV1,FILLER,
GND_RLY_PMPSG,NO_DDV,SYS_VAR_PMPREQ,SYS_INP__TRUE,GND_INP_BRKPSI,SYS_VAR_ROLL,NO_DDV1,F
ILLER,
// Platform Rotate Variable
// set when platform rotate cc-ccw
// platform rotate variable when
// rotate function clockwise  or rotate fct counter-clockwisec
SYS_VAR_ROTAT,NO_DDV,GND_VLV_ROTCW,SYS_INP__TRUE,GND_VLV_ROTCC,SYS_INP__TRUE,NO_DDV1,F
ILLER,
// Body Swing Variable
// set when body swing cc-ccw
// body swing variable when
// swing function clockwise or swing function counter-clockwisec
SYS_VAR_SWING,NO_DDV,GND_VLV__SWCC,SYS_INP__TRUE,GND_VLV__SWCW,SYS_INP__TRUE,NO_DDV1,F
ILLER,
// Swing/Rotate Variable
// set with any swing or rotate function
// swing/rotate variable when
// platform rotate variable or body swing varibale
SYS_VAR_SWROT,NO_DDV,SYS_VAR_SWING,SYS_INP__TRUE,SYS_VAR_ROTAT,SYS_INP__TRUE,NO_DDV1,FI
LLER,
// Retract/Extend Variable
// set with extend or retract function
// extend retract variable set when
// retract valve active or extend valve active
SYS_VAR_EXRET,NO_DDV,GND_VLV_RTRCT,SYS_INP__TRUE,GND_VLV_EXTND,SYS_INP__TRUE,NO_DDV1,FI
LLER,
// Swing Rotate Retract or Extend Variable
// set with swing rotate extend or retract function
// swing/rotate variable when
// platform rotate variable or body swing variable
SYS_VAR_SRREX,NO_DDV,SYS_VAR_EXRET,SYS_INP__TRUE,SYS_VAR_SWROT,SYS_INP__TRUE,NO_DDV1,FI
LLER,
// Jib Down/Lift Down Variable
// set when jib or lift motion down
// jib down/lift down set when
// jib down function or lift down function
SYS_VAR_JIBLT,NO_DDV,GND_VLV_JIBDN,SYS_INP__TRUE,GND_VLV_LFTDN,SYS_INP__TRUE,NO_DDV1,FILL
ER,
// Level Variable
// set with any level function motion
// level variable when
// level up function or level down function
SYS_VAR_LEVEL,NO_DDV,GND_VLV_LVLUP,SYS_INP__TRUE,GND_VLV_LVLDN,SYS_INP__TRUE,NO_DDV1,FI
LLER,
// Jib Up/Lift Up Variable
// set when jib or lift motion up
// jib up/lift up set when
// jib up function or up down function
```

```
SYS_VAR_JILUP,NO_DDV,GND_VLV_JIBUP,SYS_INP__TRUE,GND_VLV_LFTUP,SYS_INP__TRUE,NO_DDV1,FILL
ER,
// Jib-down/Lift-down Level up-dn Variable
// set with jib/lift down or either level motion function
// jib/lift/level variable set when
// level variable set or jib down/lift down variable set
SYS_VAR_LEJLT,NO_DDV,SYS_VAR_LEVEL,SYS_INP__TRUE,SYS_VAR_JIBLT,SYS_INP__TRUE,NO_DDV1,FILLE
R,
// Lift Jib or Level
// set with any jib lift or level motion function
// jib/lift/level variable set when
// level jib or lift variable set
SYS_VAR_LJIBL,NO_DDV,SYS_VAR_JILUP,SYS_INP__TRUE,SYS_VAR_LEJLT,SYS_INP__TRUE,NO_DDV1,FILLE
R,
// Riser
// set with either riser up or riser down valve
// riser up/down variable when
// riser up valve or riser down valve
SYS_VAR_RISER,NO_DDV,GND_VLV_RISDN,SYS_INP__TRUE,
GND_VLV_RISUP,SYS_INP__TRUE,NO_DDV1,FILLER,
// Riser Lift Jib or Level
// set with any jib lift riser or level motion function
// riser jib lift or level variable when
// riser variable or lift/jib variable set
SYS_VAR_LJLRI,NO_DDV,SYS_VAR_RISER,SYS_INP__TRUE,SYS_VAR_LJIBL,SYS_INP__TRUE,NO_DDV1,FILLE
R,
// BOOM SPEED CONTROLLER SPEED TRIM INPUTS (aka Sevcon profile inputs)
// ===========================================================
// Full Speed Case A
// no trim output voltage when
// riser up, extend or retract valves
SYS_VAR_NOTRIMA,NO_DDV,GND_VLV_RISUP,SYS_INP__TRUE,SYS_VAR_EXRET,SYS_INP__TRUE,NO_DDV1,
FILLER,
// Full Speed Case B
// no trim output voltage when
// [(brake release pressure request and no valves)]
// but onlly when footswitch
SYS_VAR_NOTRIMB,0x0001,GND_INP_BRKPSI,NOT_SYS_VAR_VALVE,SYS_INP_FALSE,SYS_INP_FALSE,NO_DD
V1,FILLER,
// Full Speed Command
// no trim output voltage when
// riser up, extend or retract valves
SYS_VAR_NOTRIM,NO_DDV,SYS_VAR_NOTRIMA,SYS_INP__TRUE,SYS_VAR_NOTRIMB,SYS_INP__TRUE,NO_D
DV1,FILLER,
// Half Speed Allowed
// trim output voltage by 50% when
// jib up or main up valves
VOM_POT_TRIM50,NO_DDV,GND_VLV_JIBUP,SYS_INP__TRUE,GND_VLV_LFTUP,SYS_INP__TRUE,NO_DDV1,FI
LLER,
// Quarter Speed Allowed
// trim output voltage to 25% when
// when not sys_var_notrim and not vom_pot_trim50
// in other words when any other valve is operating other than those listed in the
// above two equations.
VOM_POT_TRIM25,NO_DDV,NOT_VOM_POT_TRIM50,NOT_SYS_VAR_NOTRIM,SYS_INP_FALSE,SYS_INP_FALSE
,NO_DDV1,FILLER,
// STEER FUNCTIONS
// ===============
// Steer Left Function
// steer left when
// platform foot switch and joystick steer left
```

```
GND_VLV_STLFT,NO_DDV,PLT_INP_FOTSW,PLT_INP_STLFT,SYS_INP_FALSE,SYS_INP_FALSE,NO_DDV1,FILLE
R,
// Steer Right Function
// steer right when
// platform foot switch and joystick steer right
GND_VLV_STRRT,NO_DDV,PLT_INP_FOTSW,PLT_INP_STRRT,SYS_INP_FALSE,SYS_INP_FALSE,NO_DDV1,FILLE
R,
// EMERGENCY / AUXILLIARY POWER
//==========================
// Steer Variable
// set when steer input and foot switch
// steer variable set when
// joystick steer right or joystick steer left
// but only when
// foot switch
SYS_VAR_STEER,0X0001,PLT_INP_STRRT,SYS_INP__TRUE,PLT_INP_STLFT,SYS_INP__TRUE,NO_DDV1,FILLER,
// Auxilliary Pump Relay
// auxilliary hydraulic pump active when
// system steer function or emergency mode and boom control valve
GND_RLY_AXPMP,NO_DDV,SYS_VAR_STEER,SYS_INP__TRUE,SYS_VOM_EMODE,SYS_VAR_VALVE,NO_DDV1,
FILLER,
// Emergency Power LED's
// ground led em pwr when
// emergency mode variable set and ground mode or platform emergency power led
GND_LED_EMPWR,NO_DDV,SYS_VOM_EMODE,SYS_VOM_GMODE,PLT_LED_EMPWR,SYS_VOM_PMODE,NO_D
DV1,FILLER,
// platform led e-pwr when
// emergency mode variable set and platform mode or ground emergency power led
PLT_LED_EMPWR,NO_DDV,SYS_VOM_EMODE,SYS_VOM_PMODE,GND_LED_EMPWR,SYS_VOM_GMODE,NO_D
DV1,FILLER,
// Emnergency Power Diverting Valve
// ground valve empwr when
// aux pump on and sys var valve on
GND_VLV_EMPWR,NO_DDV,GND_RLY_AXPMP,SYS_VAR_VALVE,SYS_INP_FALSE,SYS_INP_FALSE,NO_DDV1,F
ILLER,
// MACHINE WARNINGS AND ALARMS
//==========================
// Horn
// horn when
// platform horn switch or gnd horn switch
GND_ALM__HORN,NO_DDV,PLT_PSW__HORN,SYS_INP__TRUE,SYS_INP_FALSE,SYS_INP_FALSE,NO_DDV1,FIL
LER,
// Tilt Alarm
// tilt alarm when
// not level switch and not boom cradled switch
GND_ALM__TILT,NO_DDV,NOT_GND_INP_LEVEL,GND_RED_BMCRA,SYS_INP_FALSE,SYS_INP_FALSE,NO_DD
V1,FILLER,
// Motion Alarm
// motion alarm when (drive motion and gnd input2) or (down motion and gnd input1) or
// when (gnd input1 and gnd input2 and any motion)
SYS_VAR_DOWN,NO_DDV,GND_VLV_JIBDN,SYS_INP__TRUE,GND_VLV_RTRCT,SYS_INP__TRUE,NO_DDV1,FIL
LER,
SYS_VAR_DOWN,NO_DDV,SYS_VAR_DOWN,SYS_INP__TRUE,GND_VLV_RISDN,SYS_INP__TRUE,NO_DDV1,FIL
LER,
SYS_VAR_DOWN,NO_DDV,SYS_VAR_DOWN,SYS_INP__TRUE,GND_VLV_LFTDN,SYS_INP__TRUE,NO_DDV1,FIL
LER,
SYS_VAR_DOWN,NO_DDV,SYS_VAR_DOWN,SYS_INP__TRUE,GND_VLV_LVLDN,SYS_INP__TRUE,NO_DDV1,FIL
LER,
SYS_VAR_MA1,NO_DDV,GND_INP_ALM2,SYS_VAR_ROLL,GND_INP_ALM1,SYS_VAR_DOWN,NO_DDV1,FILLER,
SYS_VAR_ALLMOT,NO_DDV,GND_INP_ALM1,GND_INP_ALM2,SYS_INP_FALSE,SYS_INP_FALSE,NO_DDV1,FILL
ER,
```

```
SYS_VAR_MA2.NO_DDV.SYS_VAR_UP_DN,SYS_VAR_ALLMOT,SYS_VAR_ROLL,SYS_VAR_ALLMOT.NO_DDV1.
FILLER.
GND_ALM_MOTIO.NO_DDV,SYS_VAR_MA1.SYS_INP__TRUE,SYS_VAR_MA2.SYS_INP__TRUE.NO_DDV1,FILLER
,
// Platform Function Alert
// function alert beeper when
// system variable chirp set
PLT_OUT_ALERT,NO_DDV,SYS_VOM_CHIRP,SYS_INP__TRUE,SYS_INP_FALSE,SYS_INP_FALSE,NO_DDV1.FILL
ER,
JS_NULL__DATA,NO_DDV,SYS_INP_FALSE,SYS_INP_FALSE,SYS_INP_FALSE,SYS_INP_FALSE,NO_DDV1,FILLER
};
#endif
```

Appendix - B

Database Features as of 02-23-98 (software revision 1.2/1.3)

Switch Errors And Error Handling Features

Limit Switch Errors. The control system monitors the limit switch inputs and will detect errors if the inputs are not consistent with predetermined states. An advantage of electronically controlled systems over mechanically controlled systems is that decisions can be based on a given set of switch states to disallow certain operations and functions. There are two types of limit switch errors, those that are associated directly with the poles of the switch and those which are determined by relative comparison to the states of other limit switches.

Type-I Switch Errors: Incorrect Switch Pole States. The limit switches utilized on the apparatus are single pole double throw type switches. Each limit switch in the system has both poles wired into the controller. For each state of the limit switch, there is a discrete input into the control system. This methodology requires and utilizes more system inputs, but it also greatly enhances the safety of the apparatus because improper combinations of the limit switch can be monitored.

For example, in a traditional system (electromechanical control), a limit switch may be configured to indicate that the boom angle is low. The switch needs only a single pole and would indicate the following states.

| BOOM POSITION | LS INPUT | LS (REDUNDANT) INPUT |
|---|---|---|
| LOW ANGLE | ON | NONE |
| HIGH ANGLE | OFF | NONE |

With this type of limit switch, a system would not be capable of determining if the low angle limit switch wire became shorted or opened. An operator could potentially operate the machine while conditions are not stable.

With the electronic control system, and redundant limit switch state monitoring, the switch now can attain four discrete states as follows:

| BOOM POSITION | LS INPUT | LS (REDUNDANT) INPUT |
|---|---|---|
| LOW ANGLE | ON | OFF |
| HIGH ANGLE | OFF | ON |
| ERROR STATE | OFF | OFF |
| ERROR STATE | ON | ON |

Based on these states, a short or broken wire can be detected by the control system.

Limitations. There are certain limitations associated with single redundancy monitoring. It is feasible that a cable can be sheared or that a switch can be crushed resulting in one of the limit switch wires shorted to positive voltage (ON)and the other switch wire shorted open (OFF).

Another limitation of single redundancy checking is that it cannot protect against or detect a situation when a limit switch is wired backwards (the main and redundant poles are switched). In this case, to the system, the switch would (if not in error states) appear to the controller to be functioning correctly.

Type-II Switch Errors: Inconsistent Limit Switch States. A secondary switch error monitoring method is in place that will minimize (not necessarily eliminate) the potential of the limitations detailed above. The method compares certain limit switch states with expected states of other limit switches. As an example, if the *fully retracted* limit switch is ON, it is then expected that the *extended less than 33 inches* limit switch is also ON. If this is not the case, then an inconsistent switch state exists and an error is logged in the system. It is noted that the inconsistent switch error is only active if there are no other switch errors present. If there are other switch errors present, then the Type-II limit switch error can not be determined with any accuracy. Further, the Type-II limit switch error can be utilized by the database - so the existence of this particular error can be handled as a discrete case.

Type-II errors are recognized as follows:

Detect: If the fully retracted limit switch is ON, then the extension under 33" limit switch should also be ON.

Detect: If the boom cradled limit switch is ON, then the main boom angle low limit switch should also be ON.

With the above two comparisons, the system can potentially detect wiring errors in the following switches:

Fully Retracted Limit Switch
Extension Limit Switch
Boom Cradled Limit Switch
Main Boom Angle Limit Switch Limitations. There exist limitations in the overall switch error detection methodology. It is feasible that the fully retracted limit switch is wired in reverse and that the extension limit switch is also wired in reverse - thereby giving false indication that limit switches are not inconsistent.

IMPORTANT NOTE: *It is important that the limit switch states and all operation of the apparatus including the limit switch and envelope operation be verified by a qualified technician after any limit switch is wired - either at time of manufacture, or at the time a switch is serviced or repaired, or at any time the apparatus wiring is modified regardless of whether the wiring changes are done at the switch or at any other point in the system. It is important that after any wiring or wiring service is done to the manlift apparatus in any way, that the limit switch states and all of the apparatus including the limit switch and envelope operation be verified by a qualified technician.*

Limit Switch Error States and the Database

Limit Switch Error Manager DDV (DDV1). The database can utilize the results of the LM DDV by making certain database output expressions dependent on the state of the limit switch errors. The level of function exclusion can vary from basic to complex, depending on the system requisites and the adeptness of the database designer.

The initial release of the database for the ATB-38E incorporates (entirely through the database by the use of the LM DDV) the following function limitations:

Note: If inconsistent switch data or multiple (more than one) switch error is detected (v1.3), all motion is stopped.

| FUNCTION | RESTRICTED BY |
|---|---|
| Telescope Boom Retract | • jib angle high while extension limit switch or main boom angle limit switch errors are active |
| Telescope Boom Extend | • jib angle high while extension limit switch or main boom angle limit switch errors are active<br>• extension limit switch error active<br>• main boom limit switch error active |
| Main Boom Down | • jib angle high while extension limit switch or main boom angle limit switch errors are active<br>• extension limit switch error active<br>• main boom low limit switch error active |
| Main Boom Up | • jib angle high while extension limit switch or main boom angle limit switch errors are active<br>• extension limit switch error active<br>• main boom low limit switch error active<br>• jib angle low limit switch error active |
| Jib Boom Up | • extension limit switch error active<br>• main boom low limit switch error active<br>• jib angle low limit switch error active |
| Jib Boom Up | • always allowed |
| Riser Boom Down | • jib angle high while extension limit switch or main boom angle limit switch errors are active |
| Riser Boom Up | • jib angle high while extension limit switch or main boom angle limit switch errors are active |

| | |
|---|---|
| Platform Level Down | • jib angle high while extension limit switch or main boom angle limit switch errors are active |
| Platform Level Up | • jib angle high while extension limit switch or main boom angle limit switch errors are active |
| Platform Rotate | • jib angle high while extension limit switch or main boom angle limit switch errors are active |
| Body Swing | • jib angle high while extension limit switch or main boom angle limit switch errors are active |

Motion Alarm Selection

The database has been designed to allow 4 different states of the motion alarm. The table describes these states.

| ALARM INPUT 1 | ALARM INPUT 2 | ALARM TYPE |
|---|---|---|
| OFF | OFF | NONE |
| OFF | ON | DESCENT MOTION ALARM ONLY |
| ON | OFF | DRIVE MOTION ALARM ONLY |
| ON | ON | ANY MOTION ALARM |

CE/Domestic Operation

The database enables and disables certain operations when the domestic apparatus input is active. The following features are controlled entirely by the database when the domestic operation is off (CE Mode):

- When operating a boom function, drive functions are disabled.
- When operating a drive function, boom functions are disabled.
- When the boom is not cradled, platform level functions are disabled.
- When the boom angle is high and the telescope boom is not fully retracted, drive functions are disabled.
- If the platform control station emergency stop switch is not in the "STOP" position, control from the ground station is disabled - emergency power mode overrides this feature.

Type 33 Apparatus Operation

The database disables certain functions when the Type 33 input is active. The following functions are controlled by the database when the input is activated (grounded):

- Platform rotate functions are disabled.
- Telescoping boom functions are disabled.

PLATFORM INPUTS AND OUTPUTS

Platform Control Station Inputs

The platform control station has two primary input banks: the switch input matrix and the discrete digital input terminal strip. The platform controller scans a 4x5 switch matrix for operator commands, and monitors discrete digital inputs for interlock inputs (foot switch, jib limit switches and emergency stop switch). The interlocks are input into the control system so that they may be included in the database description of the machine. Certain interlocks are also routed to the apparatus interlock circuits which are external the control system.

Switch Matrix Inputs (ATB 33 System). The switch panel matrix inputs for the ATB 33 machine are as follows:

| BUTTON | DESCRIPTION |
|---|---|
| HORN | Operates the electrical horn located at the base of the machine. |
| RANGE | Selects speed range (high range or low range) for the drive system. The operation of this function is governed by the position of interlocks (see database description). |
| BASE SWING FUNCTION | Generates a request for the base swing function. The base of the machine will rotate 180 degrees in either direction. |
| | NOTE: For all boom functions, the activation, direction and speed will be dictated and controlled by the boom joystick inputs, and each function is governed by the position of the interlock inputs - refer to the database description for each particular function. |
| RISER BOOM FUNCTION | Generates a request for the riser boom function. The riser boom will raise and lower the level of the platform. |
| MAIN BOOM FUNCTION | Generates a request for the main boom function. The main boom operates about a pivot point and will raise and bring inward the position of the platform, or lower and force outward the position of the platform. |
| TELESCOPING BOOM FUNCTION | Generates a request for the telescoping boom function. The telescoping boom will (depending on the angle of the main boom) extend and force upward or lower and force inward the position of the platform. |

| | |
|---|---|
| JIB BOOM FUNCTION | Generates a request for the jib boom function. The jib boom operates about a pivot point and when below the horizontal position the function will raise and bring inward, or lower and force outward the position of the platform; and when below the horizontal position the function will raise and force outward, or lower and force inward the position of the platform. |
| PLATFORM LEVEL FUNCTION | Generates a request for the platform level function. |
| PLATFORM ROTATE FUNCTION | Generates a request for the platform rotation function. The platform will rotate 180 degrees. |
| EMERGENCY POWER | Generates a request for the emergency hydraulic pump. The emergency hydraulic pump is driven by an electric motor connected to the emergency 12 VDC battery. |

Terminal Strip Inputs(ATB 33 System). The terminal strip inputs for the platform control station are as follows:

| **INPUT** | **DESCRIPTION** |
|---|---|
| JOYSTICK DRIVE SIGNAL A | Drive command input to the control system. |
| JOYSTICK DRIVE SIGNAL B | Drive direction input to the control system. |
| DRIVE JOYSTICK STEER RT SIGNAL | Steer right input to the control system. |
| DRIVE JOYSTICK STEER LFT SIGNAL | Steer left input to the control system. |
| FOOT SWITCH INTERLOCK | Foot switch interlock input to the control system. NOTE: this interlock is also connected by a discrete wire to the interlock circuits located at the base of the machine. |
| EMERGENCY STOP INTERLOCK | Emergency stop switch and interlock input to the control system. NOTE: this interlock is also connected by a discrete wire to the interlock circuits located at the base of the machine. |
| JIB LOW ANGLE INTERLOCK | Limit switch input to the control system when the jib boom is at lower angle. |
| JIB LOW ANGLE REDUNDANT INTLK | Limit switch input to the control system when the jib boom is not at lower angle. |
| BOOM JOYSTICK X-AXIS INPUT | Proportional analog input representing the boom joystick x-axis position. |
| BOOM JOYSTICK Y-AXIS INPUT | Proportional analog input representing the boom joystick y-axis position. |

Drive Joystick Direction Inputs. Two drive joystick direction inputs are utilized to command the forward and reverse drive functions. The joystick utilized for the drive function is common to other machines and has the following truth table for drive direction (see also drive controller input signals section):

| STICK PUSHED TO: | FWD | REV |
|---|---|---|
| DRIVE SIGNAL "A" | ON | ON |
| DRIVE SIGNAL "B" | OFF | ON |

Platform Control Station Outputs

The platform control station has two primary output banks: the LED output matrix and the discrete digital output terminal strip. The platform controller refreshes a 4x4 LED matrix for indicating functions and feedback, and also controls discrete digital outputs for alarms. The states of the LEDs at the platform station are determined by the system database and are sent to the platform control station from the ground control station via the system (CAN) network.

LED Matrix Outputs (ATB 33 System). The platform LED matrix outputs for the ATB 33 machine are as follows:

| LED | DESCRIPTION |
|---|---|
| RANGE LED | Indicates high range speed active. |
| BASE SWING LED | Indicates base swing function selected. |
| RISER BOOM LED | Indicates riser boom function selected. |
| MAIN BOOM LED | Indicates main boom function selected. |
| TELESCOPING BOOM LED | Indicates telescoping boom function selected, or auto retract mode active. |
| JIB BOOM LED | Indicates jib boom function selected. |
| PLATFORM LEVEL LED | Indicates platform level function selected. |
| PLATFORM ROTATE LED | Indicates platform rotate function selected. |
| EMERGENCY POWER | Indicates emergency power mode selected. |
| BATTERY BANK (48VDC) LEDs | Indicates the state of the 48 volt battery bank. |
| STATUS OKAY LED | Indicates no errors present in system. |
| STATUS WARNING LED | Indicates errors present in system. |
| NUMERIC DISPLAY | Reports the system errors and status. |

Terminal Strip Outputs(ATB 33 System). The terminal strip outputs for the platform control station are as follows:

| INPUT | DESCRIPTION |
|---|---|
| FUNCTION ALERT SIGNAL | A buzzer which indicates switch presses and various other function control states. |

PLATFORM CONTROL STATION CONNECTIONS/TERMINATIONS

Platform Control Station Cable Connector. There is one cable which connects the platform control station to the ground control station. Between the two stations, there are eleven (11) signal and power supply wires (refer to schematic dwg #102785).

CONNECTOR: Deutsch P/N HD34-24-19PN

| CONN POSITION | CIRCUIT | DESCRIPTION |
|---|---|---|
| 1 | CAN SHIELD | shield wire for CAN bus |
| 2 | CAN LOW | CAN signal |
| 3 | CAN HIGH | CAN signal |
| 4 | spare | - |
| 5 | JIB SW POWER | power to jib angle limit switch |
| 6 | DRIVE SPEED 1 | drive speed signal |
| 7 | DRIVE SPEED 2 | drive speed signal |
| 8 | GROUND | battery ground |
| 9 | PLATFORM SIGNAL | platform emergency stop interlock |
| 10 | KEY IGNITION | platform +14vdc power supply |
| 11 | FOOT SWITCH 1 | platform foot switch supply |
| 12 | spare | - |
| 13 | FOOT SWITCH 2 | platform foot switch return (signal) |
| 14 | spare | - |
| 15 | TILT ALARM | actives tilt alarm |
| 16 | spare | - |
| 17 | JIB ANGLE NOT LOW | jib angle not low limit switch |
| 18 | spare | - |
| 19 | JIB LOW ANGLE | jib angle low limit switch |

Platform Control Station Terminal Strip. There is a terminal strip on the control card which interfaces the control station to the outside world - it is defined as follows:

| TERMINAL | CIRCUIT | DESCRIPTION |
|---|---|---|
| 1 | KEY IGNITION* | platform +14vdc power supply |
| 2 | unused analog | - |
| 3 | JOYSTICK X-AXIS | boom joystick x-axis position |
| 4 | JOYSTICK Y-AXIS | boom joystick y-axis position |
| 5 | DRIVE SIGNAL B | drive joystick direction input (on = reverse) |
| 6 | DRIVE SIGNAL A | drive joystick drive command input (on = drive) |
| 7 | STEER RIGHT | drive joystick steer right input |
| 8 | STEER RIGHT | drive joystick steer right input |
| 9 | FOOT SWITCH 2* | foot switch signal input |
| 10 | PLATFORM SIGNAL* | platform emergency stop interlock |
| 11 | unused input | - |
| 12 | unused input | - |

54

| TERMINAL | CIRCUIT | DESCRIPTION |
|---|---|---|
| 13 | JIB LOW ANGLE | jib low angle limit switch input |
| 14 | JIB NOT LOW ANGLE | redundant limit switch - not low angle |
| 15 | ALERT OUTPUT | function alert buzzer output |
| 16 | unused output | - |
| 17 | no connection | - |
| 18 | no connection | - |
| 19 | CAN SHIELD* | shield wire for CAN bus |
| 20 | CAN LOW* | CAN signal |
| 21 | CAN HIGH* | CAN signal |
| 22 | +5 VDC OUT | 5 volt supply for boom joystick |
| 23 | GROUND* | battery ground |
| 24 | GROUND | battery ground to boom joystick |

*denotes circuit connects to boom cable connector

GROUND CONTROL STATION

OPERATION OVERVIEW

Drive and Steer Functions. An operator cannot drive or steer the apparatus from the ground control station.

Boom Functions. To operate any boom function from the ground control station, it is a requirement that the key be turned to the "on" position, the ground emergency stop switch be set (pulled out) and the ground mode interlock switch be set (depressed). After these two interlocks are made, the operator may select and activate any boom function.

To select a boom function, the operator must press the desired boom section button. When a function button is pressed, an alert buzzer will beep once to indicate that the function has been selected, and the associated panel LED will illuminate.

To activate a boom function, the user must select and hold an appropriate boom direction and speed button. The pump motor speed will ramp to the selected boom speed (slow or fast).

*Note: certain boom functions are dependent on the state of the limit switch interlock states.*

To stop motion of the active function, the operator may release the boom direction button. Although motion has been stopped, the selected function will remain active until one of the following three situations occur:

1. No motion is requested by the operator for more than 10 seconds,
2. The ground mode interlock switch is released, or
3. The emergency stop switch is released (note this disconnects power to the entire control system - see interlock and power section).

If there is no activity at the ground control station for more than three minutes, the system will deselect all functions and will go into a power saving sleep mode. The alert buzzer will beep once to indicate the change in system status. Inactivity from the ground is described as no activity on the ground mode interlock switch.

When operating from the ground control station, the operator can recover from power saving (inactivity) mode by activation of the ground mode interlock switch.

GROUND STATION CONTROL INPUTS AND OUTPUTS

Ground Control Station Inputs. The ground control station has two primary input banks: the switch input matrix and the discrete digital inputs from the interface connectors. The ground controller scans a 4x5 switch matrix for operator inputs, and monitors discrete digital inputs for interlocks and warnings (tilt sensor and boom limit switches).

Ground Control Panel Switch Matrix Inputs (ATB 33/38 System). The ground switch panel matrix inputs for the ATB 33 machine are as follows:

| BUTTON | DESCRIPTION |
|---|---|
| GROUND CONTROL SWITCH | Ground control interlock switch. The switch is equivalent to the foot interlock switch at the platform control station. |
| BASE SWING FUNCTION | Generates a request for the base swing function. The base of the machine will rotate 180 degrees in either direction.<br><br>NOTE: When operating from the GCS,the boom function activation, direction and speed will be dictated and controlled by the boom speed and direction inputs, and each function is governed by the position of the interlock inputs - refer to the database description for each particular function. |
| RISER BOOM FUNCTION | Generates a request for the riser boom function. The riser boom will raise and lower the level of the platform. |
| MAIN BOOM FUNCTION | Generates a request for the main boom function. The main boom operates about a pivot point and will raise and bring inward the position of the platform, or lower and force outward the position of the platform. |
| TELESCOPING BOOM FUNCTION | Generates a request for the telescoping boom function. The telescoping boom will (depending on the angle of the main boom) extend and force upward the or lower and force inward the position of the platform. |

| | |
|---|---|
| JIB BOOM FUNCTION | Generates a request for the jib boom function. The jib boom operates about a pivot point and when below the horizontal position the function will raise and bring inward, or lower and force outward the position of the platform; and when below the horizontal position the function will raise and force outward, or lower and force inward the position of the platform. |
| PLATFORM LEVEL FUNCTION | Generates a request for the platform level function. |
| PLATFORM ROTATE FUNCTION | Generates a request for the platform rotation function. The platform will rotate 180 degrees. |
| EMERGENCY POWER | Generates a request for the emergency hydraulic pump. The emergency hydraulic pump is driven by an electric motor connected to the emergency 12 VDC battery. |
| UP HIGH SPEED | Initiates an appropriate requested function upward at fast pump motor speed. |
| UP LOW SPEED | Initiates an appropriate requested function upward at slow pump motor speed. |
| DOWN HIGH SPEED | Initiates an appropriate requested function downward at fast pump motor speed. |
| DOWN LOW SPEED | Initiates an appropriate requested function downward at slow pump motor speed. |
| CW HIGH SPEED | Initiates an appropriate requested function clockwise at fast pump motor speed. |
| CW LOW SPEED | Initiates an appropriate requested function clockwise at slow pump motor speed. |
| CCW HIGH SPEED | Initiates an appropriate requested function counter-clockwise at fast pump motor speed. |
| CCW LOW SPEED | Initiates an appropriate requested function counter-clockwise at slow pump motor speed. |

Ground Control Station Discrete Inputs(ATB 33/38 System). The apparatus inputs are connected to the controller via the Deutsch connectors located on the GCS enclosure. The following inputs are defined:

| **INPUT** | **DESCRIPTION** |
|---|---|
| LOW BRAKE RELEASE PRESSURE | Indicates pressure too low to release the wheel brakes for drive operations. |
| TILT SWITCH | Indicates apparatus is tilted (tilt switch active). |
| MAIN BOOM DOWN INPUT | Active when main boom is full down. |
| MAIN BOOM NOT DOWN INPUT | Active when main boom is not full down. |
| MAIN BOOM HIGH ANGLE INPUT | Active when main boom angle is high (over 33 degrees). |

| INPUT | DESCRIPTION |
| --- | --- |
| MAIN BOOM NOT HIGH ANGLE INPUT | Active when main boom angle is not high. |
| MAIN BOOM EXTENDED INPUT | Active when main boom is extended over 33". |
| MAIN BOOM NOT EXTENDED INPUT | Active when main boom is not extended over 33". |
| MAIN BOOM RETRACTED INPUT | Active when main boom is fully retracted. |
| MAIN BOOM NOT RETRACTED INPUT | Active when main boom is not fully retracted. |

Ground Control Station Outputs. The ground control station has two primary output banks: the LED output matrix and the high side driver output bank (master controller driver card). The driver card is connected to the devices on the apparatus through several Deutsch connectors located on the GCS enclosure. The ground controller refreshes a 4x4 LED matrix for indicating functions and feedback, and also controls digital outputs for valves, alarms, solenoids and relays. The states of the LEDs at the ground station are determined by the system database and are sent to the ground station control LED/switch interface card via the system (CAN) network.

LED Matrix Outputs (ATB 33 System). The ground LED matrix outputs for the ATB 33 machine are as follows:

| LED | DESCRIPTION |
| --- | --- |
| BASE ROTATE LED | Indicates base rotate function selected. |
| RISER BOOM LED | Indicates riser boom function selected. |
| MAIN BOOM LED | Indicates main boom function selected. |
| TELESCOPING BOOM LED | Indicates telescoping boom function selected. |
| JIB BOOM LED | Indicates jib boom function selected. |
| PLATFORM LEVEL LED | Indicates platform level function selected. |
| PLATFORM ROTATE LED | Indicates platform rotate function selected. |
| EMERGENCY POWER | Indicates emergency power mode selected. |
| PLATFORM CONTROL MODE LED | Indicates system in platform control mode. |
| GROUND CONTROL MODE LED | Indicates system in ground control mode. |
| STATUS OKAY LED | Indicates no errors present in system. |
| STATUS WARNING LED | Indicates errors present in system. |
| NUMERIC DISPLAY | Reports active system errors. |

Ground Control Station Outputs (ATB 33/38 System). The connector outputs for the ground control station are as follows:

| OUTPUT | DESCRIPTION |
|---|---|
| VALVE: PLATFORM ROTATE CW | Activates platform rotate clockwise valve. |
| VALVE: PLATFORM ROTATE CCW | Activates platform rotate cntr-clockwise valve. |
| VALVE: TELESCOPING BOOM EXTEND | Activates telescoping boom extend valve. |
| VALVE: TELESCOPING BOOM RETRACT | Activates telescoping boom retract valve. |
| VALVE: MAIN BOOM UP | Activates main boom up valve. |
| VALVE: MAIN BOOM DOWN | Activates main boom down valve. |
| VALVE: JIB BOOM UP | Activates jib boom up valve. |
| VALVE: JIB BOOM DOWN | Activates jib boom down valve. |
| VALVE: PLATFORM LEVEL UP | Activates platform level up valve. |
| VALVE: PLATFORM LEVEL DOWN | Activates platform level down valve. |
| VALVE: APPARATUS BASE ROTATE CW | Activates base rotate clockwise valve. |
| VALVE: APPARATUS BASE ROTATE CCW | Activates base rotate counter-clockwise valve. |
| VALVE: RISER BOOM UP | Activates riser boom up valve. |
| VALVE: RISER BOOM DOWN | Activates riser boom down valve. |
| VALVE: STEER LEFT | Activates steer left valve. |
| VALVE: STEER RIGHT | Activates steer right valve. |
| VALVE: EMERGENCY POWER HYD | Activates emergency hydraulics valve. |
| SIGNL: DRIVE COMMAND 1 | Activates drive command input to drive system. |
| SIGNL: DRIVE COMMAND 2 | Activates drive command input to drive system. |
| SIGNL: DRIVE HIGH RANGE | Activates high range input to drive system. |
| SIGNL: PUMP SPEED ANALOG | Motor speed control signal to pump controller. |
| ALARM: HORN RELAY | Activates horn relay. |
| ALARM: MACHINE MOTION | Activates motion alerting device. |
| RELAY: 48 VOLT RELAY | Activates pump controller relay (Ignition-2). |

Drive Controller Direction Outputs. Two drive outputs from the boom control system (at the GCS) are connected to inputs on the drive control system. These outputs command the drive function (go) and the drive direction (forward and reverse). The drive command outputs (or drive controller inputs) are defined as follows:

| | FWD | REV |
|---|---|---|
| DRIVE OUTPUT COMMAND 1 | ON | OFF |
| DRIVE OUTPUT COMMAND 2 | ON | ON |

GROUND CONTROL STATION CONNECTIONS/TERMINATIONS

CONNECTOR 1 (INPUT CONNECTOR): Deutsch P/N DT13-12PA

| PIN | TYPE | CIRCUIT | DESCRIPTION |
|---|---|---|---|
| 1 | INPUT | CONTROLLER PWR SUPPLY | +12 VDC supply from interlock/voltage card |
| 2 | INPUT | BATTERY GROUND | ground supply to control system |
| 3 | INPUT | unused (analog) | - |
| 4 | INPUT | unused (pulse) | - |
| 5 | INPUT | FULL RETRACT | full retracted limit switch |
| 6 | INPUT | NOT FULL RETRACT | not fully retracted limit switch |
| 7 | INPUT | EXTENDED LESS THAN 33" | telescoping boom extended less than 33" |
| 8 | INPUT | EXTENDED OVER 33" | telescoping boom extended more than 33" |
| 9 | INPUT | MAIN BOOM ANGLE LOW | main boom angle is low |
| 10 | INPUT | MAIN BOOM ANGLE NOT LOW | main boom angle is not low |
| 11 | INPUT | MAIN BOOM NOT DOWN | main boom is not down (not cradled) |
| 12 | INPUT | MAIN BOOM DOWN | main boom is down (cradled) |

CONNECTOR 2 (I/O CONNECTOR): Deutsch P/N DT13-12PA

| PIN | TYPE | CIRCUIT | DESCRIPTION |
|---|---|---|---|
| 1 | INPUT | TILT SENSOR | input when apparatus tilted |
| 2 | INPUT | BRAKE RELEASE PRESSURE LOW | active when low release pressure |
| 3 | INPUT | unused | - |
| 4 | INPUT | unused | - |
| 5 | OUTPUT | ANALOG BOOM SPEED | analog output to boom speed |
| 6 | INPUT | DEFAULT | power on this pin at poc loads default database |
| 7 | OUTPUT | unused | - |
| 8 | OUTPUT | unused | - |
| 9 | OUTPUT | IGNITION-2 | activates pump ctrl rly (low current 48vdc) |
| 10 | OUTPUT | DRIVE SIGNAL 1 | drive direction signal |
| 11 | OUTPUT | DRIVE SIGNAL 2 | drive signal |
| 12 | OUTPUT | HIGH RANGE | high range output to drive control system |

CONNECTOR 3 (OUTPUT CONNECTOR): Deutsch P/N DT13-12PA

| PIN | TYPE | CIRCUIT | DESCRIPTION |
|---|---|---|---|
| 1 | OUTPUT | JIB DOWN VALVE | valve activation output |
| 2 | OUTPUT | TELESCOPE RETRACT VALVE | valve activation output |
| 3 | OUTPUT | RISER BOOM DOWN VALVE | valve activation output |
| 4 | OUTPUT | RISE BOOM UP VALVE | valve activation output |
| 5 | OUTPUT | BASE SWING CCW VALVE | valve activation output |
| 6 | OUTPUT | BASE SWING CW VALVE | valve activation output |
| 7 | OUTPUT | PLATFORM LEVEL DOWN VALVE | valve activation output |
| 8 | OUTPUT | PLATFORM LEVEL UP VALVE | valve activation output |
| 9 | OUTPUT | MAIN BOOM DOWN VALVE | valve activation output |
| 10 | OUTPUT | JIB BOOM UP VALVE | valve activation output |
| 11 | OUTPUT | MAIN BOOM UP VALVE | valve activation output |
| 12 | OUTPUT | TELESCOPE EXTEND VALVE | valve activation output |

CONNECTOR 4 (OUTPUT CONNECTOR): Deutsch P/N DT13-12PA

| PIN | TYPE | CIRCUIT | DESCRIPTION |
|---|---|---|---|
| 1 | OUTPUT | unused | - |
| 2 | OUTPUT | HORN RELAY | activates the horn |
| 3 | OUTPUT | STEER RIGHT VALVE | valve activation output |
| 4 | OUTPUT | STEER LEFT VALVE | valve activation output |
| 5 | OUTPUT | EMERGENCY POWER VALVE | emergency hydraulic fluid diverting valve |
| 6 | OUTPUT | FOOT SWITCH DRIVE SIGNAL | foot switch signal from database (redundant?) |
| 7 | OUTPUT | unused | - |
| 8 | OUTPUT | unused | - |
| 9 | OUTPUT | MOTION ALARM | active with any apparatus motion |
| 10 | OUTPUT | unused | |
| 11 | OUTPUT | PLATFORM ROTATE CCW | valve activation output |
| 12 | OUTPUT | PLATFORM ROTATE CW | valve activation output |

CONNECTOR 5 (PLATFORM CONNECTOR): Deutsch P/N HD34-24-19PN

| PIN | TYPE | CIRCUIT | DESCRIPTION |
|---|---|---|---|
| 1 | CAN | CAN SHIELD | shield wire for CAN bus |
| 2 | CAN | CAN LOW | CAN signal |
| 3 | CAN | CAN HIGH | CAN signal |
| 4 | - | spare | - |
| 5 | - | - | - |
| 6 | ANALOG | DRIVE SPEED 1 | drive speed signal |
| 7 | ANALOG | DRIVE SPEED 2 | drive speed signal |
| 8 | SUPPLY | GROUND | battery ground |
| 9 | OUTPUT | PLATFORM SIGNAL | platform emergency stop interlock |
| 10 | SUPPLY | KEY IGNITION | platform +14vdc power supply |
| 11 | OUTPUT | FOOT SWITCH 1 | platform foot switch supply |
| 12 | - | spare | - |
| 13 | INPUT | FOOT SWITCH 2 | platform foot switch return (signal) |
| 14 | - | spare | - |
| 15 | OUTPUT | TILT ALARM | actives tilt alarm at platform |
| 16 | - | spare | - |
| 17 | - | - | - |
| 18 | - | spare | - |
| 19 | - | - | - |

CONNECTOR 6 (POWER SUPPLY/INTERLOCK): Deutsch P/N HD34-24-21PN

| PIN | TYPE | CIRCUIT | DESCRIPTION |
|---|---|---|---|
| A | OUTPUT | PUMP SIGNAL | activates the main hydraulic pump contactor |
| B | SUPPLY | BATTERY GROUND | power supply ground to control system |
| C | OUTPUT | AUX PUMP SIGNAL | activates the auxiliary hydraulic pump contactor |
| D | SUPPLY | CONV-14VDC | 14 VDC from the dc step down converter (48 to 14) |
| E | SUPPLY | AUX-12VDC | 12 VDC from the auxiliary (emergency) battery |
| F | SUPPLY | DRIVE-CONTROLLER PWR | 14 VDC to drive controller when platform signal present |
| G | SUPPLY | SYSTEM POWER | main controller power supply from intlk/voltage card |
| H | OUTPUT | FOOT SWITCH 2 | foot switch intlk signal to the drive control system |
| J | INPUT | 48 VDC SENSE | 48 volt battery bank monitoring input |
| K | OUTPUT | IGNITION | circuit protected supply with key on |
| L | - | - | - |
| M | ANALOG | DRIVE SPEED 1 | drive speed circuit from platform drive joystick pot |
| N | ANALOG | DRIVE SPEED 2 | drive speed circuit from platform drive joystick pot |
| P | - | - | - |
| R | - | - | - |
| S | - | - | - |
| T | - | - | - |
| U | - | - | - |
| V | - | - | - |
| W | - | - | - |
| X | - | - | - |

INTERLOCK SYSTEM

The ground station control box contains an interlock circuit which interfaces to the safety switches, and apparatus devices. The interlock system is located on a separate card in the control box and also contains the auxiliary battery charging circuit and main system power circuit breaker.

There are two primary control interlock switches - the platform foot switch interlock and the ground control switch interlock. There is a single primary control interlock - the *control interlock signal* (refer to interlock card schematic DWG #102784). The control interlock signal activates interlock and charge isolation relays on the interlock card.

In platform mode, the foot switch will activate the control interlock signal and in ground control mode, the control interlock is made by the ground control mode switch.

The two interlock relays which are dependent on the control interlock signal are Master Interlock Relay 1 (MIR1), and Master Interlock Relay 2 (MIR2).

Master Interlock Relay 1. MIR1 is utilized to interlock the hydraulic pump motor contactor signal. The signal enters the relay from a high side driver on the master controller card through the ribbon cable connector to the interlock card. The interlocked pump request signal is output to connector #6-A. If the control interlock signal is not present, there cannot be any hydraulic pump operations.

Master Interlock Relay 2. MIR2 is utilized to interlock the auxiliary (emergency) hydraulic pump motor contactor signal. The signal enters the relay from a high side driver on the master controller card through the ribbon cable connector to the interlock card. The interlocked pump request signal is output to connector #6-C. If the control interlock signal is not present, there cannot be any emergency hydraulic pump operations.

Auxiliary Battery Charging Relay. The control interlock signal also activates the auxiliary battery charging circuit to isolate the auxiliary battery from the converter when a function is active (see charging/power supply circuit).

Foot Switch Interlock. The foot switch interlock signal is passed through the ground controller box from the platform connector #5 to the power supply/interlock connector #6. The circuit can be used as required by the OEM to interlock devices which may or may not be connected to the control system. It is the OEM's responsibility to determine the appropriateness of the external wiring and its suitability for any given application.

Platform Emergency Stop Switch. The platform emergency stop switch signal provides power to the platform foot switch and also to an interlock relay which provides the electrical system with an ignition circuit attached to the 14 VDC converter. This interlock - called *platform signal* interlock is active whenever the apparatus is in platform mode and the platform emergency stop button is set (pulled out).

Interlock Interface Examples. There exist several (if not unlimited) methods for interfacing the apparatus (and interlocks) to the control system. The attached apparatus interface schematic serves as a representative circuit which has been tested and time proven. As shown, the apparatus interface schematic (dwg #102785) coupled with the interlock interface circuit card schematic (dwg #102784) has the following interlock characteristics:

PLATFORM SIGNAL NOT ACTIVE:

- drive system is disabled
- no foot switch interlock possible
- no network platform interlock signal
- control from GCS still functional

FOOT SWITCH INTERLOCK SIGNAL NOT ACTIVE:

- no MIR1 (no main hydraulic pump for boom functions)
- no MIR2 (no auxiliary hydraulic pump for boom or steer functions)
- no interlock to drive control system
- no interlock to brake release valve (brakes remain applied)
- no network foot switch interlock signal
- control from GCS still functional

POWER AND CHARGING SYSTEM

The control system is connected in a "dual battery" configuration through a set of diodes configured as a battery isolator (refer to dwg #102784). The voltage supplies are connected to the power supply/interlock card through connector 6-D (14 VDC from the 48 volt to 14 volt converter) and connector 6-E (auxiliary 12 volt battery).

The auxiliary battery is charged through the auxiliary battery charging relay whenever the control interlock signal is not present. When the apparatus is idle, the auxiliary (emergency) 12 volt battery is connected directly to the converter output voltage, thereby receiving charge.

The circuit *system power* is connected to the battery isolator circuit and is protected by a 15 amp fuse. The system power circuit is routed directly to connector 6-G. This circuit is utilized as the main supply circuit to the controller and controller driver banks. The *system power* circuit is connected to the controller through connector #1-1.

*Note: In the 33/38 application, this circuit is routed through a disconnect relay which is activated whenever the 48 volt charger is plugged into an AC power source for charging the 48 volt battery bank. Note also that the converter supply (48 volts) is disconnected from the converter during charging.*

Power/Battery Charging System Example. There exist several (if not unlimited) methods for interfacing the apparatus charging to the control system. While the power connections to the control system are well defined, the external battery and cabling circuits of the apparatus are beyond the scope and control of the boom control system. Shown in schematic drawing #102785 is a representative circuit which has been time proven and tested - this circuit may be modified, or redesigned, as required by the OEM to satisfy the power requirements and conditions of the other components on the apparatus (such as drive control system, pump contactors, and pump speed controllers), The power systems circuit, and its suitability for a particular application is the responsibility of the OEM. Following is a brief description of the power and cabling methodologies utilized on the test model.

Master Disconnect Switch. The master disconnect switch disconnects the 48 volt battery bank from the apparatus. The auxiliary 12 volt battery is disconnected from the control system by a separate set of contacts on this switch.

AC Line Charger and Disconnect Relay. When the charger is plugged into an AC line, an internal relay disconnects the 48 volts from the converter, and disconnects the circuit *System Power* from the control system. This condition renders the controller and all apparatus functions non-operational. While the charger is connected to a line source, the 48 volt battery bank is receiving a charge.

Voltage Converter. The voltage converter drops the 48 volt supply to the 14 volt operating voltage of the controller and system components.

*Note: To allow the auxiliary battery to receive a charge, it is directly connected to the auxiliary battery when the apparatus is idle. The auxiliary battery bank is charged only by the converter in the example circuit.*

Pump Controller Power Relay. The pump controller power relay connects the 48 volt supply to the hydraulic pump controller and to the 48 volt battery sense line of the boom control system. This relay is activated by the Ignition-2 circuit (which is activated at power up). This relay scenario is primarily to prevent 48 volts from being applied to the boom control system without proper ground or power being supplied to the controller (or improper connector pinning). Additionally, this relay will be shut off to reduce power consumption during system sleep/power reduction mode.

Hydraulic Pump Contactor. The hydraulic pump motor and pump controller supply cables are connected only when required for operation. The hydraulic pump contactor is activated by the control system when required (see operating database section for rules).

Auxiliary/Emergency Hydraulic Pump Contactor. The auxiliary hydraulic pump motor supply cable is connected only when required for operation. The auxiliary hydraulic pump contactor is activated by the control system when required (see operating database section for rules).

Envelope Limit Switches/Operation

There are four limit switches which monitor the position of the boom. The limit switches are connected to the controller, and are incorporated into the rule database describing the apparatus. For diagnostic purposes, each limit switch has a redundant contact wired to the controller. The limit switches are defined as follows:

Main Boom Angle Limit Switch. The main boom angle limit switch is active whenever the main boom angle is low (below 33 degrees).

Main Boom Extension Limit Switch. The main boom extension limit switch is active whenever the main telescoping boom is extended less than 33 inches.

Main Boom Retracted Limit Switch. The main boom retracted limit switch is active whenever the main telescoping boom is fully retracted.

Jib Boom Angle Limit Switch. The jib boom angle limit switch is active whenever the jib boom angle is low (less than 33 degrees above horizontal).

Main Boom Cradled Limit Switch. The cradled limit switch is true when the main boom and riser boom are in most down powition.

The stability analysis evaluated and determined by Snorkel Engineering results in the following envelope requirements and limitations on certain boom functions:

Condition "A" (JIB). Defined as the condition when jib angle is not low and the boom is extended less than 33 inches.

Jib Up: requests are ignored while condition A exists.

Jib Down: Jib Down function is always allowed, however, the jib will automatically be activated down if a boom retract command is issued while condition "A" exists.

Condition "B" (EXTEND). Defined as the condition when the main boom angle is low and the main boom is extended more than 33 inches.

Extend: requests are ignored while condition "B" exists.

Retract: The retract function is always allowed, however, the retract function will be automatically activated if a main boom down command is issued while condition "B" exists.

System Functions and Rules

The apparatus operates to a defined set of rules. The rule database, in conjunction with the certain controller variables (refer to database section) defines precisely the operation of the machine. It is imperative that before machine design is implemented, that the operational rules be explicitly defined by the OEM, that is, the rule base must be developed by a person who possesses a full, exact understanding of the machine and how it must function. The exception to this is the machine specific functions that are beyond the scope of the discrete Boolean relationships available through the database.

The machine specific functions are custom program modules embedded into the control system and are called System Virtual Output Modules (VOM's). A VOM utilizes database variables, and may also set database variables so that the database developer has access to the VOM.

The 33/38 rule base is defined as follows:

Item: GCS Ground Mode LED
Desc: output indicator
Rule: set when system ground mode switch is active.

Item: GCS Platform Mode LED
Desc: output indicator
Rule: set when system platform mode is active.

Item: Ground Down Variable
Desc: database variable
Rule: set when ground down low speed switch and ground mode or when ground down hi speed switch and ground mode Item: Ground Up Variable
Desc: database variable
Rule: set when ground up low speed switch and ground mode or when ground up hi speed switch and ground mode Item: Ground Up or Ground Down Variable
Desc: database variable
Rule: set when ground up variable set or ground down variable set Item: Platform Station Down Variable
Desc: database variable
Rule: set when boom joystick down switch and platform mode Item: Platform Station Up Variable
Desc: database variable
Rule: when boom joystick up switch and platform mode Item: Platform Up or Platform Down Variable
Desc: database variable
Rule: set when Platform Up variable set or Platform Down variable set Item: Up or Down Variable
Desc: database variable
Rule: set when ground Up/Down variable set or platform up/down variable set Item: Ground Counter-Clockwise Variable
Desc: database variable
Rule: set when ground c-clockwise low speed switch and ground mode or ground c-clockwise hi speed switch and ground mode Item: Ground Clockwise Variable
Desc: database variable
Rule: set when ground clockwise low speed switch and ground mode or ground clockwise hi speed switch and ground mode Item: Ground Left/Right (CC-CW) Variable
Desc: database variable
Rule: set when ground clockwise variable set or ground counter clockwise variable set Item: Platform Counter-Clockwise Variable
Desc: database variable
Rule: when platform c-clockwise switch and platform mode Item: Platform Clockwise Variable
Desc: database variable
Rule: set when platform clockwise switch and platform mode Item: Platform Left/Right (CC-CW) Variable
Desc: database variable
Rule: set when platform clockwise variable set or platform counter clockwise variable set Item: Clockwise Counter-Clockwise Variable
Desc: database variable
Rule: when ground left/right variable set or platform left/right variable set Item: Ground Left/Right High Speed Variable
Desc: database variable
Rule: set when ground clockwise high switch and ground mode or ground counter-clockwise high switch and ground mode Item: Ground Left/Right Low Speed Variable
Desc: database variable
Rule: set when ground clockwise low switch and ground mode or ground counter-clockwise low switch and ground mode Item: Ground Up/Dn Hi Speed Variable
Desc: database variable
Rule: set when ground down high switch and ground mode or ground up high switch and ground mode Item: Ground Up/Dn Low Speed Variable
Desc: database variable
Rule: when ground down low switch and ground mode or ground up low switch and ground mode Item: Ground High Speed Variable
Desc: database variable
Rule: set when ground up/down high speed or ground left/right high speed Item: Ground Low Speed Variable
Desc: database variable
Rule: when ground up/down low speed or ground left/right low speed Boom Section Rules Item: Auto Retract Request
Desc: system variable
Rule: when main boom low angle limit switch and not retracted 33" limit switch Item: Auto Retract Blink Variable
Desc: database variable
Rule: when system auto retract variable and (system output blink variable)

Item: Main Boom Retract
Desc: output
Rule: when panel request for extend and (ground down switch or platform down switch) or (when auto retract enabled and main boom lifting down) but not when automatically lowering jib into safety zone.

Item: Main Boom Extend
Desc: output
Rule: when panel request for extend and (ground up switch or platform up switch) but not when auto retract enabled.

Item: GCS Main Boom Extension LED
Desc: output
Rule: when panel request for extend or (auto retract enabled and up/down switch pressed)

Item: Main Boom Lift Down
Desc: output
Rule: when panel request for lift and (ground down switch or platform down switch) but not if auto retract enabled Item: Main Boom Lift Up
Desc: output
Rule: when panel request for lift and (ground up switch or platform up switch)

Item: GCS Main Boom Lift LED
Desc: output
Rule: when panel request for lift

Item: PCS Main Boom Lift LED
Desc: output
Rule: when panel request for lift

Item: Auto Jib Boom Down
Desc: database variable
Rule: when jib boom angle is high and extended less than 33 inches.

Item: Jib Boom Down
Desc: output
Rule: when panel request for jib and (ground down switch or platform down switch) or when retracting and auto jib boom down variable set Item: Jib Boom Up
Desc: output
Rule: when panel request for jib and (ground up sw or platform up sw) but not when auto jib boom down variable set Item: GCS Jib Led
Desc: output
Rule: panel request for jib Item: PCS Jib Led
Desc: output
Rule: when panel request for jib Item: Platform Level Down
Desc: output
Rule: when panel request for level down and (ground down switch or platform down switch)

Item: Platform Level Up
Desc: output
Rule: when panel request for level up and (ground up switch or platform up switch)

Item: GCS Platform Level LED
Desc: output
Rule: when panel request for platform level Item: PCS Platform Level LED
Desc: output
Rule: when panel request for platform level Item: Riser Boom Down
Desc: output
Rule: when panel request for riser and (ground down sw or platform down sw)

Item: Riser Boom Up
Desc: output
Rule: when panel request for riser and (ground down sw or platform down sw)

Item: GCS Riser Boom LED
Desc: output
Rule: when panel request for platform level Item: PCS Riser Boom LED
Desc: output
Rule: when panel request for platform level Item: Platform Rotate Counter clockwise
Desc: output
Rule: when panel request for rotate and (ground ccw sw or platform ccw sw)

Item: Platform Rotate Clockwise
Desc: output
Rule: when panel request for rotate and (ground cw sw or platform cw sw)

Item: GCS Platform Rotate LED
Desc: output
Rule: when panel request for platform rotate
Item: PCS Platform Rotate LED
Desc: output
Rule: when panel request for platform rotate Item: Body Swing Counter Clockwise
Desc: output
Rule: when panel request for body swing and (ground ccw sw or platform ccw sw)

Item: Body Swing Clockwise
Desc: output
Rule: when panel request for body swing and (ground cw sw or platform cw sw)

Item: GCS Body Swing LED
Desc: output
Rule: when panel request for body swing

Item: PCS Body Swing LED
Desc: output
Rule: when panel request for body swing

Item: Ignition-2 Output
Desc: output
Rule: set when the controller is powered up Drive Control Rules Item: Drive Command Signal 1
Desc: output
Rule: joystick drive switch A and not joystick drive switch B
but only when
the foot switch is active and not in emergency power mode Item: Drive Command Signal 2
Desc: output
Rule: joystick drive switch A or joystick drive switch B
but only when
the foot switch is active and not in emergency power mode Item: Vehicle Motion
Desc: database variable
Rule: when any drive signal active Item: High Drive Range
Desc: output
Rule: when (panel request high drive and platform mode) and (boom is cradled
and fully retracted)
but only when the foot switch is active.

Item: PCS High Range LED
Desc: output
Rule: when High Range Drive

Valve Activation Variable

The following set of rules are utilized only to result in one equation which sets a variable which is true when any valve is active, the variable is: *Any Boom Valve Active*

Item: Platform Rotate Variable
Desc: database variable
Rule: when platform rotate clockwise or platform rotate counter-clockwise Item: Body Swing Variable
Desc: database variable
Rule: when swing clockwise or swing counter-clockwise Item: Swing/Rotate Variable
Desc: database variable
Rule: when platform rotate variable or body swing variable Item: Retract/Extend Variable
Desc: database variable
Rule: when retract valve active or extend valve active Item: Swing/Rotate/Retract/Extend Variable
Desc: database variable
Rule: when retract or extend variable or
platform rotate variable or body swing variable Item: Jib Down/Lift Down Variable
Desc: database variable
Rule: when jib down function or lift down function Item: Jib Up/Lift Up Variable
Desc: database variable
Rule: jib up function or main lift up function Item: Level Variable
Desc: database variable
Rule: when level up function or level down function Item: Jib-down/Lift-Down/Level Variable
Desc: database variable
Rule: when level variable set or jib down/lift down variable set Item: Lift/Jib/Level Variable
Desc: database variable
Rule: when level variable or jibvariable or lift variable set Item: Riser Variable
Desc: database variable
Rule: set with either riser up or riser down valve Item: Riser/Lift/Jib/Level
Desc: database variable
Rule: set with any jib lift riser or level motion function Item: Any Boom Valve Active
Desc: database variables
Rule: when swing or rotate or retract or extend or lift or jib or riser or level function is active Boom and Speed Controller Speed Trim Inputs Item: Full Speed Allowed (no boom speed trimming)
Desc: system command
Rule: when riser up, extend or retract valves or (brake release pressure low and foot switch)

Item: Half Speed Allowed (boom speed trimmed to 50%)
Desc: system command
Rule: when jib up or main up valve Item: Quarter Speed Allowed
Desc: system command
Rule: when not full speed allowed and not half speed allowed Item: Hydraulic Pump Signal
Desc: output (interlocked)
Rule: when any boom function valve and not emergency pump mode or brake release pressure low and foot switch is active Emergency / Auxiliary Power Control Item: Steer Variable
Desc: database variable
Rule: when drive joystick steer right or drive joystick steer left but only when foot switch active Item: Auxiliary Hydraulic Pump Relay
Desc: output
Rule: when steer variable or (emergency mode and any boom valve variable)

Item: Steer Left Function
Desc: output
Rule: when platform foot switch and drive joystick steer left Item: Steer Right Function
Desc: output
Rule: when platform foot switch and drive joystick steer right Item: GCS Emergency Power LED
Desc: output
Rule: when emergency mode variable set and ground mode or platform e-pwr LED Item: PCS Emergency Power LED
Desc: output
Rule: when emergency mode variable set and platform mode or ground e-pwr LED Item: Emergency Power Diverting Valve
Desc: output
Rule: when auxiliary (emergency) pump on and any boom valve Machine Warnings And Alarms
Item: Horn Relay
Desc: output
Rule: when platform horn switch Item: Tilt Alarm
Desc: output
Rule: not level switch and not boom cradled switch Item: Motion Alarm
Desc: output
Rule: any boom valve or drive function Item: Chirp Alert
Desc: output
Rule: when system control system requests function chirp Node Error Status. Each node has the ability to report its error status to the master control module. The master control module will also report the system error status to the network devices. The platform i/o node and the ground i/o node are configured with displays which will display the error status as reported from the MCM.

Node Errors. The following chart lists the error codes currently supported by the system.

| ERROR | DESCRIPTION |
|---|---|
| | |
| 0001 | MCM - PLATFORM NOT PRESENT (NO COM) |
| 0002 | MCM - BOOM JOYSTICK NOT PRESENT (NO COM) |
| 0003 | MCM - GROUND SWITCHES NOT PRESENT (NO COM) |
| 0004 | MCM - BOOM CRADLED SWITCH ERROR |
| 0005 | MCM - BOOM ANGLE SWITCH ERROR |
| 0006 | MCM - EXTENSION SWITCH ERROR |
| 0007 | MCM - RETRACTED SWITCH ERROR |
| 0008 | MCM - JIB ANGLE SWITCH ERROR |
| 0009 | MCM - DRIVER ERROR |
| 0010 | MCM - TILT ALARM WARNING |
| 0011 | MCM – INCONSISTENT SWITCH STATES |
| 2305 | GROUND I/O - SWITCH AT POC |
| 2306 | GROUND I/O - ILLEGAL SWITCH COMBINATION |
| 2307 | GROUND I/O - COMMUNICATIONS ERROR |
| 1793 | BOOM JOYSTICK - NOT CENTERED AT POC |
| 1794 | BOOM JOYSTICK - OUT OF RANGE |
| 1795 | BOOM JOYSTICK - MULTI AXIS DETECTED |
| 1807 | BOOM JOYSTICK - COMMUNICATIONS ERROR |
| 2561 | PLATFORM I/O - SWITCH AT POC |
| 2562 | PLATFORM I/O - ILLEGAL SWITCH COMBINATION |
| 2563 | PLATFORM I/O - DRIVE JOYSTICK ACTIVE AT POC |
| 2575 | PLATFORM I/O - COMMUNICATIONS ERROR |

What is claimed is:

1. An aerial work apparatus comprising:

a base;

a platform;

a boom having a plurality of boom sections connecting the platform and the base;

a hydraulic system for moving the boom sections; and a boom control for controlling the hydraulic system in response to operator input to move the boom sections in accordance with the operator input, said boom control comprising:

a first control module on the base responsive to an operator for providing boom motion commands for causing the boom to move in a desired direction;

a second control module on the platform responsive to an operator for providing boom motion commands for causing the boom to move in a desired direction; and a controller area network interconnecting the first control module and the second control module;

said boom control including:

a microprocessor programmable with parameters which control operation of the apparatus wherein said parameters include one or more of the following:

parameters which define an envelope within which the boom is permitted to operate;

parameters which cause the boom to automatically retract in certain positions in response to certain operator requested actions;

parameters which define ramping up speeds or ramping down speeds of boom movement;

parameters which define sequential functions of the boom;

parameters which define simultaneous functions of the boom; or parameters which define time periods based on the status of various switches during which time periods the boom is permitted to operate.

2. An aerial work apparatus comprising:

a base;

a platform;

a boom having a plurality of boom sections connecting the platform and the base;

a hydraulic system for moving the boom sections; and a boom control for controlling the hydraulic system in response to operator input to move boom sections in accordance with the operator input, said boom control comprising:

a first control module on the base responsive to an operator for providing boom motion commands for causing the boom to move in a desired direction;

a second control module on the platform responsive to an operator for providing boom motion commands for causing the boom to move in a desired direction; and a controller area network interconnecting the first control module and the second control module;

wherein the boom control comprises an envelope controller comprising:

a position detector subroutine or circuit for detecting a position of the boom sections or work platform relative to a position of the base; and a position limitation subroutine or circuit for inhibiting the boom control signal being provided to the hydraulic system when the position detector subroutine or circuit indicates that the detected position of the boom sections or work platform relative to the position of the base will exceed an envelope limit whereby the envelope controller limits the position of the boom sections or work platform relative to the position of the base to within a predefined region.

3. An aerial work apparatus comprising:

a base;

a platform;

a boom having a plurality of boom sections connecting the platform and the base;

a hydraulic system for moving the boom sections; and a boom control for controlling the hydraulic system in response to operator input to move boom sections in accordance with the operator input, said boom control comprising:

a first control module on the base responsive to an operator for providing boom motion commands for causing the boom to move in a desired direction;

a second control module on the platform responsive to an operator for providing boom motion commands for causing the boom to move in a desired direction;

a controller area network interconnecting the first control module and the second control module;

a boom section select switch responsive to operator input for selecting one of the plurality of boom sections to be moved;

a boom motion input switch responsive to operator input for providing a boom direction signal indicative of a desired direction of boom motion for the selected boom section to be moved and providing a desired boom speed; and a boom ramping controller, responsive to the boom section select switch and boom motion input switch, for controlling the hydraulic system to move the selected boom section in accordance with the boom direction signal, said boom ramping controller adapted to cause the hydraulic system to move the selected boom section at a varying velocity which does not exceed a preset maximum velocity so that the boom accelerates at a preset rate from zero velocity to the desired velocity.

4. An aerial work apparatus comprising:

a base;

a platform;

a boom having a plurality of boom sections connecting the platform and the base;

a hydraulic system for moving the boom sections; and a boom control for controlling the hydraulic system in response to operator input to move boom sections in accordance with the operator input, said boom control comprising:

a first control module on the base responsive to an operator for providing boom motion commands for causing the boom to move in a desired direction;

a second control module on the platform responsive to an operator for providing boom motion commands for causing, the boom to move in a desired direction; and a controller area network interconnecting the first control module and the second control module;

wherein said boom control is adapted to cause the hydraulic system to sequentially move the boom from one operator requested movement to the next operator requested movement based on a predefined parameter which defines the sequential functions of the boom or to simultaneously move the boom in a second direction in response to an operator requested movement while the boom is moving in response to a previous operator requested movement based on a predefined parameter which defines the simultaneous functions of the boom.

5. An aerial work apparatus comprising:

a base;

a platform;

a boom having a plurality of boom sections connecting the platform and the base;

a hydraulic system for moving the boom sections; and a boom control for controlling the hydraulic system in response to operator input to move boom sections in accordance with the operator input, said boom control comprising:

a first control module on the base responsive to an operator for providing boom motion commands for causing the boom to move in a desired direction;

a second control module on the platform responsive to an operator for providing boom motion commands for causing the boom to move in a desired direction; and a controller area network interconnecting the first control module and the second control module;

wherein the boom control includes:

a safety subroutine or circuit for monitoring operator input requesting boom movement and for preventing the boom control from responding to operator input requesting boom movement in the event that there has been no operator input requesting boom movement for a first time period; and a power saver subroutine or circuit for monitoring operator input to the boom control, said power saver subroutine or circuit deactivating the boom control when the power saver subroutine or circuit detects no operator input to the boom control for a second time period.

6. An envelope controller suitable for use with an aerial work platform having a boom comprising a plurality of boom sections, a hydraulic system for moving the boom sections, a work platform supported by the boom, a base supporting the boom, a boom control for providing a boom control signal to the hydraulic system, the boom control signal controlling the hydraulic system to control motion of one of the plurality of boom sections, the envelope controller comprising:

a position detector subroutine or circuit for detecting a position of the boom sections or work platform relative to a position of the base; and a position limitation subroutine or circuit for inhibiting the boom control signal being provided to the hydraulic system when the position detector subroutine or circuit indicates that the detected position of the boom sections or work platform relative to the position of the base will exceed an envelope limit whereby the envelope controller limits the position of the boom sections or work platform relative to the position of the base to within a predefined region.

7. The controller of claim 6 wherein the boom sections include an extendible section and further comprising an auto retract subroutine or circuit for retracting the extendible section when the operator provides an input which requests movement of the boom sections or work platform outside the predefined region thereby maintaining the work platform within the predefined region.

8. The controller of claim 6 wherein said boom control comprises:

a boom section select switch response to operator input for selecting one of the plurality of boom sections to be moved;

a boom motion input switch response to operator input for providing a boom direction signal indicative of a desired direction of boom motion for the selected boom section to be moved and providing a desired boom speed; and a boom ramping controller, responsive to the boom section select switch and boom motion input switch, for controlling the hydraulic system to move the selected boom section in accordance with the boom direction signal, said boom ramping controller adapted to cause the hydraulic system to move the selected boom section at a varying velocity which does not exceed a preset maximum velocity so that the boom accelerates at a preset rate from zero velocity to the desired velocity.

9. The controller of claim 6 wherein said boom control is adapted to cause the hydraulic system to sequentially move the boom from one operator requested movement to the next operator requested movement or to simultaneously move the boom in a second direction in response to an operator requested movement while the boom is moving in response to a previous operator requested movement.

10. The controller of claim 6 wherein the boom control includes:

a safety subroutine or circuit for monitoring operator input requesting boom movement and for preventing the boom control from responding to operator input requesting boom movement in the event that there has been no operator input requesting boom movement for a first time period; and a power saver subroutine or circuit for monitoring operator input to the boom control, said power saver subroutine or circuit deactivating the boom control when the power saver subroutine or circuit detects no operator input to the boom control for a second time period.

11. An aerial work apparatus comprising:

a base;

a platform;

a boom having a plurality of boom sections connecting the platform and the base;

a hydraulic system for moving the boom sections; and a boom control for controlling the hydraulic system in response to operator input to move the boom sections in accordance with the operator input, said boom control comprising:

a boom section select switch response to operator input for selecting one of the plurality of boom sections to be moved;

a boom motion input switch response to operator input for providing a boom direction signal indicative of a desired direction of boom motion for the selected boom section to be moved and providing a desired boom speed; and a boom ramping controller, responsive to the boom section select switch and boom motion input switch, for controlling the hydraulic system to move the selected boom section in accordance with the boom direction signal, said boom ramping controller adapted to cause the hydraulic system to move the selected boom section at a varying velocity which does not exceed a preset maximum velocity so that the boom accelerates at a preset rate from zero velocity to the desired velocity.

12. The apparatus of claim 11 wherein the boom control includes a microprocessor and wherein the maximum preset velocity is programmable by the operator via the microprocessor.

13. The apparatus of claim 11 wherein the boom ramping controller is adapted to cause the hydraulic system to substantially instantly discontinue movement of the selected boom section in response to operator input indicating that the motion of the selected boom section should be terminated or indicating that another boom section should be moved.

14. The apparatus of claim 11 wherein the boom ramping controller transitions from moving the boom in a first direction to moving the boom simultaneously in the first direction and in a second direction by ramping down the movement in the first direction to a first certain value and by ramping up the movement in the second direction to a second certain value and, thereafter, ramping up the movements in the first and second direction simultaneously.

15. The apparatus of claim 11 wherein said boom control is adapted to cause the hydraulic system to sequentially move the boom from one operator requested movement to the next operator requested movement or to simultaneously move the boom in a second direction in response to an operator requested movement while the boom is moving in response to a previous operator requested movement.

16. The apparatus of claim 11 wherein the boom control includes:

a safety subroutine or circuit for monitoring operator input requesting boom movement and for preventing the boom control from responding to operator input requesting boom movement in the event that there has been no operator input requesting boom movement for a first time period; and a power saver subroutine or circuit for monitoring operator input to the boom control, said power saver subroutine or circuit deactivating the boom control when the power saver subroutine or circuit detects no operator input to the boom control for a second time period.

17. An aerial work apparatus comprising:

a base;

a platform;

a boom having a plurality of boom sections connecting the platform and the base;

a hydraulic system for moving the boom sections; and a boom control for controlling the hydraulic system in response to operator input to move the boom sections in accordance with the operator input, said boom control comprising:

a boom section select switch responsive to operator input for selecting only one of the plurality of boom sections to be moved;

a boom motion input switch response to operator input for providing a boom direction signal indicative of a desired direction of boom motion; and a boom controller responsive to the boom section select switch and the boom motion input switch for controlling the hydraulic system to effect boom motion, said boom controller adapted to cause the hydraulic system to sequentially move the boom from one operator requested movement to the next operator requested movement based on a predefined parameter which defines the sequential functions of the boom or to simultaneously move the boom in a second direction in response to an operator requested movement while the boom is moving in response to a previous operator requested movement based on a predefined parameter which defines the simultaneous functions of the boom.

18. The apparatus of claim 17 wherein the boom control includes:

a safety subroutine or circuit for monitoring operator input requesting boom movement and for preventing the boom control from responding to operator input requesting boom movement in the event that there has been no operator input requesting boom movement for a first time period; and a power saver subroutine or circuit for monitoring operator input to the boom control, said power saver subroutine or circuit deactivating the boom control when the power saver subroutine or circuit detects no operator input to the boom control for a second time period.

19. An aerial work platform comprising:

a plurality of boom sections;

a boom control for providing a motion output signal for controlling a motion of one of the plurality of boom sections in response to input from an operator to the boom control; and a timer subroutine or circuit comprising:

a safety subroutine or circuit for monitoring operator input requesting boom movement and for preventing the boom control from responding to operator input requesting boom movement in the event that there has been no operator input requesting boom movement for a first time period; and a power saver subroutine or circuit for monitoring operator input to the boom control, said power saver subroutine or circuit deactivating the boom control when the power saver subroutine or circuit detects no operator input to the boom control for a second time period.

20. The platform of claim 19 wherein the second time period of the power saver subroutine or circuit is greater than the first time period of the safety subroutine or circuit.

21. An aerial work apparatus comprising:

a base;

a platform;

a boom having a plurality of boom sections connecting the platform and the base;

a hydraulic system for moving the boom sections; and a boom control for controlling the hydraulic system in response to operator input to move the boom sections in accordance with the operator input, said boom control comprising:

a microprocessor having inputs for receiving, operator inputs and having outputs providing output signals which are a function of the operator input provided to the microprocessor input, said hydraulic system being responsive to the output signals;

a first control card on the base and separate from the microprocessor, the first control card responsive to an operator for providing first boom motion command signals for causing the boom to move in a desired direction, said first boom motion command signals being supplied to the inputs of the microprocessor;

a second control card on the platform and separate from the microprocessor, the second card responsive to an operator for providing second boom motion command signals for causing the boom to move in a desired direction, said second boom motion command signals being supplied to the inputs of the microprocessor; and a controller area network interconnecting said microprocessor, the first control card and the second control card.

* * * * *